(12) United States Patent
Habuto et al.

(10) Patent No.: US 7,831,757 B2
(45) Date of Patent: Nov. 9, 2010

(54) DATA COMMUNICATION SYSTEM, PORTABLE ELECTRONIC DEVICE, SERVER DEVICE, DATA COMMUNICATION METHOD, AND DATA COMMUNICATION PROGRAM

(75) Inventors: Reiko Habuto, Kanagawa (JP); Yoshiyasu Kubota, Kanagawa (JP); Nobuki Furue, Tokyo (JP)

(73) Assignee: Sony Corporation, Tokyo (JP)

( * ) Notice: Subject to any disclaimer, the term of this patent is extended or adjusted under 35 U.S.C. 154(b) by 214 days.

(21) Appl. No.: 12/106,726

(22) Filed: Apr. 21, 2008

(65) Prior Publication Data
US 2008/0263252 A1    Oct. 23, 2008

(30) Foreign Application Priority Data

| Apr. 20, 2007 | (JP) | ............................. 2007-111469 |
| Apr. 4, 2008 | (JP) | ............................. 2008-098483 |
| Apr. 4, 2008 | (JP) | ............................. 2008-098484 |
| Apr. 4, 2008 | (JP) | ............................. 2008-098485 |

(51) Int. Cl.
*G06F 13/00* (2006.01)
*G06F 13/12* (2006.01)

(52) U.S. Cl. ..................................... 710/303; 710/304

(58) Field of Classification Search .................. 710/303
See application file for complete search history.

(56) References Cited

U.S. PATENT DOCUMENTS

| 5,841,424 | A | * | 11/1998 | Kikinis ....................... 345/168 |
| 6,734,915 | B2 | * | 5/2004 | Nagaoka ...................... 348/375 |
| 6,882,866 | B2 | * | 4/2005 | Sato ......................... 455/556.2 |
| 6,900,980 | B2 | * | 5/2005 | Christopher ............ 361/679.31 |
| 2001/0034803 | A1 | * | 10/2001 | Sorek et al. ................... 710/129 |
| 2002/0065964 | A1 | * | 5/2002 | Lemke et al. ................. 710/48 |
| 2002/0149695 | A1 | * | 10/2002 | Kayanuma ................... 348/375 |
| 2003/0154334 | A1 | * | 8/2003 | Chuang ....................... 710/72 |
| 2004/0059857 | A1 | * | 3/2004 | Wakeley et al. ............. 710/302 |
| 2004/0268006 | A1 | * | 12/2004 | Kang et al. .................. 710/303 |
| 2006/0127034 | A1 | * | 6/2006 | Brooking et al. .............. 386/46 |
| 2006/0184705 | A1 | * | 8/2006 | Nakajima ................... 710/303 |
| 2007/0015550 | A1 | * | 1/2007 | Kayanuma ................. 455/575.1 |
| 2007/0026799 | A1 | * | 2/2007 | Wang et al. ................. 455/41.2 |
| 2007/0271400 | A1 | * | 11/2007 | Lemke et al. ................... 710/8 |
| 2008/0005440 | A1 | * | 1/2008 | Li et al. ....................... 710/303 |
| 2008/0071937 | A1 | * | 3/2008 | Yoshida ....................... 710/12 |
| 2008/0263146 | A1 | * | 10/2008 | Habuto et al. ............... 709/203 |
| 2008/0263252 | A1 | * | 10/2008 | Habuto et al. ............... 710/303 |

FOREIGN PATENT DOCUMENTS

| EP | 1760899 | A1 | * | 3/2007 |
| JP | 2006-148284 | | | 6/2006 |

OTHER PUBLICATIONS

U.S. Appl. No. 12/106,761, filed Apr. 21, 2008, Habuto, et al.
U.S. Appl. No. 12/106,804, filed Apr. 21, 2008, Habuto, et al.

* cited by examiner

*Primary Examiner*—Ryan M Stiglic
(74) *Attorney, Agent, or Firm*—Oblon, Spivak, McClelland, Maier & Neustadt, L.L.P.

(57) ABSTRACT

A data communication system including a portable electronic device, a server device and a cradle device for mediating transmission and reception of data between the portable electronic device and the server device.

25 Claims, 43 Drawing Sheets

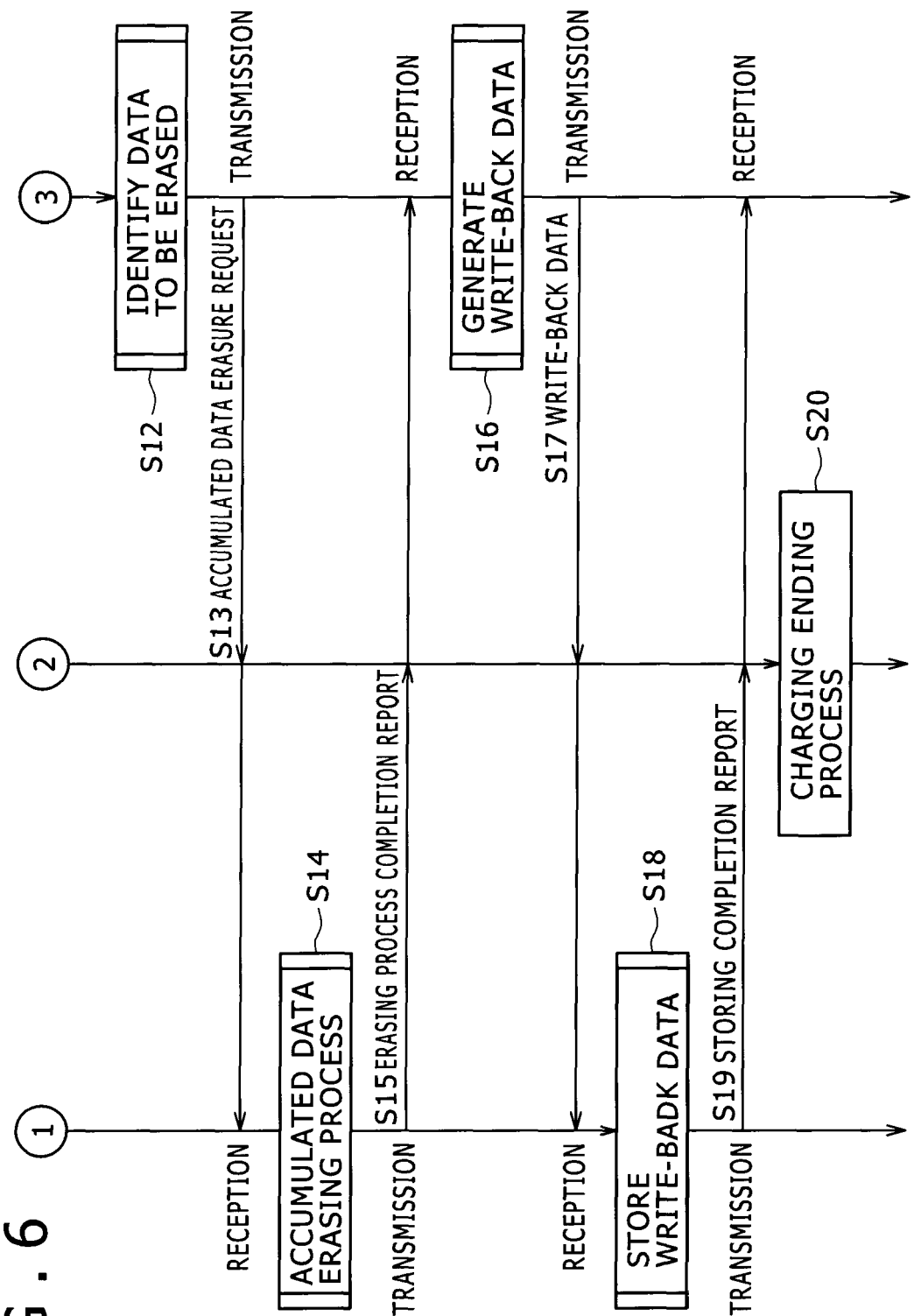

FIG. 7A

EXAMPLE OF LAYOUT OF COMMAND DATA

| TRANSMISSION DESTINATION ID | TRANSMISSION SOURCE ID | COMMAND | DATA |
|---|---|---|---|

FIG. 7B

DEVICE ID INQUIRY (FROM CRADLE TO YET-TO-RESPOND MOBILE DEVICE)

| YET-TO-RESPOND DEVICE | CRADLE | DEVICE ID INQUIRY |
|---|---|---|

FIG. 7C

DEVICE ID RESPONSE (FROM YET-TO-RESPOND MOBILE DEVICE TO CRADLE)

| CRADLE | MOBILE DEVICE | DEVICE ID RESPONSE | DEVICE ATTRIBUTE | OTHERS |
|---|---|---|---|---|

FIG. 8

EXAMPLE OF LAYOUT OF ACCUMULATED DATA LIST

| TRANSMISSION DESTINATION ID | TRANSMISSION SOURCE ID | DATA ATTRIBUTE | | OTHERS |
|---|---|---|---|---|
| DATA ID | DATA ATTRIBUTE | DATE AND TIME OF GENERATION | DATA SIZE | OTHERS |
| DATA ID | DATA ATTRIBUTE | DATE AND TIME OF GENERATION | DATA SIZE | OTHERS |
| DATA ID | DATA ATTRIBUTE | DATE AND TIME OF GENERATION | DATA SIZE | OTHERS |
| ... | | | | |

FIG. 9

EXAMPLE OF LAYOUT OF ACCUMULATED DATA (EX. IMAGE DATA)

| DEVICE ID | DATA ID | DATA ATTRIBUTE | DATE AND TIME OF GENERATION | PROTECT | PRINT MARK | DATA SIZE |
|---|---|---|---|---|---|---|
| NUMBER OF TIMES OF USE | OTHERS | | | | | |
| DATA | | | | | | |

FIG.10

EXAMPLE OF LAYOUT OF WRITE-BACK DATA (EX. IMAGE DATA)

| DATA ID | DATA ATTRIBUTE | DATE AND TIME OF GENERATION | DATA SIZE | PROVIDING DESTINATION | ORIGINAL DATA ID | DATE AND TIME OF GENERATION OF ORIGINAL DATA |
|---|---|---|---|---|---|---|
| ORIGINAL DATA SIZE | OTHERS | | | | | |
| WRITE-BACK DATA | | | | | | |

FIG.11

EXAMPLE OF LAYOUT OF WRITE-BACK HISTORY

| WRITE-BACK DATE AND TIME | WRITE-BACK DESTINATION | DATA ID | DATA ATTRIBUTE | DATE AND TIME OF GENERATION | DATA SIZE | OTHERS |
|---|---|---|---|---|---|---|
| ..... | ..... | ..... | ..... | ..... | ..... | ..... |

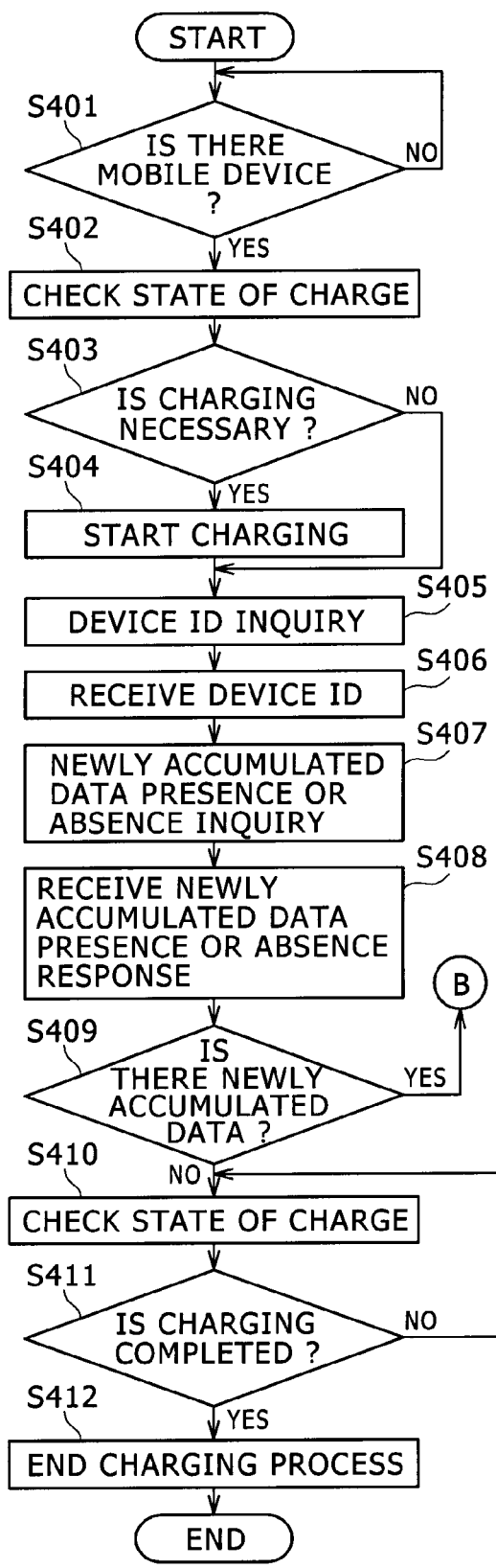
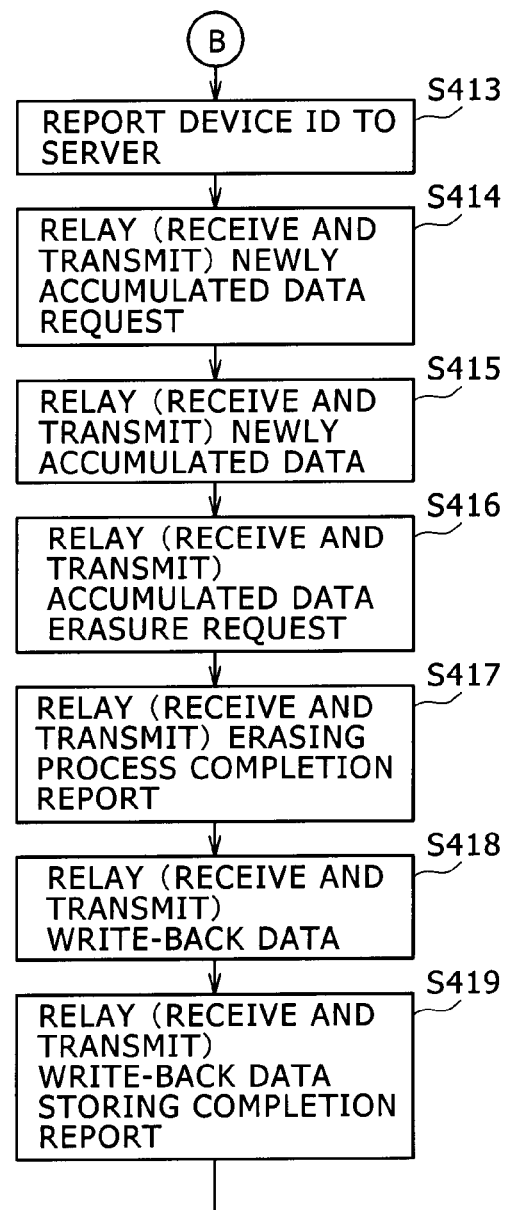
FIG.20

FIG. 25

EXAMPLE OF LAYOUT OF ACCUMULATED DATA INCLUDING RIGHT INFORMATION
(EX. MUSIC DATA)

| MANAGEMENT INFORMATION | | | | |
|---|---|---|---|---|
| DEVICE ID | DATA ID | DATA ATTRIBUTE | DATE AND TIME OF OBTAINMENT | DATA SIZE | OTHERS |

| RIGHT INFORMATION | | | |
|---|---|---|---|
| CONTENT IDENTIFYING INFORMATION | PROVIDING SOURCE INFORMATION | RIGHT ID | RIGHT LEVEL | TRANSMITTED FLAG | OTHERS |

MUSIC DATA

FIG. 26

RIGHT INFORMATION TRANSMISSION DATA

| CLASSIFICATION | TRANSMISSION DESTINATION | TRANSMISSION SOURCE | RIGHT INFORMATION | | | |
|---|---|---|---|---|---|---|
| | | | CONTENT IDENTIFYING INFORMATION | PROVIDING SOURCE INFORMATION | RIGHT ID | RIGHT LEVEL | OTHERS |

FIG. 30
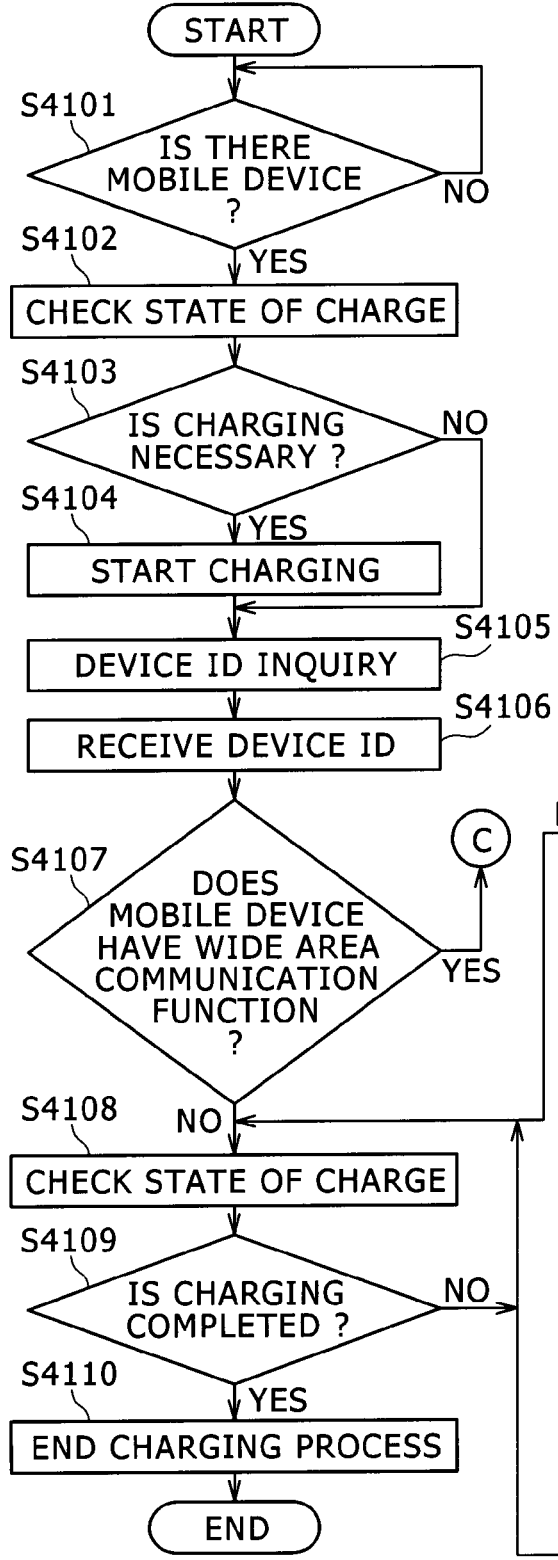
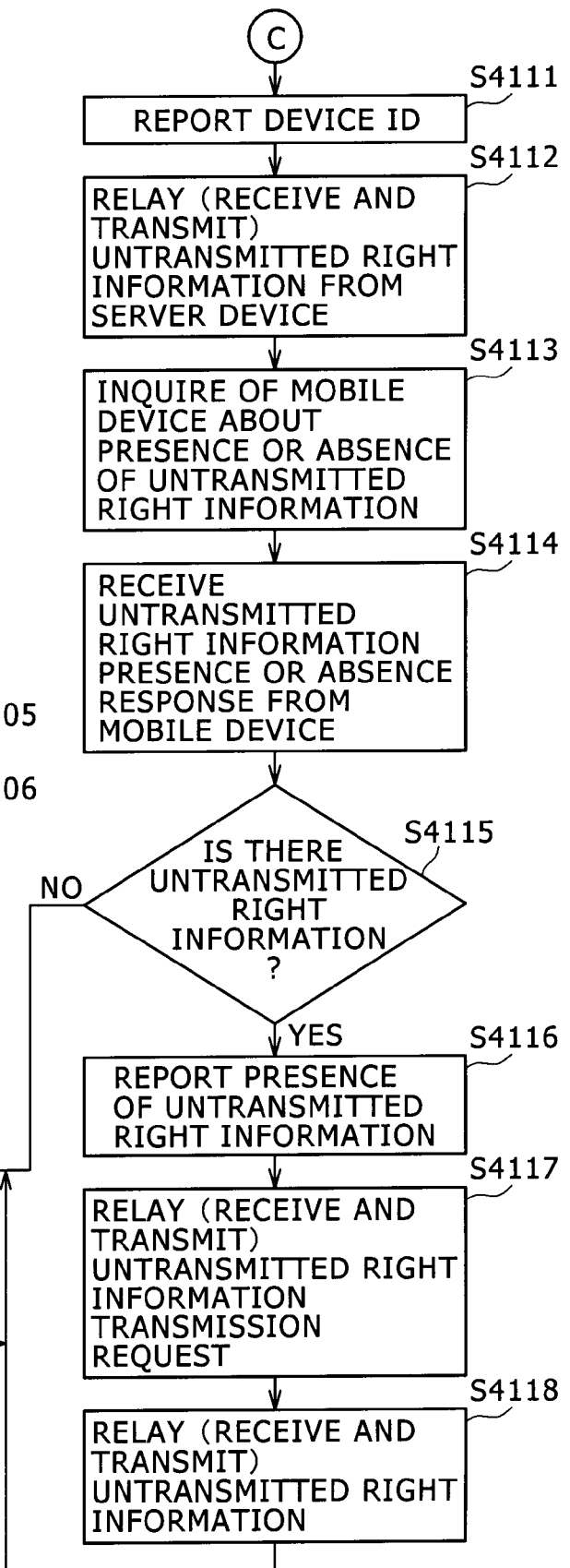

FIG. 33

EXAMPLE OF LAYOUT OF ACCUMULATED DATA INCLUDING LOG INFORMATION ON CONTENT (EX. MOVING IMAGE DATA)

| MANAGEMENT INFORMATION | | | | |
|---|---|---|---|---|
| DEVICE ID | DATA ID | DATA ATTRIBUTE | DATE AND TIME OF GENERATION | DATA SIZE | OTHERS |

| LOG INFORMATION | | | | |
|---|---|---|---|---|
| CONTENT IDENTIFYING INFORMATION | NUMBER OF TIMES OF REPRODUCTION | REPRODUCTION END STATE | REPRODUCTION END POSITION | REPRODUCTION TIME PERIOD INFORMATION | OTHERS |

MOVING IMAGE DATA

FIG. 34

LOG INFORMATION TRANSMISSION DATA

| CLASSIFI-CATION | TRANSMISSION DESTINATION | TRANSMISSION SOURCE | CONTENT REPRODUCTION LOG INFORMATION ||||||
|---|---|---|---|---|---|---|---|
| | | | CONTENT IDENTIFYING INFORMATION | NUMBER OF TIMES OF REPRODUCTION | REPRODUCTION END STATE | REPRODUCTION END POSITION | REPRODUCTION TIME PERIOD | OTHERS |

FIG.39A

EXAMPLE OF LAYOUT OF TRANSMISSION DATA OF DEVICE INFORMATION

| DEVICE ID | MANUFACTURING DATE | TOTAL OPERATING TIME | CHECK INFORMATION | OTHERS |
|---|---|---|---|---|

FIG.39B

EXAMPLE OF LAYOUT OF TRANSMISSION DATA OF BATTERY INFORMATION

| BATTERY ID | MANUFACTURING DATE | NUMBER OF CHARGES | CHARGE PERCENTAGE | OTHERS |
|---|---|---|---|---|

FIG.39C

EXAMPLE OF LAYOUT OF TRANSMISSION DATA OF DEVICE INFORMATION AND BATTERY INFORMATION

| DEVICE INFORMATION | | | | BATTERY INFORMATION | | | |
|---|---|---|---|---|---|---|---|
| DEVICE ID | MANUFACTURING DATE | TOTAL OPERATING TIME | CHECK INFORMATION | BATTERY ID | MANUFACTURING DATE | NUMBER OF CHARGES | CHARGE PERCENTAGE |

DATA COMMUNICATION SYSTEM, PORTABLE ELECTRONIC DEVICE, SERVER DEVICE, DATA COMMUNICATION METHOD, AND DATA COMMUNICATION PROGRAM

CROSS REFERENCES TO RELATED APPLICATIONS

The present invention contains subject matter related to Japanese Patent Application JP 2007-111469 filed in the Japan Patent Office on Apr. 20, 2007, and Japanese Patent Applications JP 2008-98484, JP 2008-98483 and JP 2008-98485 filed in the Japan Patent Office on Apr. 4, 2008, the entire contents of which are incorporated herein by reference.

BACKGROUND OF THE INVENTION

1. Field of the Invention

The present invention relates to a system including a cradle device to mediate transmission and reception of data between various portable electronic devices (mobile devices) such as a portable telephone terminal, a digital camera, and a portable type music reproducing device, for example, and a server device such as a personal computer or the like, a device and a method used in this system, and a program used in a device forming the system.

2. Description of the Related Art

A portable type music reproducing device and a portable type audio-visual reproducing device are used as so-called mobile devices that can be carried and used. The portable type music reproducing device includes an MD player using an MD (Mini Disc (registered trademark)) as a recording medium, a memory player using a semiconductor memory as a recording medium, a hard disk player using a hard disk as a recording medium, and the like. The portable type audio-visual reproducing device is for example realized as a notebook personal computer, a game console or the like, and audio-visual reproducing devices for exclusive use as a portable have been provided.

In the case of the portable type music reproducing device and the portable type audio-visual reproducing device, music data and AV data (data composed of video data and audio data to be reproduced in synchronism with each other) desired to be used are recorded in advance on a recording medium usable by the portable type music reproducing device and the portable type audio-visual reproducing device or a recording medium included in these devices.

However, it is troublesome for a user himself/herself to need to perform an operation of recording content data desired to be used on the portable type music reproducing device and the portable type audio-visual reproducing device onto a desired recording medium. In addition, when the user has no time to spare, the user may not be able to perform an operation of recording content data onto a desired recording medium.

SUMMARY OF THE INVENTION

According to the present invention, it is possible to enhance cooperation between a mobile device (portable electronic device) and a cooperating device such as a personal computer or the like without troubling the user and thus make the mobile device and the like more convenient.

BRIEF DESCRIPTION OF THE DRAWINGS

FIG. 6 is a timing chart continued from FIG. 5;

FIGS. 7A, 7B, and 7C are diagrams illustrating an example of layout of command data and concrete examples thereof;

FIG. 8 is a diagram illustrating an example of layout of an accumulated data list;

FIG. 9 is a diagram illustrating an example of layout of accumulated data;

FIG. 10 is a diagram illustrating an example of layout of write-back data;

FIG. 11 is a diagram illustrating an example of layout of a write-back history;

FIG. 20 is a flowchart illustrating a process performed at a cradle in the data communication system according to the example of modification;

FIG. 25 is a diagram illustrating accumulated data (content data) that is accumulated in the portable telephone terminal shown in FIG. 23 or the server device shown in FIG. 24 and to which right information is added;

FIG. 26 is a diagram illustrating an example of layout of right information transmission data transmitted and received between the portable telephone terminal and the server device;

FIG. 30 is a flowchart illustrating a process performed at the cradle when right information is used in the data communication system to which the above embodiment of the present invention is applied;

FIG. 33 is a diagram illustrating accumulated data (content data) accumulated in the portable telephone terminal shown in FIG. 23 to which log information is added;

FIG. 34 is a diagram illustrating an example of layout of log information transmission data transmitted from the portable telephone terminal to the server device;

FIGS. 39A, 39B, and 39C are diagrams illustrating examples of layout of transmission data of device information and the like transmitted from the portable telephone terminal to the server device;

DETAILED DESCRIPTION OF THE PREFERRED EMBODIMENTS

Preferred embodiments of a system, devices, programs, and methods according to the present invention will hereinafter be described with reference to the drawings.

First Embodiment

[Outline of Data Communication System]

Figure 1:
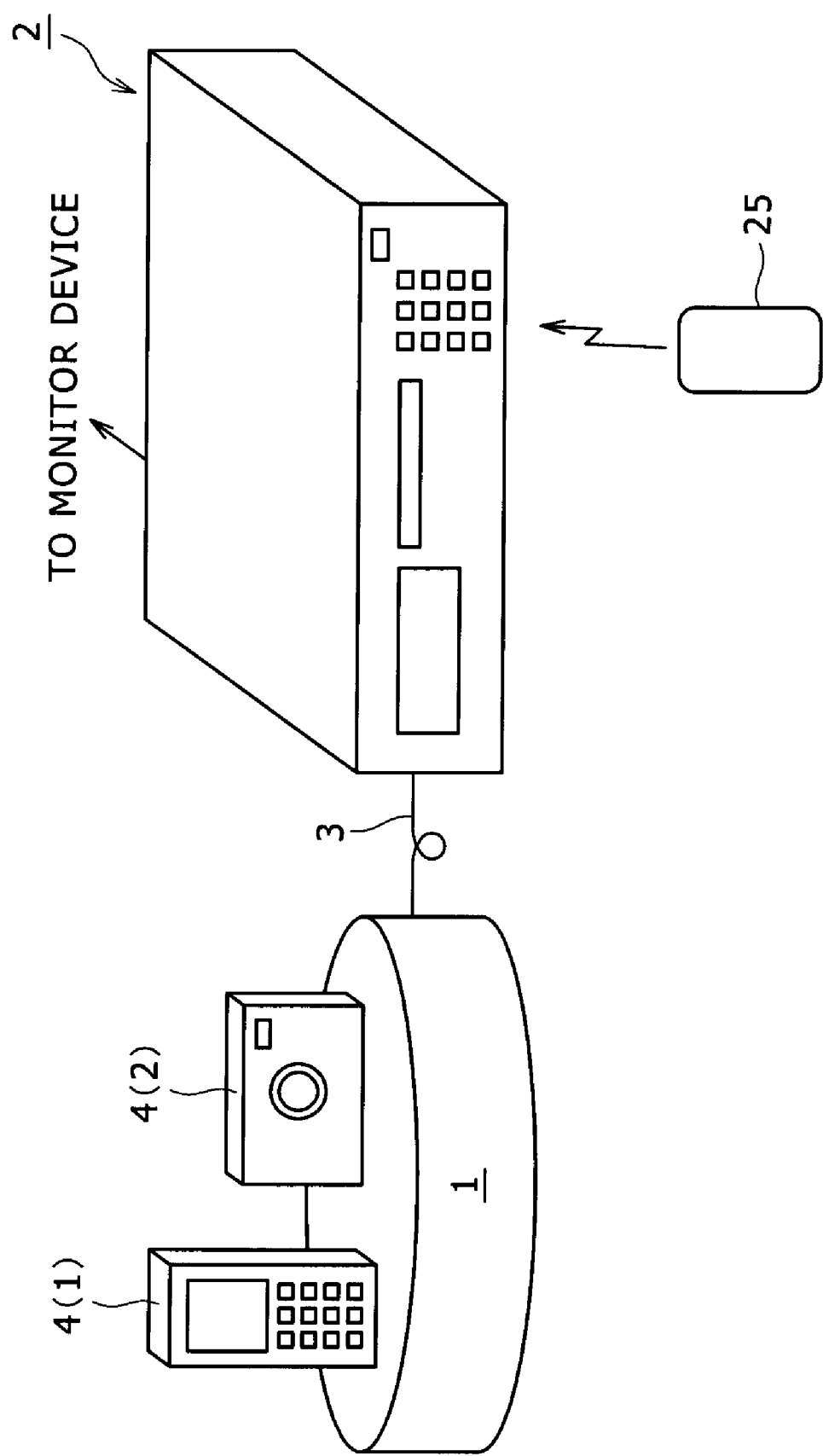
FIG. 1 is a diagram outlining of a data communication system to which an embodiment of the present invention is applied.

FIG. 1 is a diagram illustrating an outline of a data communication system according to the present embodiment. As shown in FIG. 1, the data communication system according to the present embodiment is formed by connecting a cradle 1 and a server device 2 via an interface cable 3. While the present embodiment will be described supposing that the cradle 1 and the server device 2 are connected by a wire, the cradle 1 and the server device 2 can of course be connected to each other by radio connection according to a predetermined radio interface.

An embodiment of a device, a program, and a method according to the present invention is applied to the cradle 1. The cradle 1 has a function of mediating data transmission and reception performed between various mobile devices mounted on the cradle 1 and the server device 2. The cradle 1 in the present embodiment also has a function of charging the various mobile devices mounted on the cradle 1.

In the present embodiment, contacts for feeding and contacts for communication of the various mobile devices and the cradle 1 do not need to be directly connected, and charging and communication can be performed on a noncontact basis. Specifically, charging is performed by electromagnetic induction, and data transmission and reception is performed by near field radio communication. However, a charging process and a communication process use different frequency bands so as not to affect each other.

The cradle 1 is mounted with various mobile devices having a function of receiving power supplied from the cradle 1 and charging the battery of the mobile devices, a function of performing near field radio communication with the cradle 1, or both the functions, the various mobile devices being for example a portable telephone terminal provided with a camera, a digital still camera, a digital video camera, a portable type music reproducing device and the like, so that the various mobile devices can receive power from the cradle 1 and communicate with the cradle 1.

In other words, the cradle 1 is not dedicated to a predetermined mobile device, but is a general-purpose device that can be used by various mobile devices. In addition, the cradle 1 can be simultaneously mounted with a plurality of mobile devices, communicate with each of the mobile devices, and charge the battery of each of the mobile devices.

An embodiment of a device, a program, and a method according to the present invention is applied to the server device 2. As will also be described in detail, the server device 2 has a large-capacity storage device, is capable of receiving, storing, and retaining accumulated data transmitted from the various mobile devices via the cradle 1, and is capable of giving an instruction to perform a process and providing information to the mobile devices mounted on the cradle 1 via the cradle 1. The server device 2 is for example realized as a hard disk recorder, a personal computer, or a dedicated server device when a so-called home network system is constructed.

In the data communication system according to the present embodiment, as shown in FIG. 1, for example, when a portable telephone terminal 4 (1) provided with a camera is mounted on the cradle 1, newly taken still image data accumulated in the portable telephone terminal 4 (1) provided with the camera is transmitted to the server device 2 via the cradle 1 according to a request or an instruction transmitted from the server device 2 via the cradle 1 so as to be backed up to a recording device of the server device 2.

In addition, according to an erasure instruction from the server device, still image data backed up in the server device 2 and accumulated in the portable telephone terminal 4 (1) provided with the camera can be erased. In this case, instead of erasing all backed-up still image data, still image data that can be estimated to be important on the basis of accompanying information of the still image data or the like, such for example as protected data and data to which a print marking is added, can be preserved without being erased.

In addition, the server device 2 creates a reduced image of still image data erased as described above on the basis of the still image data backed up in the server device 2, and transfers the reduced image from the server device 2 to the portable telephone terminal 4 (1) provided with the camera via the cradle 1. Thus, the still image data erased after being backed up can be properly grasped on the portable telephone terminal 4 (1) provided with the camera without unnecessarily using memory of the portable telephone terminal 4 (1) provided with the camera.

Further, while a case of handling still image data accumulated in the portable telephone terminal 4 (1) provided with the camera has been taken as an example, when a digital video camera is mounted as a mobile device on the cradle 1, moving image data becomes an object to be processed, and newly taken moving image data is backed up in the server device 2 and thereafter erased according to an erasure instruction from the server device 2.

When moving image data is an object to be processed, the server device 2 creates moving image data for digest reproduction of the moving image data, and returns the moving image data for digest reproduction to the digital video camera as a mobile device so that a digest version of the moving image data backed up in the server device 2 can be checked at any time.

When a mobile device is a portable type music reproducing device, it may not be necessary to back up music data accumulated in the portable type music reproducing device because the music data is already backed up in the server device or stored and retained on a recording medium such as a CD (Compact Disc) or the like. In such a case, instead of backing up the accumulated data, a so-called trial version of music data which trial version enables trial listening to a part of newly available music data, for example, can be provided to the portable type music reproducing device.

Otherwise stated, when a mobile device is a portable type music reproducing device, the server device 2 can provide music data that has not been provided to the portable type music reproducing device yet among pieces of music data accumulated in the server device 2, obtain new music data that can be provided from a server on the Internet and provide the new music data to the portable type music reproducing device, and provide a part of these pieces of music data to the portable type music reproducing device, for example.

Thus, information to be returned to a mobile device (data for the mobile device) differs depending on the device as a communication destination, data to be processed, and the like. The server device 2 thus determines what kind of data is to be prepared and returned as data for a mobile device on the basis of a device attribute transferred from the mobile device to the server device 2, a history of transmissions in the past to the mobile device as the destination, which history is managed by the server device, a data attribute of data accumulated in the mobile device as the destination, or an instruction input received from a user by the server device 2, for example.

In this case, the device attribute indicates a classification (kind) of the device such as a digital still camera, a digital video camera, a portable telephone terminal or the like. The data attribute indicates a classification (kind) of the data such as still image data, moving image data, audio data or the like.

Thus, by only mounting (placing) various mobile devices on the cradle 1, the data communication system according to the present embodiment (1) backs up data accumulated in the mobile devices, (2) erases (organizes) data accumulated in the mobile devices, and (3) provides data to the mobile devices. Therefore, an appropriate usable state of the portable electronic devices can be maintained at all times without troubling a user, so that usability of the portable electronic devices can be improved.

[Example of Configuration of Each of Devices Forming Data Communication System]

An example of configuration of each of the devices forming the data communication system according to the present embodiment will next be described. In the following, in addition to an example of configuration of the cradle 1 and the server device 2, description will be made of an example of configuration of a digital still camera or a digital video camera as an example of a mobile device mounted on the cradle 1.

[Example of Configuration of Cradle 1]

Figure 2:
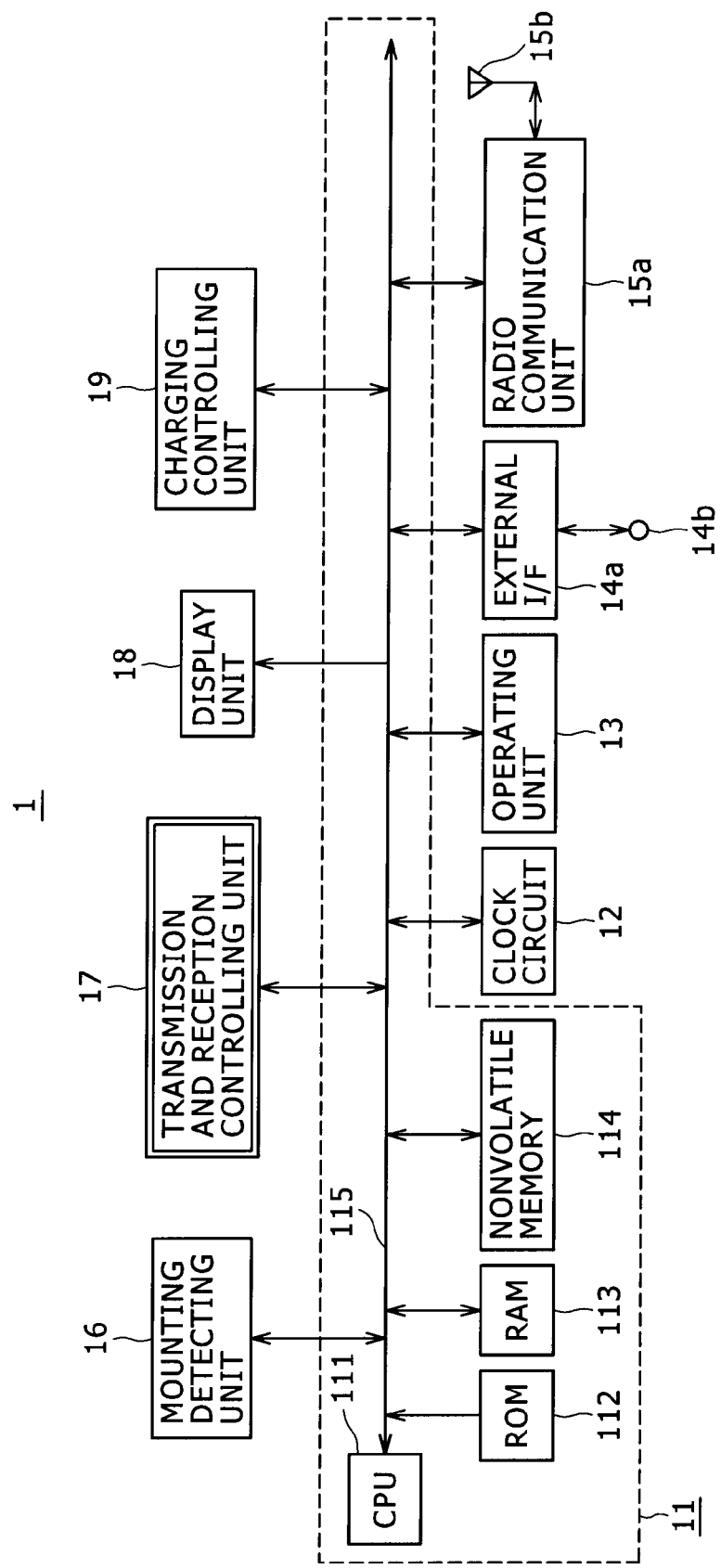
FIG. 2 is a block diagram illustrating an example of configuration of a cradle used in the data communication system shown in FIG. 1.

FIG. 2 is a block diagram illustrating an example of configuration of the cradle 1 used in the data communication system according to the present embodiment. As shown in FIG. 2, the cradle 1 includes a control unit 11, a clock circuit 12, an operating unit 13, an external interface (hereinafter abbreviated to an external I/F) 14a, an input-output terminal 14b, a radio communication unit 15a, a transmitting and receiving antenna 15b, a mounting detecting unit 16, a transmission and reception controlling unit 17, a display unit 18, and a charging controlling unit 19.

The control unit 11 controls various parts of the cradle 1 in the present embodiment. The control unit 11 is a microcomputer formed by connecting a CPU (Central Processing Unit) 111, a ROM (Read Only Memory) 112, a RAM (Random Access Memory) 113, and a nonvolatile memory 114 such as an EEPROM (Electrically Erasable and Programmable ROM), a flash memory or the like to each other via a CPU bus 115.

In this case, the CPU 111 is a main constituent of control which controls each part of the cradle 1 by executing a program stored and retained in the ROM 112 to be described later, forming a control signal, and supplying the control signal to each part. The ROM 112 stores in advance the program executed in the CPU 111 as described above, data necessary in various processes, and the like.

The RAM 113 is mainly used as a so-called work area for temporarily storing an in-progress result of a process and the like. The nonvolatile memory 114 stores and retains data to be retained even while the cradle 1 is turned off, for example information such as various setting parameters, an additional program for enhancing a function, and the like.

The clock circuit 12 has a calendar function, and provides a present date, a present day of the week, and a present time. The operating unit 13 has operating keys such for example as numeric keys and various function keys. The operating unit 13 can receive an operating input from a user, convert the operating input into an electric signal, and notify the electric signal to the control unit 11. The instruction input received via the operating unit 13 is thereby supplied as an electric signal to the control unit 11 so that the control unit 11 can control various parts according to the instruction from the user to perform a process according to the instruction from the user.

The input-output terminal 14b forms a terminal part for connection with an external device. In the present embodiment, the input-output terminal 14b is connected with the server device 2 via the interface cable 3. The external I/F 14a has functions of converting data to be transmitted from the cradle 1 into a format for transmission and converting externally supplied data into a format enabling the cradle 1 to process the externally supplied data, for example. The radio communication unit 15a and the transmitting and receiving antenna 15b are a part for performing data communication by near field radio communication with mobile devices mounted on the cradle 1.

Further, usable near field radio communication technologies include radio technology for transmitting and receiving data using radio waves in a wide band of a few GHz (gigahertz) referred to as a UWB (Ultra WideBand), short range radio communication technology referred to as Bluetooth, various other near field radio communication technologies, or short range radio communication technologies.

The mounting detecting unit 16 is a part for detecting whether a mobile device capable of performing data communication and being charged is mounted on the cradle 1. The mounting detecting unit 16 can electrically detect the mounting of a mobile device. For example, the mounting detecting unit 16 can control the radio communication unit 15a to transmit a response request at predetermined intervals, and when there is a mobile device that has responded to the response request, detect that the mobile device is mounted.

In addition, the mounting detecting unit 16 can have a sensor such as a so-called piezoelectric sensor or the like, control the radio communication unit 15a to transmit a response request when detecting through the piezoelectric sensor that some object is mounted on a mounting part of the cradle 1 on which part mobile devices are to be mounted (that a pressure is applied to the mounting part), and when there is a mobile device that has responded to the response request, detect that the mobile device is mounted. In this case, it is not necessary to transmit a response request at predetermined intervals at all times, and it suffices to, when some object is mounted, detect whether the object is a mobile device capable of communication. Therefore a load on the radio communication unit 15a or the like can be reduced.

The transmission and reception controlling unit 17 controls transmission and reception to and from mounted mobile devices which transmission and reception are performed through the radio communication unit 15a and the transmitting and receiving antenna 15b and transmission and reception to and from the server device 2 which transmission and reception are performed through the external I/F 14a and the input-output terminal 14b. That is, the transmission and reception controlling unit 17 controls processes of transmitting information received from a mobile device through the radio communication unit 15a and the transmitting and receiving antenna 15b to the server device through the external I/F 14a and the input-output terminal 14b, and conversely transmitting information received from the server device 2 through the external I/F 14a and the input-output terminal 14b to a mobile device through the radio communication unit 15a and the transmitting and receiving antenna 15b.

Thus, the transmission and reception controlling unit 17 implements a function of relay controlling means for relaying communications between a mobile device and the server device. Of course, the transmission and reception controlling unit 17 can also simply control a process of communication performed between a mobile device and the cradle 1 through the radio communication unit 15a and the transmitting and receiving antenna 15b and a process of communication performed between the server device 2 and the cradle 1 through the external I/F 14a and the input-output terminal 14b.

Further, the functions of the transmission and reception controlling unit 17 indicated by a dashed line in FIG. 2 can also be implemented as functions of the control unit 11 by a program (software) executed in the CPU 111. In addition, when the mounting detecting unit 16 is configured without a piezoelectric sensor or the like, the mounting detecting unit 16 can detect the mounting of a mobile device by performing communication through the radio communication unit 15a and the transmitting and receiving antenna 15b. Therefore, the functions of the mounting detecting unit 16 can also be implemented as functions of the control unit 11 by a program (software) executed in the CPU 111.

The display unit 18, for example, includes a display element such as an LCD (Liquid Crystal Display), an organic EL panel (Organic Electroluminescence Panel) or the like and a control circuit for controlling the display element. The display unit 18 can display various display information including characters, symbols, pictures and the like, such as various guidance messages, warning messages, display indicating a state of operation, and the like, according to control of the control unit 11.

The charging controlling unit 19 is a part for supplying power to mobile devices mounted on the cradle 1 by electromagnetic induction to charge batteries included in the mobile devices, as described above.

When the cradle 1 in the present embodiment detects that a mobile device is mounted through the mounting detecting unit 16, the cradle 1 controls the external I/F 14a by a function of the transmission and reception controlling unit 17 to notify the server device connected to the input-output terminal 14b that the mobile device is mounted.

In addition, according to an instruction provided from the server device 2 through the input-output terminal 14b and the external I/F 14a, by control of the transmission and reception controlling unit 17, the cradle 1 is supplied with accumulated data from a mobile device mounted on the cradle 1 through the radio communication unit 15a and the transmitting and receiving antenna 15b, and then controls the external I/F 14a to supply the accumulated data to the server device connected to the input-output terminal 14b.

Further, by control of the transmission and reception controlling unit 17, the cradle 1 can receive a data erasing instruction and write-back data provided from the server device 2 through the input-output terminal 14b and the external I/F 14a. The cradle 1 can then transmit the erasing instruction and the write-back data to a mobile device mounted on the cradle 1 through the radio communication unit 15a and the transmitting and receiving antenna 15b.

Thus, in the cradle 1 in the present embodiment, the radio communication unit 15a and the transmitting and receiving antenna 15b implement a function of performing communication between the cradle 1 and a mobile device, and the external I/F 14a and the input-output terminal 14b implement a function of performing communication between the cradle 1 and the server device.

The mounting detecting unit 16 implements a function of detecting when a device is mounted. The transmission and reception controlling unit 17 implements functions of controlling communication when it is detected that a mobile device is mounted, notifying the server device when a device is mounted, and controlling communication between the mounted mobile device and the server device.

[Example of Configuration of Server Device 2]

Figure 3:
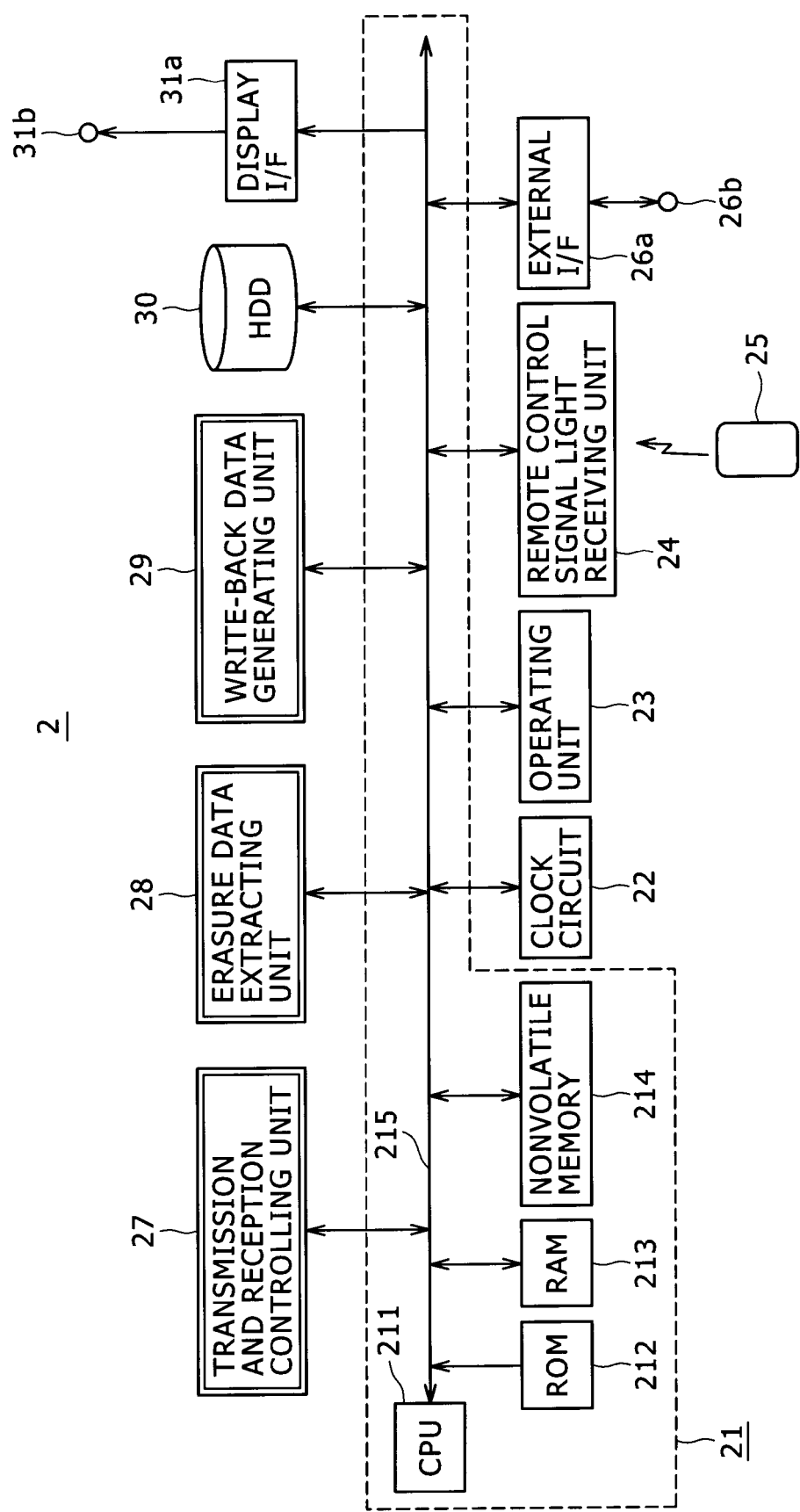
FIG. 3 is a block diagram illustrating an example of configuration of a server device used in the data communication system shown in FIG. 1.

FIG. 3 is a block diagram illustrating an example of configuration of the server device 2 used in the data communication system according to the present embodiment. As shown in FIG. 3, the server device 2 includes a control unit 21, a clock circuit 22, an operating unit 23, a remote control signal light receiving unit 24, an external I/F 26a, an input-output terminal 26b, a transmission and reception controlling unit 27, an erasure data extracting unit 28, a write-back data generating unit 29, a hard disk driver 30, a display interface (hereinafter abbreviated to a display I/F) 31a, and a video signal output terminal 31b. In addition, the server device 2 is configured such that a remote control 25 dedicated to the server device 2 can be used.

The control unit 21 controls various parts of the server device 2 in the present embodiment. The control unit 21 is a microcomputer formed by connecting a CPU 211, a ROM 212, a RAM 213, and a nonvolatile memory 214 to each other via a CPU bus 215.

In this case, the CPU 211 is a main constituent of control which controls each part of the server device 2 by executing a program stored and retained in the ROM 212 to be described later, forming a control signal, and supplying the control signal to each part. The ROM 212 stores in advance the program executed in the CPU 211 as described above, data necessary in various processes, and the like.

The RAM 213 is mainly used as a so-called work area for temporarily storing an in-progress result of a process and the like. The nonvolatile memory 214 is formed by an EEPROM, a flash memory or the like. The nonvolatile memory 214 stores and retains data even while the server device 2 is turned off, for example, information such as various setting parameters, an additional program for enhancing a function, and the like.

The clock circuit 22 has a calendar function, and provides a present date, a present day of the week, and a present time. The operating unit 23 has operating keys such for example as numeric keys and various function keys. The operating unit 23 can receive an operating input from a user, convert the operating input into an electric signal, and notify the electric signal to the control unit 21. The instruction input received via the operating unit 23 is thereby supplied as an electric signal to the control unit 21 so that the control unit 21 can control various parts according to the instruction from the user to perform a process according to the instruction from the user.

Further, the operating unit 23 may be provided on the main body of the server device 2, provided separately from the server device 2 as a so-called keyboard device having numeric keys, alphabet keys, function keys and the like, and provided as a pointing device such as a so-called mouse or the like, or the plurality of such devices may be used as the operating unit 23.

The remote control signal light receiving unit 24 receives the light of an infrared remote control signal from the remote control 25, converts the infrared remote control signal into an electric signal, and then notifies the electric signal to the control unit 21. The remote control 25 has various operating keys. The remote control 25 can receive an operating input from the user, form an infrared remote control signal corresponding to the received operating input, and send out the infrared remote control signal.

Thus, even when the user is situated at a place distant from the server device 2, the remote control signal light receiving unit 24 and the remote control 25 enable the user to give an instruction to the server device 2 and thus perform so-called remote operation of the server device 2 within a range where the remote control signal can be transmitted and received.

The input-output terminal 26b forms a terminal part for connection with an external device. In the present embodiment, the input-output terminal 26b is connected with the cradle 1 via the interface cable 3. The external I/F 26a has functions of converting data to be transmitted from the server device 2 into a format for transmission and converting externally supplied data into a format enabling the server device 2 to process the externally supplied data, for example.

The transmission and reception controlling unit 27 controls processes of communication performed between the server device 2 and the cradle 1 connected to the input-output terminal 26b through the external I/F 26a and the input-output terminal 26b. Specifically, the transmission and reception controlling unit 27 controls a process of transmitting information from the server device 2 to the cradle 1 or transmitting information from the server device 2 to a mobile device 4 mounted on the cradle 1 via the cradle 1 and a process of receiving information transmitted from the cradle 1 or information transmitted from a mobile device 4 mounted on the cradle 1 via the cradle 1.

The erasure data extracting unit 28 is a part for being provided with data (accumulated data) from a mobile device mounted on the cradle 1, the data being accumulated in the mobile device, backing up the data to a hard disk of the hard disk driver 30 to be described later, and thereafter extracting and identifying data to be erased from the mobile device from the backed-up accumulated data.

Though a concrete extracting process will be described later, accumulated data that can be estimated to be important such as accumulated data to which protection information or a print marking, for example, is added is identified as accumulated data to be preserved, and accumulated data that is not estimated to be important is identified as data to be erased.

The data identified as data to be erased in the erasure data extracting unit 28 is notified to the mobile device via the cradle 1. Thereby the data is deleted from the mobile device to secure available memory of the mobile device 4.

The write-back data generating unit 29 is for example a part for creating data by compressing the erased data and returning the created data to the mobile device 4 so that the accumulated data extracted and identified by the erasure data extracting unit 28 and erased from the memory of the mobile device 4 can be grasped also on the mobile device 4.

Of course, the write-back data generating unit 29 is not limited to writing back of write-back data formed on the basis of erased data. The write-back data generating unit 29 can also form write-back data (data to be provided) as described above from various data to be provided to the mobile device 4, and then provide the write-back data to the mobile device. Further, for simplicity of description, the case where write-back data is created from accumulated data erased from the mobile device 4 will be mainly described in the following.

The write-back data generating unit 29 for example generates and prepares a reduced image of still image data as write-back data when erased accumulated data is the still image data, generates and prepares a digest version of moving image data for reproduction of a digest image of the moving image data when erased accumulated data is the moving image data, and generates and prepares a reduced version of music data which version is formed by a part of a few seconds to about 10 seconds of a start part of the music data when erased accumulated data is the music data.

Further, in the data communication system according to the present embodiment, the mobile device 4 is a portable telephone terminal provided with a camera, a digital still camera, a digital video camera or the like that handles still image data or moving image data. Therefore, a case where write-back data corresponding to data to be erased is generated has been described above. However, the write-back data is not limited to this.

As described above, when mobile devices are for example a portable type music reproducing device, a portable type audio-visual reproducing device and the like, the write-back data generating unit 29 may prepare music data or AV data newly applicable to these devices, or prepare so-called notification data for notifying contents of the music data or the AV data that can be provided. That is, the write-back data generating unit 29 also has a function of preparing data or the like that can be newly provided for mobile devices as well as data formed in correspondence with data to be erased.

Further, the respective functions of the transmission and reception controlling unit 27, the erasure data extracting unit 28, and the write-back data generating unit 29 indicated by a double line in FIG. 3 can also be implemented as functions of the control unit 21 by a program (software) executed in the CPU 211.

The hard disk driver (hereinafter abbreviated to an HDD) 30 includes a hard disk and a driver. The hard disk driver 30 records supplied data on the hard disk or reads data recorded on the hard disk according to control of the control unit 21.

The display I/F 31*a* is a part for forming video data to be supplied to an external display device and outputting the video data through the video signal output terminal 31*b* according to control of the control unit 21. Thus, the external display device is connected to the video signal output terminal 31*b*.

By control of the transmission and reception controlling unit 27, the server device 2 in the present embodiment can receive a mounting notification transmitted from the cradle 1 through the input-output terminal 26*b* and the external I/F 26*a*, and receive accumulated data from a mobile device to store the accumulated data on the hard disk of the HDD 30.

In addition, the server device 2 can transmit an erasure instruction for erasure data extracted and identified by the erasure data extracting unit 28 and write-back data generated and prepared in the write-back data generating unit 29 through the external I/F 26*a* and the input-output terminal 26*b* by control of the transmission and reception controlling unit 27 to transmit the erasure instruction and the write-back data to a mobile device mounted on the cradle 1 via the cradle 1.

[Example of Configuration of Mobile Device 4]

Figure 4:
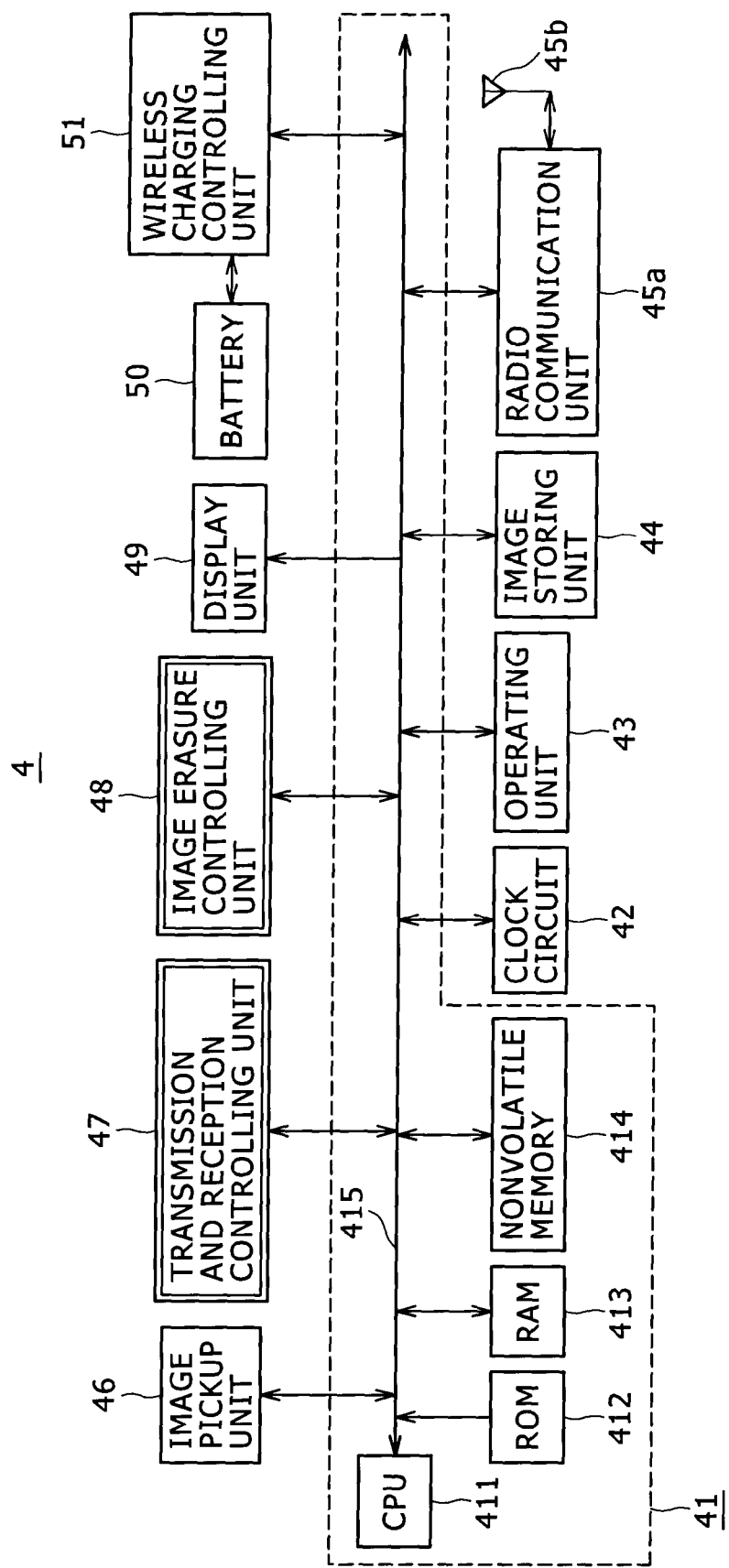
FIG. 4 is a block diagram illustrating an example of configuration of a digital still camera or a digital video camera as an example of a mobile device that is mounted on the cradle in the data communication system shown in FIG. 1.

FIG. 4 is a block diagram illustrating an example of configuration of a mobile device 4 mounted on the cradle 1 in the data communication system according to the present embodiment and which is capable of data transmission and reception and charging. As described above, mobile devices 4 may include various devices such as a portable telephone terminal provided with a camera, a digital still camera, a portable type music reproducing device and the like. However, in the following, for simplicity of description, a case in which mobile devices 4 are a digital still camera and a digital video camera will be taken as an example.

As shown in FIG. 4, the mobile device 4 in the present embodiment includes a control unit 41, a clock circuit 42, an operating unit 43, an image storing unit 44, a radio communication unit 45*a*, a transmitting and receiving antenna 45*b*, an image pickup unit 46, a transmission and reception controlling unit 47, an image erasure controlling unit 48, a display unit 49, a battery 50, and a wireless charging controlling unit 51.

The control unit 41 controls various parts of the mobile device 4 in the present embodiment. The control unit 41 is a microcomputer formed by connecting a CPU 411, a ROM 412, a RAM 413, and a nonvolatile memory 414 to each other via a CPU bus 415.

In this case, the CPU 411 controls each part of the mobile device 4 by executing a program stored and retained in the ROM 412 to be described later, forming a control signal, and supplying a control signal. The ROM 412 stores in advance the program executed in the CPU 411 as described above, data necessary in various processes, and the like.

The RAM 413 is mainly used as a so-called work area for temporarily storing an in-progress result of a process and the like. The nonvolatile memory 414 is formed by an EEPROM, a flash memory or the like. The nonvolatile memory 414 stores and retains data even while the mobile device 4 is turned off, for example, information such as various setting parameters, an additional program for enhancing a function, and the like.

The clock circuit 42 has a calendar function, and provides a present date, a present day of the week, and a present time. The operating unit 43 has various operating keys, an operating dial, and an operating lever. The operating unit 43 can receive an operating input from a user, convert the operating input into an electric signal, and notify the electric signal to the control unit 41. The instruction input received via the operating unit 43 is thereby supplied as an electric signal to the control unit 41 so that the control unit 41 can control various parts according to the instruction from the user to perform a process according to the instruction from the user.

The image storing unit 44 includes a recording medium, a driver unit and the like. Under control of the control unit 41, the image storing unit 44 is supplied with still image data and moving image data obtained by picture taking through the image pickup unit 46 to be described later, and stores and retains the still image data and the moving image data. The recording medium used in this case includes various media such as a hard disk, a semiconductor memory, an optical disk such as a DVD or the like, and can be formed so as to be included in the mobile device 4 or formed so as to be detachable from the mobile device 4. Description will be made supposing that the image storing unit 44 in the mobile device 4 of the present embodiment is formed using a built-in hard disk as a recording medium.

The radio communication unit 45*a* and the transmitting and receiving antenna 45*b* are a part for performing data communication with the cradle 1 by near field radio communication. Thus, as with the radio communication unit 15*a* and the transmitting and receiving antenna 15*b* of the cradle 1, the radio communication unit 45*a* and the transmitting and receiving antenna 45*b* can perform radio communication with the cradle 1 using for example radio communication technology such as UWB (Ultra WideBand), Bluetooth or the like, various other near field radio communication technologies, or short range radio communication technologies.

The image pickup unit 46 includes an objective lens, a diaphragm mechanism, a shutter mechanism, an image pickup element such as a CCD (Charge Coupled Device) or CMOS (Complementary Metal Oxide Semiconductor) image sensor, a preprocessing circuit and the like. The image pickup unit 46 can capture an image of a subject as an electric signal, and convert the electric signal into a digital signal. Still image data and moving image data generated as digital signals in the image pickup unit 46 are recorded on the recording medium of the image storing unit 44 through the control unit 41, as described above.

The transmission and reception controlling unit 47 controls transmission and reception to and from the cradle 1 which transmission and reception are performed through the radio communication unit 45a and the transmitting and receiving antenna 45b. That is, the transmission and reception controlling unit 47 is a part for receiving information from the cradle 1 through the radio communication unit 45a and the transmitting and receiving antenna 45b, and transmitting transmission information or the like generated in the control unit 41 to the cradle 1 through the radio communication unit 45a and the transmitting and receiving antenna 45b. That is, the transmission and reception controlling unit 47 controls transmission and reception of data between the mobile device 4 and the cradle 1.

As will be described later in detail, when the image erasure controlling unit 48 receives a data erasure request transmitted from the server device 2 via the cradle 1 through the transmitting and receiving antenna 45b and the radio communication unit 45a, the image erasure controlling unit 48 controls a process of erasing, of still image data and moving image data recoded on the recording medium of the image storing unit 44, still image data and moving image data that an instruction is given to erase from the recording medium of the image storing unit 44 on the basis of the received data erasure request.

Further, the functions of the transmission and reception controlling unit 47 and the image erasure controlling unit 48 indicated by a double line in FIG. 4 can also be implemented as functions of the control unit 41 by a program (software) executed in the CPU 411 of the control unit 41.

The battery 50 stores power to be supplied to each part of the mobile device 4 in the present embodiment. The wireless charging controlling unit 51 supplies the battery 50 with power supplied through the charging controlling unit 19 in the cradle 1, and controls a process of charging the battery 50. The battery 50 and the wireless charging controlling unit 51 cooperate with each other to be supplied with power from the cradle 1 and charge the battery 50.

As described above, the mobile device 4 in the present embodiment can record still image data and moving image data obtained by image pickup through the image pickup unit 46 in the image storing unit 44. By mounting the mobile device 4 on the cradle 1, the transmission and reception controlling unit 47 and the radio communication unit 45a function to transmit the various image data stored in the image storing unit 44 to the server device 2 via the cradle 1 and store, that is, back up the image data on the hard disk of the server device 2.

When an image data erasure request transmitted from the server device 2 via the cradle 1 is received through the transmitting and receiving antenna 45b and the radio communication unit 45a, the image erasure controlling unit 48 functions to control the image storing unit 44 to erase image data backed up in the server device 2 and thus rendered unnecessary to the mobile device 4 from the recording medium of the image storing unit 44 and thereby secure a storage space of the recording medium of the image storing unit 44.

When write-back data transmitted from the server device 2 via the cradle 1 is received through the transmitting and receiving antenna 45b and the radio communication unit 45a, the transmission and reception controlling unit 47 functions to control the image storing unit 44 to record the write-back data from the server device 2 onto the recording medium of the image storing unit 44.

Thus, by only mounting the mobile device 4 in the present embodiment on the cradle 1, the mobile device 4 performs data communication via the cradle 1, and is thereby able to back up data to the server device 2, erase data stored and retained in the image storing unit 44 according to an instruction from the server device 2, and record write-back data from the server device 2 into the image storing unit 44. In addition, the mobile device 4 is able to charge the battery 50 of the mobile device 4 itself through the cradle 1.

[Operation of Data Communication System]

The operation of the data communication system according to the present embodiment will next be described with reference to timing charts of FIG. 5 and FIG. 6. As described with reference to FIG. 1, the cradle 1 and the server device 2 are connected to each other by wire using the interface cable 3. The cradle 1 is connected to the mobile device 4 mounted on the cradle 1 by radio using near field radio communication technology.

As will be described below, communication between the mobile device 4 mounted on the cradle 1 and the server device 2 connected to the cradle 1 by wire is performed via the cradle 1.

When the cradle 1 is in a state of power to the cradle 1 being on, the cradle 1 determines whether a mobile device 4 is mounted on the cradle 1 at predetermined intervals by a function of the mounting detecting unit 16 (step S1). As described above, the cradle 1 in the present embodiment can be mounted with a plurality of mobile devices simultaneously, and each time a new mobile device is mounted on the cradle 1, the cradle 1 can detect that the mobile device is mounted.

When the cradle 1 determines in the determination process of step S1 that no mobile device 4 is mounted, the cradle 1 repeats the determination process of step S1 to wait for a mobile device 4 to be mounted on the cradle 1. When the cradle 1 determines in the determination process of step S1 that a mobile device 4 is mounted, the transmission and reception controlling unit 17 in the cradle 1 controls the radio communication unit 15a to transmit a device ID inquiry to the mobile device 4 newly mounted on the cradle 1 (step S2).

After the mobile device 4 receives the device ID inquiry from the cradle 1 through the transmitting and receiving antenna 45b and the radio communication unit 45a, the transmission and reception controlling unit 47 controls the radio communication unit 45a to transmit the device ID of the own device (mobile device 4) to the cradle 1 (step S3).

After the cradle 1 receives the device ID from the newly mounted mobile device 4 through the transmitting and receiving antenna 15b and the radio communication unit 15a, the transmission and reception controlling unit 17 controls the external I/F 14a to report the device ID from the mobile device 4 to the server device 2 (step S4). The server device 2 thereby grasps that the new mobile device is mounted on the cradle 1. Then, the cradle 1 performs a process of starting to charge the newly mounted mobile device 4 (step S5).

Meanwhile, after the server device 2 receives the report on the device ID from the mobile device 4 newly mounted on the cradle 1 through the input-output terminal 26b and the external I/F 26a, the transmission and reception controlling unit 27 controls the external I/F 26a to transmit an accumulated data list request, which is a request to provide a list of accumulated data, to the mobile device 4 identified by the received device ID (step S6).

This accumulated data list request is received in the cradle 1 through the input-output terminal 14b and the external I/F 14a, and is thereafter transmitted to the mobile device 4 through the radio communication unit 15a and the transmitting and receiving antenna 15b under control of the transmission and reception controlling unit 17.

After the mobile device 4 receives the accumulated data list request from the server device 2 through the transmitting and receiving antenna 45b and the radio communication unit 45a, the control unit 41 makes an accumulated data list on the basis of image data stored and retained in the image storing unit 44, and the transmission and reception controlling unit 47 controls the radio communication unit 45a to transmit the accumulated data list (step S7).

This accumulated data list is received in the cradle 1 through the transmitting and receiving antenna 15b and the radio communication unit 15a, and is thereafter transmitted to the server device 2 through the external I/F 14a and the input-output terminal 14b under control of the transmission and reception controlling unit 17.

After the server device 2 receives the accumulated data list from the mobile device 4 through the input-output terminal 26b and the external I/F 26a, the control unit 21 stores the accumulated data list in a predetermined area on the hard disk of the HDD 30 (step S8). Then, the control unit 21 of the server device 2 forms a newly accumulated data request, which is a request to provide newly accumulated data, on the basis of the stored accumulated data list, and the transmission and reception controlling unit 27 controls the external I/F 26a to transmit the newly accumulated data request (step S9).

In this case, the newly accumulated data request is information for identifying new data to be provided which data has not been provided yet on the basis of a date and time of the accumulated data list from the mobile device 4 and dates and times of generation of accumulated data already provided from the mobile device 4 and requesting the mobile device 4 to provide the identified data.

Further, the newly accumulated data request can be formed to request all image data whose dates and times of generation are a ddth day of an mmth month of a year yy and subsequent dates en bloc, for example, or can be formed to identify and request image data desired to be provided on the basis of a data ID added to each piece of accumulated data, for example.

This newly accumulated data request is received in the cradle 1 through the input-output terminal 14b and the external I/F 14a, and is thereafter transmitted to the mobile device 4 through the radio communication unit 15a and the transmitting and receiving antenna 15b under control of the transmission and reception controlling unit 17.

After the mobile device 4 receives the newly accumulated data request from the server device 2 through the transmitting and receiving antenna 45b and the radio communication unit 45a, the control unit 41 extracts the requested newly accumulated data from the image data stored and retained in the image storing unit 44, and the transmission and reception controlling unit 47 controls the radio communication unit 45a to transmit the newly accumulated data (step S10).

This newly accumulated data is received in the cradle 1 through the transmitting and receiving antenna 15b and the radio communication unit 15a, and is thereafter transmitted to the server device 2 through the external I/F 14a and the input-output terminal 14b under control of the transmission and reception controlling unit 17.

After the server device 2 receives the newly accumulated data from the mobile device 4 through the input-output terminal 26b and the external I/F 26a, the control unit 21 stores the newly accumulated data in a predetermined area on the hard disk of the HDD 30 (step S11). Thus, the accumulated data such as image data and the like of the mobile device 4 mounted on the cradle 1 can be backed up to the HDD 30 of the server device 2 through the cradle 1.

Then proceeding to a process represented in FIG. 6, the server device 2 performs a process of identifying data to be erased, which process identifies data to be erased from among the pieces of image data stored in the image storing unit 44 of the mobile device 4 on the basis of the obtained newly accumulated data (step S12). Though details of the process of identifying data to be erased will be described later, the process checks added information added to each piece of image data as newly accumulated data, does not identify, as data to be erased, image data that can be estimated to be important because a deletion protection for preventing the deletion of the image data is added to the image data, a print marking indicating that the image data is information that needs to be printed is added to the image data, or when the number of times of use is updated, the number of times of use is a predetermined number or larger, and identifies other image data as data to be erased.

Thereafter the server device 2 forms an accumulated data erasure request for giving an instruction to erase the data identified as erasable data on the basis of the identifying process of step S12, and the transmission and reception controlling unit 27 controls the external I/F 26a to transmit the accumulated data erasure request (step S13).

This accumulated data erasure request is received in the cradle 1 through the input-output terminal 14b and the external I/F 14a, and is thereafter transmitted to the mobile device 4 through the radio communication unit 15a and the transmitting and receiving antenna 15b under control of the transmission and reception controlling unit 17.

After the mobile device 4 receives the accumulated data erasure request from the server device 2 through the transmitting and receiving antenna 45b and the radio communication unit 45a, the image erasure controlling unit 48 controls the image storing unit 44 to erase the image data designated to be erased from the image storing unit 44 (step S14).

After the erasure of the designated image data is completed, the control unit 41 of the mobile device 4 forms an erasing process completion report, and the erasing process completion report is then transmitted through the radio communication unit 45a and the transmitting and receiving antenna 45b under control of the transmission and reception controlling unit 47 (step S15).

This erasing process completion report is received in the cradle 1 through the transmitting and receiving antenna 15b and the radio communication unit 15a, and is thereafter transmitted to the server device 2 through the external I/F 14a and the input-output terminal 14b under control of the transmission and reception controlling unit 17.

After the server device 2 receives the erasing process completion report from the mobile device 4 through the input-output terminal 26b and the external I/F 26a, the write-back data generating unit 29 generates write-back data on the basis of the image data erased from the image storing unit 44 of the mobile device 4. In this case, the write-back data generating unit 29 of the server device 2 determines what write-back data to generate according to the device attribute of the mobile device 4, the classification of the processed accumulated data, a history of accumulation of accumulated data stored and retained in the server device 2, or an instruction input from a user.

Suppose in this case that a device attribute indicating that the mobile device 4 is a digital still camera is reported at the time of reporting the device ID in step S4. In this case, the write-back data generating unit 29 knows from the device attribute that the erased accumulated data is still image data. The write-back data generating unit 29 thus generates write-back data to be written back to the mobile device 4 by reducing the image data which is the erased accumulated data (step S16). In this case, the write-back data generating unit 29 forms image data having a size a few to a few ten times smaller than that of the original image data as write-back data.

The transmission and reception controlling unit 27 of the server device 2 then controls the external I/F 26a to transmit the write-back data to the mobile device 4 (step S17). This write-back data is received in the cradle 1 through the input-output terminal 14*b* and the external I/F 14*a*, and is thereafter transmitted to the mobile device 4 through the radio communication unit 15*a* and the transmitting and receiving antenna 15*b* under control of the transmission and reception controlling unit 17.

After the mobile device 4 receives the write-back data from the server device 2 through the transmitting and receiving antenna 45*b* and the radio communication unit 45*a*, the control unit 41 stores the received write-back data in the image storing unit 44 (step S18). As described above, this write-back data is a reduced image of the image data that was accumulated in the mobile device 4 and which has been erased after being backed up to the HDD 30 of the server device 2.

Thus, displaying the reduced image as the write-back data from the server device 2 on the display screen of the display unit 49 under control of the control unit 41 makes it possible to check which image has been erased after being backed up in the server device 2. When necessary, it is also possible to use the image data backed up in the server device 2, and record the image data in the image storing unit 44 of the mobile device 4 to be able to use the image data in the mobile device 4 again.

Then, after completing storing the write-back data in step S18, the control unit 41 of the mobile device 4 forms a storing completion report, and the storing completion report is transmitted through the radio communication unit 45*a* and the transmitting and receiving antenna 45*b* under control of the transmission and reception controlling unit 47 (step S19).

This storing completion report is received in the cradle 1 through the transmitting and receiving antenna 15*b* and the radio communication unit 15*a*, and is thereafter transmitted to the server device 2 through the external I/F 14*a* and the input-output terminal 14*b* under control of the transmission and reception controlling unit 17.

After the server device 2 receives the storing completion report through the input-output terminal 26*b* and the external I/F 26*a*, the control unit 21 of the server device 2 can recognize that data transmission and reception to and from the mobile device 4 newly mounted on the cradle 1 has been completed properly.

The cradle 1 thereafter performs a charging ending process (step S20). After the battery of the mobile device is fully charged and thereby the charging process is completed, the series of processes when the new mobile device is mounted on the cradle 1 is completed in the data communication system according to the present embodiment described with reference to FIG. 5 and FIG. 6.

Thus, in the data communication system according to the present embodiment, by only mounting a mobile device 4 on the cradle 1 connected to the server device 2, accumulated data accumulated in the mobile device 4 can be transmitted to the server device 2 via the cradle 1 and backed up to the HDD 30 of the server device 2.

In addition, by identifying erasable data to be erased from among the pieces of accumulated data backed up from the mobile device 4 and providing an accumulated data erasure request from the server device 2 to the mobile device 4 by functions of the server device 2, it is possible to organize storage areas of the image storing unit 44 in the mobile device 4 and thus make effective use of the image storing unit 44 in the mobile device 4.

It is further possible to generate write-back data to be written back to the mobile device 4 on the basis of the accumulated data backed up from the mobile device 4 to the server device 2 and erased from the mobile device 4, and write back the write-back data to the mobile device 4. As described above, when the accumulated data is still image data, the write-back data is a reduced image of the still image data, and is information including a smaller amount of data than the original accumulated data. The mobile device 4 can thereby manage the accumulated data erased after being backed up in the server device 2 without unnecessarily using a storage space of the image storing unit 44.

Further, when the mobile device 4 mounted on the cradle 1 does not have data to be backed up in the server device 2, in the process of step S16 shown in FIG. 6, new information that can be provided to the mobile device 4 may be formed to be provided to the mobile device 4. That is, when the mobile device 4 mounted on the cradle 1 does not have data to be backed up in the server device 2, the charging process and the write-back data providing process can be performed.

[Examples of Layout of Transmitted and Received Data]

Examples of layout of data exchanged between the devices in the data communication system according to the present embodiment described with reference to FIG. 5 and FIG. 6 will next be described.

[Example of Layout of Command Data]

FIGS. 7A, 7B, and 7C are diagrams illustrating an example of layout of command data and concrete examples thereof. As shown in FIG. 7A, command data transmitted and received between devices includes a "transmission destination ID", a "transmission source ID", "command information indicating the description or the like of a command or an instruction", "data necessary to execute the command or the instruction and data to be notified" and the like.

Figure 5:
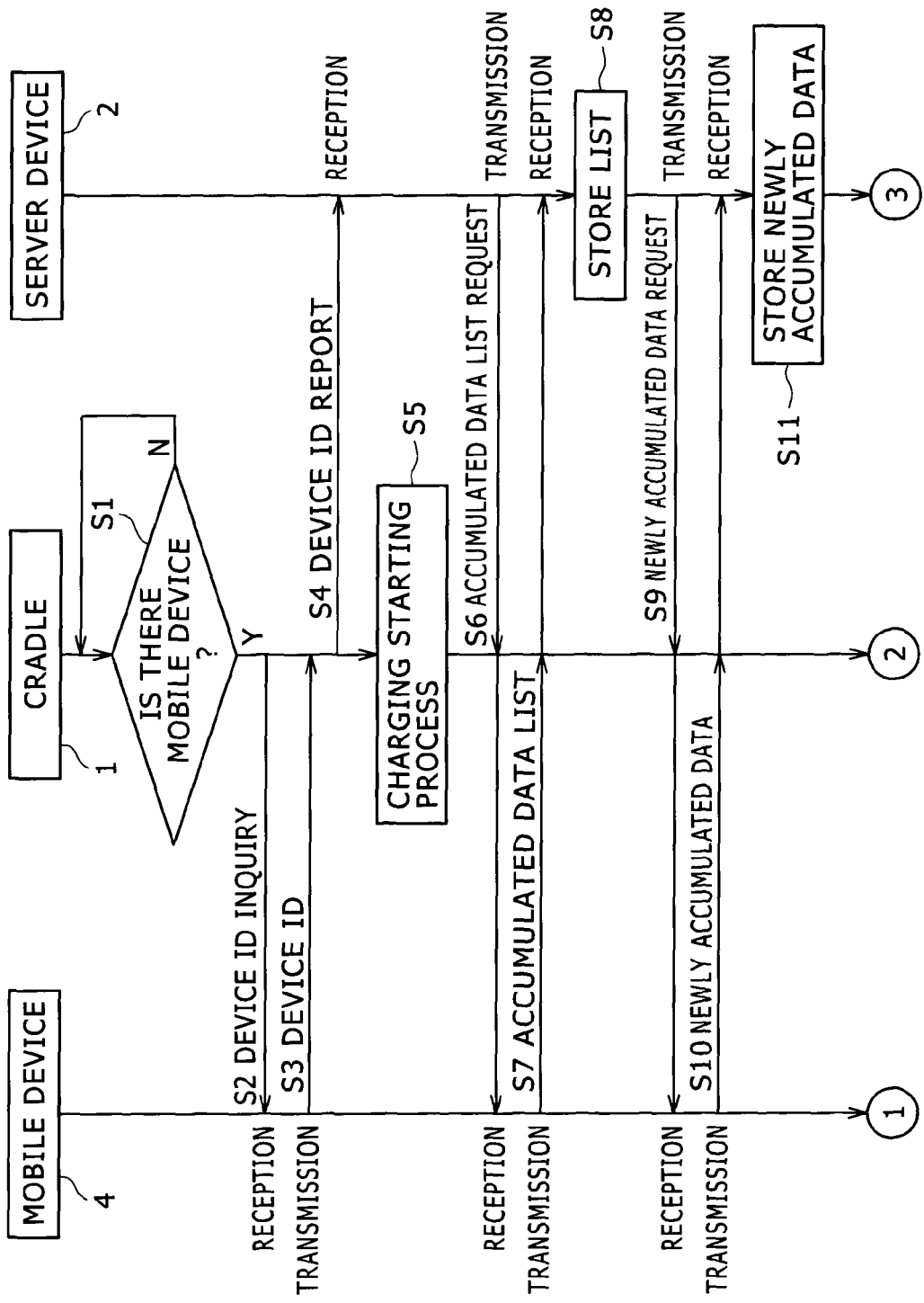
FIG. 5 is a timing chart illustrating the operation of the whole of the data communication system shown in FIG. 1.

FIG. 7B is a diagram illustrating an example of command data for the device ID inquiry transmitted from the cradle 1 to the newly mounted mobile device 4 in step S2 in the sequence chart of FIG. 5. As shown in FIG. 7B, in the device ID inquiry, "information indicating a yet-to-respond device" is entered as a transmission destination ID, the "device ID of the cradle 1" is entered as a transmission source ID, and "information indicating a device ID inquiry" is entered as information indicating the command.

In this case, the "information indicating the yet-to-respond device" indicates the device that has not communicated with the cradle 1 yet. When the device ID is expressed by five-digit alphanumeric characters, the "information indicating the yet-to-respond device" is predetermined information such as "00000" or the like. Of mobile devices that have received the "information indicating the yet-to-respond device", a mobile device without a history of communication with the cradle 1 determines that the mobile device itself is the yet-to-respond device, and performs a process corresponding to the transmitted command information, that is, the notification of the device ID in this example.

FIG. 7C is a diagram illustrating an example of the device ID response transmitted from the mobile device 4 to the cradle 1 in step S3 in the sequence chart of FIG. 5 after the mobile device 4 that is newly mounted on the cradle 1 and which has not communicated with the cradle 1 yet receives the device ID inquiry command shown in FIG. 7B.

As shown in FIG. 7C, in the device ID response, the "device ID of the cradle 1" is entered as a transmission destination ID, the "device ID of the mobile device 4" is entered as a transmission source ID, and "information indicating a device ID response" is entered as information indicating the command. The cradle 1 can be thereby informed of the device ID of the mobile device 4 by the transmission source ID.

In this example, a device attribute and other information are also notified from the mobile device 4 to the cradle 1 by the device ID response. As described above, the device attribute indicates a classification (kind) of the device and indicates whether the device is a digital still camera, a digital video camera, a portable telephone terminal or the like. This device attribute enables the cradle 1 to grasp what kind of mobile device the mobile device 4 is and what kind of data the mobile device 4 handles.

Further, in the sequence charts of FIG. 5 and FIG. 6, (1) the "device ID report" transmitted from the cradle 1 to the server device 2 in step S4, (2) the "accumulated data list request" transmitted from the server device 2 to the mobile device 4 in step S6, (3) the "newly accumulated data request" transmitted from the server device 2 to the mobile device 4 in step S9, (4) the "accumulated data erasure request" transmitted from the server device 2 to the mobile device 4 in step S13, (5) the "erasing process completion report" transmitted from the mobile device 4 to the server device 2 in step S15, and (6) the "storing completion report" transmitted from the mobile device 4 to the server device 2 in step S19 are each transmitted and received between the devices in the mode shown in FIGS. 7A to 7C, that is, the structure of the transmission destination ID, the transmission source ID, the command information, and other data.

[Example of Layout of Accumulated Data List]

FIG. 8 is a diagram illustrating an example of layout of the accumulated data list generated in the mobile device 4 and transmitted from the mobile device 4 to the server device 2 in step S7 shown in FIG. 5.

As shown in FIG. 8, the accumulated data list in this example has a transmission destination ID, a transmission source ID, a data attribute, and other information as header information of the accumulated data list as a whole. The transmission destination ID is the device ID of the device as a destination to which the accumulated data list is transmitted. The transmission source ID is the device ID of the mobile device 4 that transmits the accumulated data list. The data attribute indicates that this information as a whole forms the accumulated data list. The other information may be various information including for example date information such as a date and time of generation of the accumulated data list, a date and time of transmission of the accumulated data list, and the like.

Information composed of a data ID, a data attribute, a date and time of generation, data size, and other information is formed for each piece of information accumulated in the mobile device 4, and the whole of such information forms the accumulated data list. In this case, the data ID is information for identifying each piece of data, and specifically corresponds to the file name of each piece of data or the like. The data attribute is information indicating whether the data is still image data, moving image data, audio data, or text data, for example.

The date and time of generation is a date and time at which the accumulated data is generated, but widely includes a date and time at which the accumulated data is obtained by the mobile device. The data size is the size (volume) of the accumulated data. As the other information, various information including for example text data such as memo information accompanying each piece of accumulated data and the like can be added.

Such an accumulated data list is generated in the mobile device 4 according to the accumulated data list request from the server device 2, and is then transmitted from the mobile device 4 to the server device 2 in step S7 shown in FIG. 5.

Thereby the server device 2 can correctly grasp the information accumulated by the mobile device 4. Then, the server device 2 can identify the new accumulated data to be provided from the mobile device 4 on the basis of the dates and times of generation of the accumulated data from the mobile device 4 that has already been accumulated in the server device 2 and each piece of data in the accumulated data list newly provided from the mobile device 4.

[Example of Layout of Accumulated Data]

FIG. 9 is a diagram illustrating an example of layout of accumulated data. As shown in FIG. 9, the accumulated data is formed by a header information part and a real data part. The header information of the accumulated data in this example includes a device ID, a data ID, a data attribute, a date and time of generation, protection information, a print mark, data size, the number of times of use, and other information. In this case, the device ID is information identifying a device that accumulates the accumulated data. The data ID can uniquely identify the accumulated data.

The data attribute is information indicating the type of the data and indicating whether the accumulated data is still image data, moving image data, audio data or the like. The date and time of generation is information indicating a date and time of generation of the accumulated data. The protection information is flag information indicating whether or not to prevent the accumulated data from being deleted. The protection information is "on" when the accumulated data is to be protected from deletion, and is "off" when the accumulated data may be deleted.

The print mark is information corresponding to the above-described print marking, and is information specifying in advance that the accumulated data is to be printed. The data size indicates the size of the accumulated data. The number of times of use indicates the number of times that the accumulated data is used in the mobile device 4 which accumulates the accumulated data, and is updated each time the accumulated data is used. As the other information, various information including for example comment information on the accumulated data can be added.

Thus, in the present embodiment, the accumulated data accumulated in the mobile device 4 has a form in which real data is added to the header information having the various information. The real data is accumulated main data such as still image data, moving image data, audio data, text data or the like. In the present embodiment, the real data is still image data, for example.

Such accumulated data is transmitted from the mobile device 4 to the server device 2 in response to the newly accumulated data request in step S9 in FIG. 5. The newly accumulated data request transmitted from the server device 2 to the mobile device 4 in step S9 in FIG. 5 has a transmission destination ID, a transmission source ID, and command information indicating the newly accumulated data request as described with reference to FIG. 7A, and includes the data ID of accumulated data desired to be provided, information indicating a date and time of generation of accumulated data desired to be provided, or the like as other information.

Further, when the accumulated data desired to be provided is specified by the data ID, and there are a plurality of pieces of accumulated data desired to be provided, it suffices to include the data IDs of all the accumulated data desired to be provided in the command data, and transmit the command data to the mobile device 4. In addition, information specifying a date and time of generation of accumulated data desired to be provided can specify a specific single day, or can specify dates and times of generation by a range, for example "a start date and time to an end date and time".

In response to such a newly accumulated data request from the server device 2 to the mobile device 4, the mobile device 4 extracts the accumulated data requested to be provided from the accumulated data accumulated in for example the image storing unit 44 of the mobile device in the mode shown in FIG. 9, and then transmits the accumulated data requested to be provided to the server device 2 in step S10 shown in FIG. 5.

[Example of Layout of Write-Back Data]

FIG. 10 is a diagram illustrating an example of layout of the write-back data generated in step S16 in the sequence chart of FIG. 6 and then transmitted from the server device 2 to the mobile device 4 in step S17. As shown in FIG. 10, the write-back data is formed by a header information part and a write-back data part.

The header information of the write-back data in this example includes a data ID, a data attribute, a date and time of generation, data size, a providing destination, an original data ID, a date and time of generation of original data, original data size, and other information. In this case, the data ID can uniquely identify the write-back data. The data attribute is information indicating the type of the write-back data and indicating whether the write-back data is still image data, moving image data, audio data or the like. The date and time of generation is information indicating a date and time of generation of the write-back data in the server device 2.

The data size indicates the size of the write-back data. As the providing destination, the device ID of the device to which the write-back data is provided is entered. In the present embodiment, the write-back data is returned to the mobile device 4 that has provided accumulated data to the server device 2. The original data ID is data identifying the original data of the write-back data. The date and time of generation of the original data is data indicating the date and time of generation of the original data. The original data size is information indicating the size of the original data. As the other information, various information including for example comment information on the write-back data can be added.

Thus, in the present embodiment, the write-back data formed in the server device 2 and returned to the mobile device 4 has a form in which the write-back data is added to the header information having the various information. In this case, the write-back data is formed according to various accumulated data provided from the mobile device 4 to the server device 2.

In the present embodiment, the accumulated data provided from the mobile device 4 to the server device 2 is still image data, as described above, and the server device 2 forms and returns reduced image data of the still image data provided to the server device 2 as the write-back data to be provided to the mobile device 4.

Thus, as described above, the still image data as accumulated data transmitted from the mobile device 4 to the server device 2 and backed up in the server device 2 is erased according to the accumulated data erasure request supplied from the server device 2 to the mobile device 4 in step S13 shown in FIG. 6.

However, the still image data erased after being backed up in the server device 2 is returned as reduced image data from the server device 2 to the mobile device 4. The mobile device 4 can thereby manage the accumulated data erased after being backed up in the server device 2 without unnecessarily using a storage space of the image storing unit 44.

[Example of Layout of Write-Back History]

FIG. 11 is a diagram illustrating an example of layout of a write-back history formed on for example the HDD 30 of the server device 2 when the server device 2 generates the write-back data described with reference to FIG. 10 and writes back the write-back data to the mobile device 4. As shown in FIG. 11, the write-back history in this example includes a write-back date and time, a write-back destination, a data ID, a data attribute, a date and time of generation, data size, and other information.

In this case, the write-back date and time is information indicating a date and time when write-back data is generated and provided to a destination electronic device. The write-back destination is information such as a device ID or the like identifying the destination electronic device to which the generated write-back data has been provided. The data ID is the data ID of the provided write-back data. The data attribute is information indicating the type of the write-back data and indicating whether the write-back data is still image data, moving image data, audio data or the like.

The date and time of generation is information indicating a date and time of generation of the write-back data. The data size indicates the size of the write-back data. As the other information, various information such as a comment about the write-back data and the like can be added.

The write-back history as shown in FIG. 11 is stored and retained by the server device 2. Thereby the server device 2 can correctly grasp when write-back data having what kind of data attribute was generated and when the write-back data was written back to which electronic device.

[Operation of Devices Forming Data Communication System]

Detailed description will next be made of operation of each of devices forming the data communication system according to the present embodiment described with reference to FIGS. 1 to 11. In the following, the operation of each device will be described in detail in order of the cradle 1 positioned at the center of the data communication system according to the present embodiment, the server device 2 managing data via the cradle 1, and a mobile device 4 mounted on the cradle 1. Further, suppose that the mobile device 4 is a digital still camera, as described above.

[Process of Cradle 1]

Figure 12:
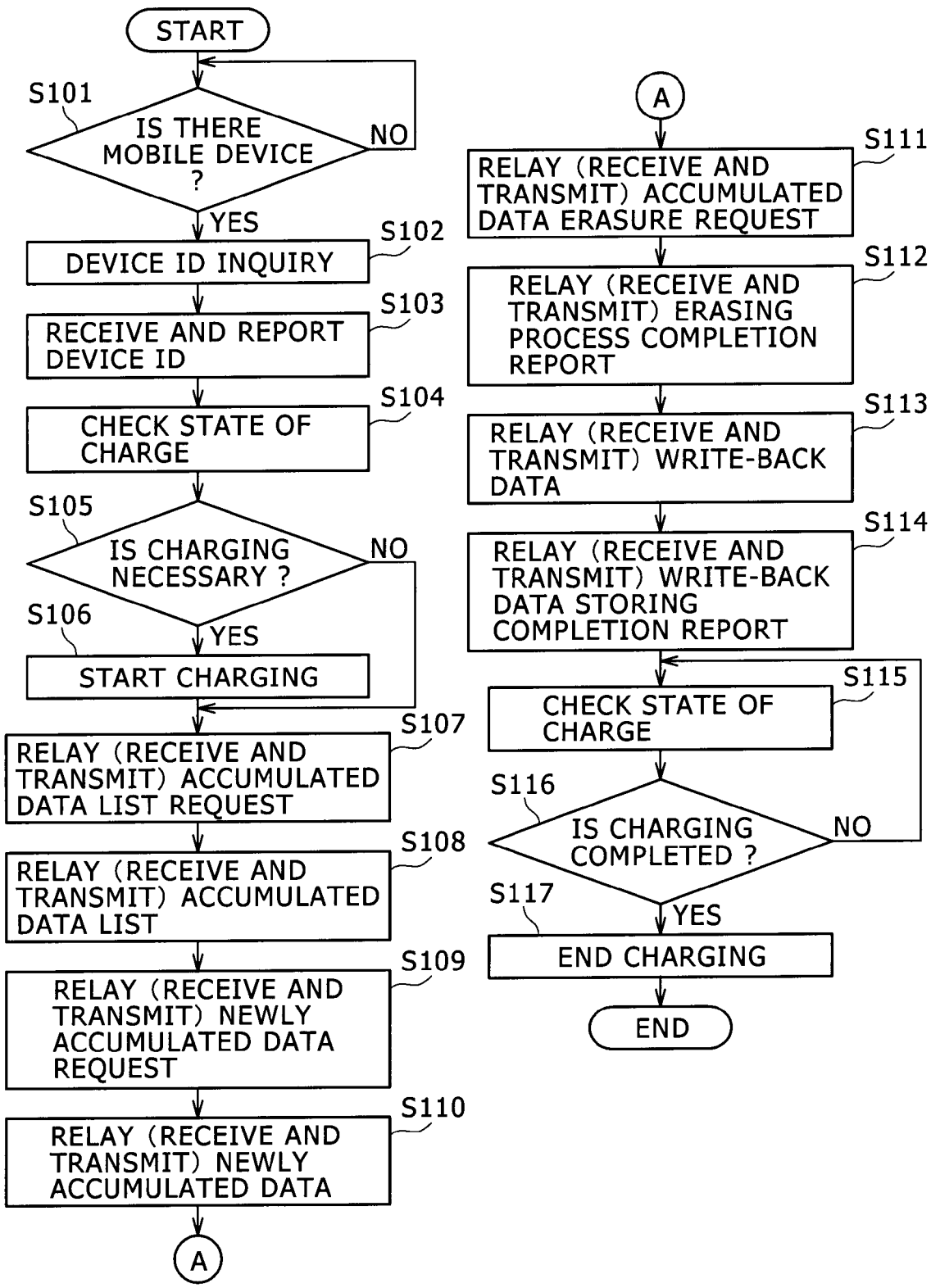
FIG. 12 is a flowchart illustrating a process performed at the cradle.

FIG. 12 is a flowchart illustrating a process performed at the cradle 1 in the data communication system according to the present embodiment. The process represented in FIG. 12 is performed mainly by the control unit 11 and the transmission and reception controlling unit 17 when the cradle 1 is in a state of power to the cradle 1 being on. Further, as described above, a plurality of mobile devices can be simultaneously mounted on the cradle 1 in the present embodiment, and the process represented in FIG. 12 can be performed for a maximum number of mobile devices mountable on the cradle 1 by so-called multitasking.

When the power is turned on, the control unit 11 of the cradle 1 controls the mounting detecting unit 16 to start mobile device mounting detection and determines whether a mobile device is mounted on the cradle 1 (step S101). When it is determined in the determination process of step S101 that the mobile device is not mounted, the control unit 11 repeats the mobile device mounting detection, and waits for the mobile device to be mounted.

When it is determined in the determination process of step S101 that the mobile device is mounted, the control unit 11 forms device ID inquiry command data described with reference to FIG. 7B, and the transmission and reception controlling unit 17 controls the radio communication unit 15a and the transmitting and receiving antenna 15b to transmit the device ID inquiry command data to the newly mounted mobile device 4 through the radio communication unit 15a and the transmitting and receiving antenna 15b (step S102).

Next, the transmission and reception controlling unit 17 of the cradle 1 receives a device ID response described with reference to FIG. 7C from the mobile device 4 through the transmitting and receiving antenna 15*b* and the radio communication unit 15*a*, and then reports the device ID response to the server device 2 through the external I/F 14*a* and the input-output terminal 14*b* (step S103).

Next, the control unit 11 controls the charging controlling unit 19 to check whether the newly mounted mobile device 4 should be charged (step S104). The process of step S104 can be performed by an electrical detection process such as detecting the voltage of the battery of the mobile device 4, for example.

The control unit 11 then determines on the basis of a check result of step S104 whether the newly mounted mobile device 4 should be charged (step S105). When the control unit 11 determines that the newly mounted mobile device 4 should be charged, the control unit 11 controls the charging controlling unit 19 to start charging the battery of the newly mounted mobile device 4 (step S106). When the control unit 11 determines in the determination process of step S105 that the newly mounted mobile device 4 does not need to be charged, the control unit 11 proceeds to a process of step S107.

After the process of step S106 or when the control unit 11 determines in the determination process of step S105 that the newly mounted mobile device 4 does not need to be charged, the following series of relaying processes is performed. First, the transmission and reception controlling unit 17 receives an accumulated data list request from the server device 2 through the input-output terminal 14*b* and the external I/F 14*a*, and then transmits the accumulated data list request to the mobile device 4 through the radio communication unit 15*a* and the transmitting and receiving antenna 15*b* (step S107).

Next, the transmission and reception controlling unit 17 receives an accumulated data list from the mobile device 4 through the transmitting and receiving antenna 15*b* and the radio communication unit 15*a*, and then transmits the accumulated data list to the server device 2 through the external I/F 14*a* and the input-output terminal 14*b* (step S108). Next, the transmission and reception controlling unit 17 receives a newly accumulated data request from the server device 2 through the input-output terminal 14*b* and the external I/F 14*a*, and then transmits the newly accumulated data request to the mobile device 4 through the radio communication unit 15*a* and the transmitting and receiving antenna 15*b* (step S109).

Next, the transmission and reception controlling unit 17 receives newly accumulated data from the mobile device 4 through the transmitting and receiving antenna 15*b* and the radio communication unit 15*a*, and then transmits the newly accumulated data to the server device 2 through the external I/F 14*a* and the input-output terminal 14*b* (step S110). Next, the transmission and reception controlling unit 17 receives an accumulated data erasure request from the server device 2 through the input-output terminal 14*b* and the external I/F 14*a*, and then transmits the accumulated data erasure request to the mobile device 4 through the radio communication unit 15*a* and the transmitting and receiving antenna 15*b* (step S111).

Next, the transmission and reception controlling unit 17 receives an erasing process completion report from the mobile device 4 through the transmitting and receiving antenna 15*b* and the radio communication unit 15*a*, and then transmits the erasing process completion report to the server device 2 through the external I/F 14*a* and the input-output terminal 14*b* (step S12). Next, the transmission and reception controlling unit 17 receives write-back data from the server device 2 through the input-output terminal 14*b* and the external I/F 14*a*, and then transmits the write-back data to the mobile device 4 through the radio communication unit 15*a* and the transmitting and receiving antenna 15*b* (step S113).

Then, the transmission and reception controlling unit 17 receives a write-back data storing completion report from the mobile device 4 through the transmitting and receiving antenna 15*b* and the radio communication unit 15*a*, and then transmits the write-back data storing completion report to the server device 2 through the external I/F 14*a* and the input-output terminal 14*b* (step S114). Thus, the series of relaying processes between the server device 2 and the mobile device 4 is performed by the processes of steps S107 to S114.

Further, there may be a large number of pieces of accumulated data or write-back data to be relayed in the accumulated data relaying process of step S110 or the write-back data relaying process of step S113, and thus a process of transferring a large number of pieces of data may of course be performed in step S110 or step S113.

Then, the control unit 11 of the cradle 1 controls the charging controlling unit 19 to check a state of charge of the battery in the mobile device 4 (step S115). The control unit 11 thereby checks whether the charging of the mobile device 4 is completed (step S116). When the control unit 11 determines in the check process of step S116 that the charging of the mobile device 4 has not been completed yet, the control unit 11 repeats the process from step S115 to continue the charging process. When the control unit 11 determines in the check process of step S116 that the charging of the mobile device 4 has been completed, the control unit 11 performs a predetermined process for ending the charging of the mobile device 4 (step S117). Then the process represented in FIG. 12 is ended.

Further, in the example represented in FIG. 12, the state of charge is checked in step S115, and whether the charging of the mobile device 4 is completed is determined in step S116. However, the present invention is not limited to this. Whether the mobile device 4 should be charged is determined in the determination process of step S105, and the charging process is not performed when the mobile device 4 does not need to be charged. It is therefore possible to determine whether the charging process is being performed (whether power is being supplied to the mobile device 4) before checking the state of charge in step S115, and end the process represented in FIG. 12 without performing the process of steps S115 to S117 when it is determined that the charging process is not being performed.

[Process of Server Device 2]

Figure 13:
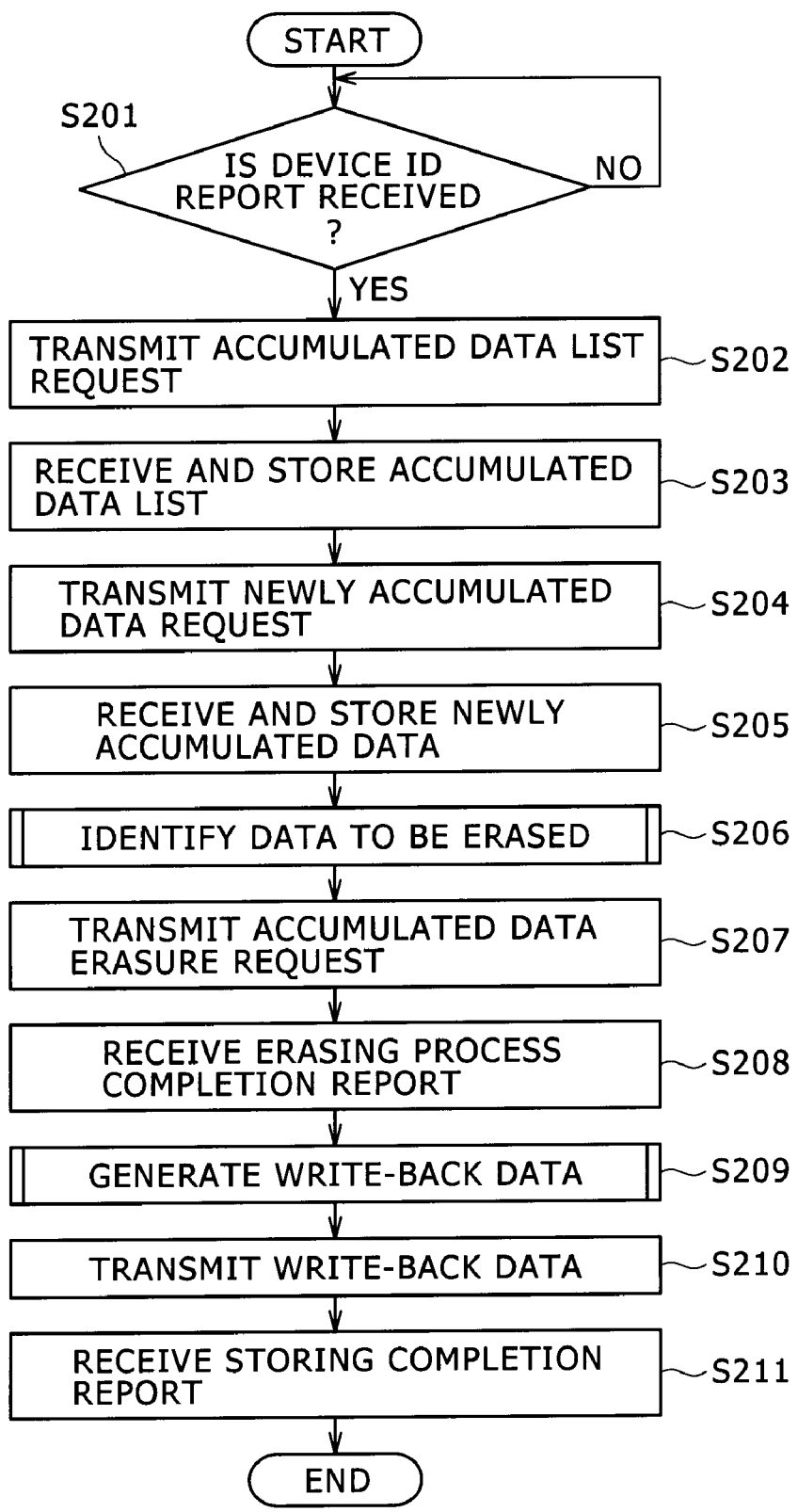
FIG. 13 is a flowchart illustrating a process performed at the server device.

FIG. 13 is a flowchart illustrating a process performed at the server device 2 in the data communication system according to the present embodiment. The process represented in FIG. 13 is performed mainly by the control unit 21 and the transmission and reception controlling unit 27 when the server device 2 is in a state of power to the server device 2 being on.

When the power is turned on, the transmission and reception controlling unit 27 of the server device 2 determines whether the device ID of the mobile device mounted on the cradle 1 is received from the cradle 1 through the input-output terminal 26*b* and the external I/F 26*a* (step S201). When the transmission and reception controlling unit 27 determines in the determination process of step S201 that the device ID has not been received yet, the transmission and reception controlling unit 27 repeats the process from step S201, and waits to receive the device ID of the mobile device mounted on the cradle 1.

When the transmission and reception controlling unit 27 determines in the determination process of step S201 that the device ID is received from the cradle 1, it is shown that the mobile device 4 is newly mounted on the cradle 1. Thus, the control unit 21 generates an accumulated data list request, and the transmission and reception controlling unit 27 transmits the accumulated data list request through the external I/F 26*a* and the input-output terminal 26*b*, so that the accumulated data list request is transmitted to the mobile device 4 newly mounted on the cradle 1 via the cradle 1 (step S202).

Next, the transmission and reception controlling unit 27 receives an accumulated data list transmitted via the cradle 1 through the input-output terminal 26*b* and the external I/F 26*a*, and then stores the accumulated data list in a predetermined area of the HDD 30, for example (step S203). Then, the control unit 21 identifies accumulated data that has not been provided from the mobile device 4 on the basis of the accumulated data list stored in step S203 and accumulated data that has been provided in the past from the mobile device 4 and stored, and forms a newly accumulated data request to request the provision of the identified accumulated data. The transmission and reception controlling unit 27 transmits the newly accumulated data request through the external I/F 26*a* to transmit the newly accumulated data request to the mobile device 4 mounted on the cradle 1 via the cradle 1 (step S204).

Next, the transmission and reception controlling unit 27 receives newly accumulated data transmitted via the cradle 1 through the input-output terminal 26*b* and the external I/F 26*a*, and then stores the newly accumulated data in a predetermined area of the HDD 30, for example (step S205). Further, a plurality of pieces of newly accumulated data may be transmitted from the mobile device 4. In step S205, the newly accumulated data from the mobile device 4 can be sequentially received and stored in a predetermined area of the HDD 30.

Then, the control unit 21 of the server device 2 performs a process of identifying data to be erased, which data is accumulated data erasable from the mobile device 4, of the accumulated data from the mobile device 4 which accumulated data is stored in the predetermined area of the HDD 30 (step S206). As will be described later in detail, the process of identifying the data to be erased estimates whether accumulated data is important on the basis of information added to the stored accumulated data to be identified or by analyzing the accumulated data, and does not identify the accumulated data estimated to be important but identifies other accumulated data as data to be erased.

Then, the control unit 21 of the server device 2 forms an accumulated data erasure request to erase the data to be erased which data is identified in step S205 from the image storing unit 44 of the mobile device 4, and the accumulated data erasure request is transmitted through the external I/F 26*a* and the input-output terminal 26*b* under control of the transmission and reception controlling unit 27 to be transmitted to the mobile device 4 via the cradle 1 (step S207).

Next, the transmission and reception controlling unit 27 of the server device 2 receives an erasing process completion report transmitted from the destination mobile device 4, to which the accumulated data erasure request has been transmitted, through the input-output terminal 26*b* and the external I/F 26*a* (step S208). Thereafter, as will be described later in detail, the control unit 21 of the server device 2 generates write-back data to be written back to the mobile device 4 in a different form from the accumulated data that has been provided from the mobile device 4, stored on the HDD 30, and erased from the mobile device 4 (step S209).

Then, the transmission and reception controlling unit 27 of the server device 2 transmits the write-back data generated in step S209 through the external I/F 26*a* and the input-output terminal 26*b* to transmit the write-back data to the mobile device 4 via the cradle 1 (step S210). Thereafter, the transmission and reception controlling unit 27 of the server device 2 receives a write-back data storing completion report transmitted from the mobile device 4 via the cradle 1 through the input-output terminal 26*b* and the external I/F 26*a* (step S211). Then the process represented in FIG. 13 is ended.

Further, the above description has been made by taking as an example a case where the communication processes are performed without any problem. However, when some request is transmitted from the server device 2 to the mobile device 4 but there is no response, for example, the request can be transmitted again or a response request can be transmitted.

For example, when the erasing process completion report is not received within a predetermined time in step S208, a request to check whether the accumulated data erasing process has been performed can be transmitted. When the storing completion report is not received within a predetermined time in step S211, a request to check whether the write-back data has been stored can be transmitted. Then an appropriate process can be performed by retransmitting the original request according to the response, for example.

In addition, when there is no accumulated data to be backed up, it is possible to end the series of processes, or provide newly available content data and then end the series of processes.

[Process of Identifying Data to be Erased]

Figure 14:
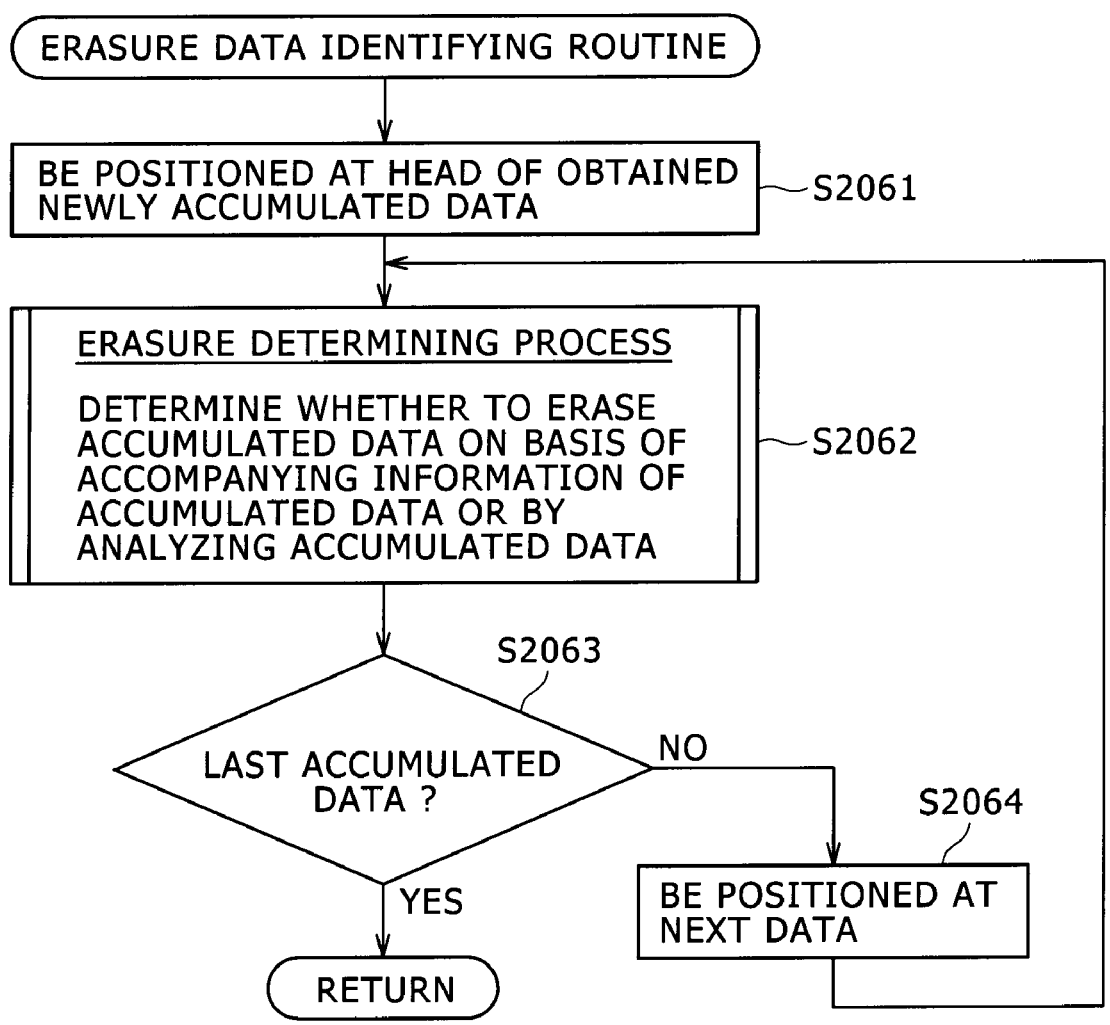
FIG. 14 is a flowchart illustrating a process of identifying data to be erased which process is performed in FIG. 13.

The process of identifying data to be erased which process is performed in step S206 of the process represented in FIG. 13 will next be described. FIG. 14 is a flowchart illustrating the process of identifying data to be erased which process is performed in step S206 of the process represented in FIG. 13. This process represented in FIG. 14 is performed in the control unit 21 of the server device 2.

First, the control unit 21 is positioned at the head of the series of pieces of newly accumulated data obtained in step S205 shown in FIG. 13 (step S2061). The control unit 21 then performs a process of determining whether the newly accumulated data at which the control unit 21 is positioned is to be erased (step S2062). As will be described later in detail, the process of step S2062 determines whether the newly accumulated data is to be erased on the basis of accompanying information of the newly accumulated data or by analyzing the newly accumulated data.

The control unit 21 thereafter determines whether the newly accumulated data subjected to the erasure determination process this time is last newly accumulated data obtained and stored in step S205 (step S2063). That is, the determination process of step S2063 determines whether the erasure determination process on all the newly accumulated data obtained in step S205 has been completed.

When the control unit 21 determines in the determination process of step S2063 that the erasure determination process has not been performed on all the newly accumulated data, the control unit 21 is positioned at next newly accumulated data (sets the next newly accumulated data as data to be processed) (step S2064), and repeats the process from step S2062. When the control unit 21 determines in the determination process of step S2063 that the erasure determination process has been performed on all the newly accumulated data, the control unit 21 ends the process represented in FIG. 14, and returns to the process represented in FIG. 13 to perform the process from step S207.

Figure 15:
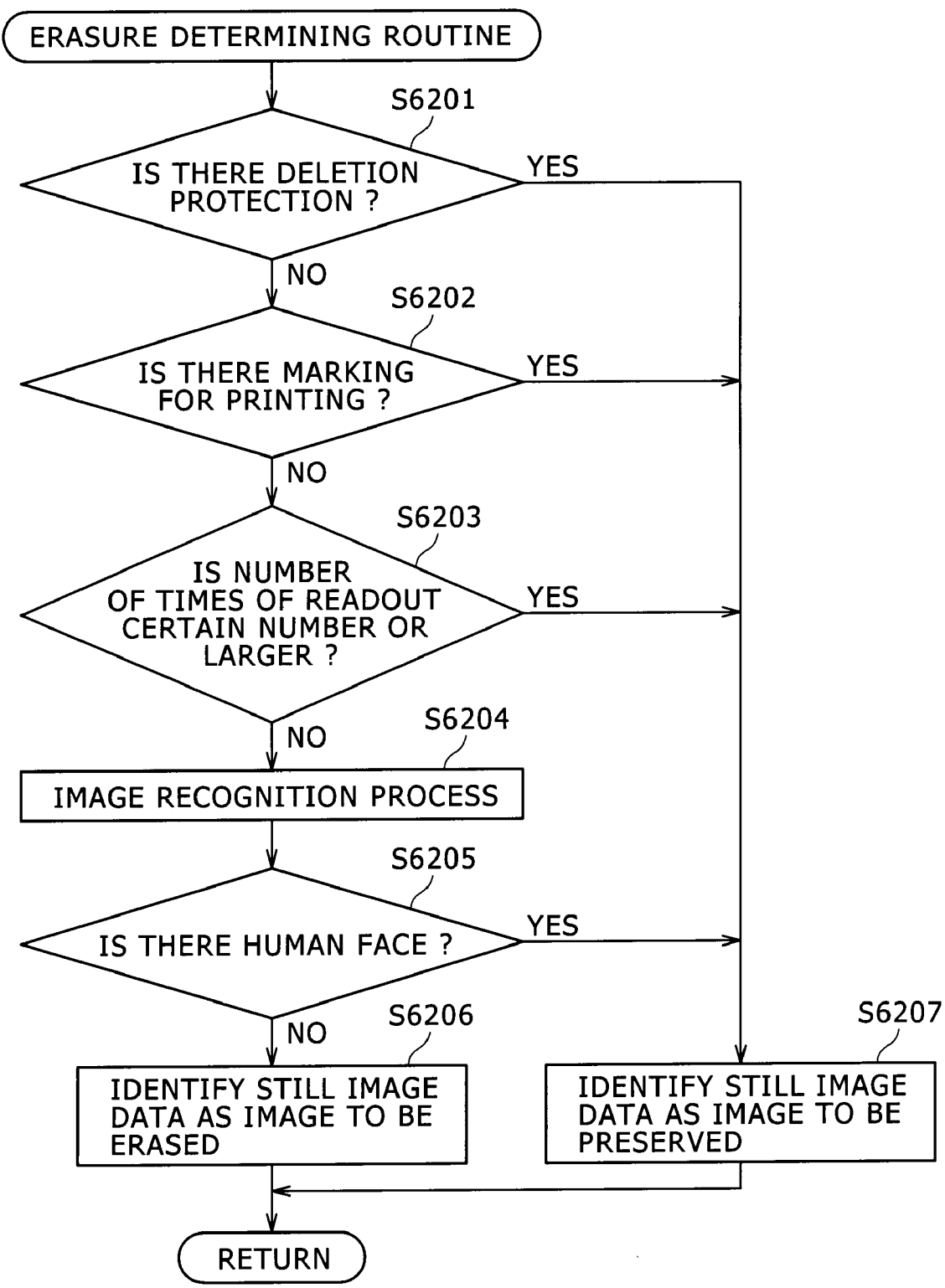
FIG. 15 is a flowchart illustrating an erasure determination process performed on each piece of newly accumulated data in FIG. 14.

The erasure determination process performed in step S2062 in FIG. 14 will next be described concretely. FIG. 15 is a flowchart illustrating the erasure determination process performed on each piece of newly accumulated data in step S2062 shown in FIG. 14. Description will be made supposing that the mobile device 4 mounted on the cradle 1 is a digital still camera, as described above, and that the accumulated data provided from the mobile device 4 to the server device 2 is still image data.

The control unit 21 of the server device 2 checks the information of the header part of the newly accumulated data subjected to the determination process. Specifically, the accumulated data as still image data supplied from the mobile device 4 to the server device 2 has the layout described with reference to FIG. 9. The control unit 21 first checks protection information in the header part to determine whether a deletion protection is provided (whether the protection information is on) (step S6201).

When the control unit 21 determines in the determination process of step S6201 that the deletion protection is not provided, the control unit 21 checks a print mark in the header part to determine whether there is a print marking (step S6202). When the control unit 21 determines in the determination process of step S6202 that there is no print marking, the control unit 21 checks the number of times of use in the header part to determine whether the number of times of readout (the number of times of use) is a certain number determined in advance or larger (step S6203).

When the control unit 21 determines in the determination process of step S6203 that the number of times of readout is not the certain number or larger, the control unit 21 performs an image recognition process on the still image data of the accumulated data (step S6204). The image recognition process of step S6204 performs contour recognition, color recognition and the like on the still image data being processed to determine whether the still image data includes an image of a person.

Then, the control unit 21 determines whether the still image data being processed includes the face of a person on the basis of a result of the image recognition process of step S6204 (step S6205). When the control unit 21 determines in the determination process of step S6205 that the accumulated data (still image data) being processed does not include the face of a person, the control unit 21 estimates that the accumulated data (still image data) is not important information, and identifies the still image data as an image to be erased (step S6206). The control unit 21 ends the process represented in FIG. 15, and then performs the process from step S2063 in the process represented in FIG. 14.

When the control unit 21 determines in the determination process of step S6201 that a deletion protection is provided, when the control unit 21 determines in the determination process of step S6202 that there is a print marking, when the control unit 21 determines in the determination process of step S6203 that the number of times of readout is the certain number or larger, and when the control unit 21 determines in the determination process of step S6205 that the accumulated data (still image data) being processed includes the face of a person, the control unit 21 estimates that the newly accumulated data being processed is important information, and identifies the newly accumulated data as an image to be preserved (step S6207). The control unit 21 ends the process represented in FIG. 15, and then performs the process from step S2063 in the process represented in FIG. 14.

That is, when a deletion protection is provided for the newly accumulated data being processed, the newly accumulated data being processed can be judged to be so important that the user does not want the newly accumulated data to be deleted. In addition, the newly accumulated data provided with a print marking to be printed can be judged to be so important that the newly accumulated data should be printed without fail.

Further, when the number of times of use indicates that the accumulated data has been used a certain number of times or more, the accumulated data can be judged to be important accumulated data used with high frequency. Still image data is often obtained by photographing a person for a purpose of leaving a memento or the like. Accordingly, the image recognition process is performed on still image data as accumulated data to determine that the still image data judged to include the face of a person is also important accumulated data.

Thus, as described above, when the accumulated data being processed is estimated to be important in one of the determination processes shown in FIG. 15, the accumulated data is identified as data to be preserved. When the accumulated data being processed is not estimated to be important in any of the determination processes shown in FIG. 15, the accumulated data is identified as data to be erased.

Thus, in step S206 in FIG. 13, data to be erased is identified through the processes described with reference to the flowcharts of FIG. 14 and FIG. 15. The identified data to be erased is erased from the mobile device 4 to make effective use of storage space of the image storing unit 44 in the mobile device 4.

[Write-Back Data Generating Process]

Figure 16:
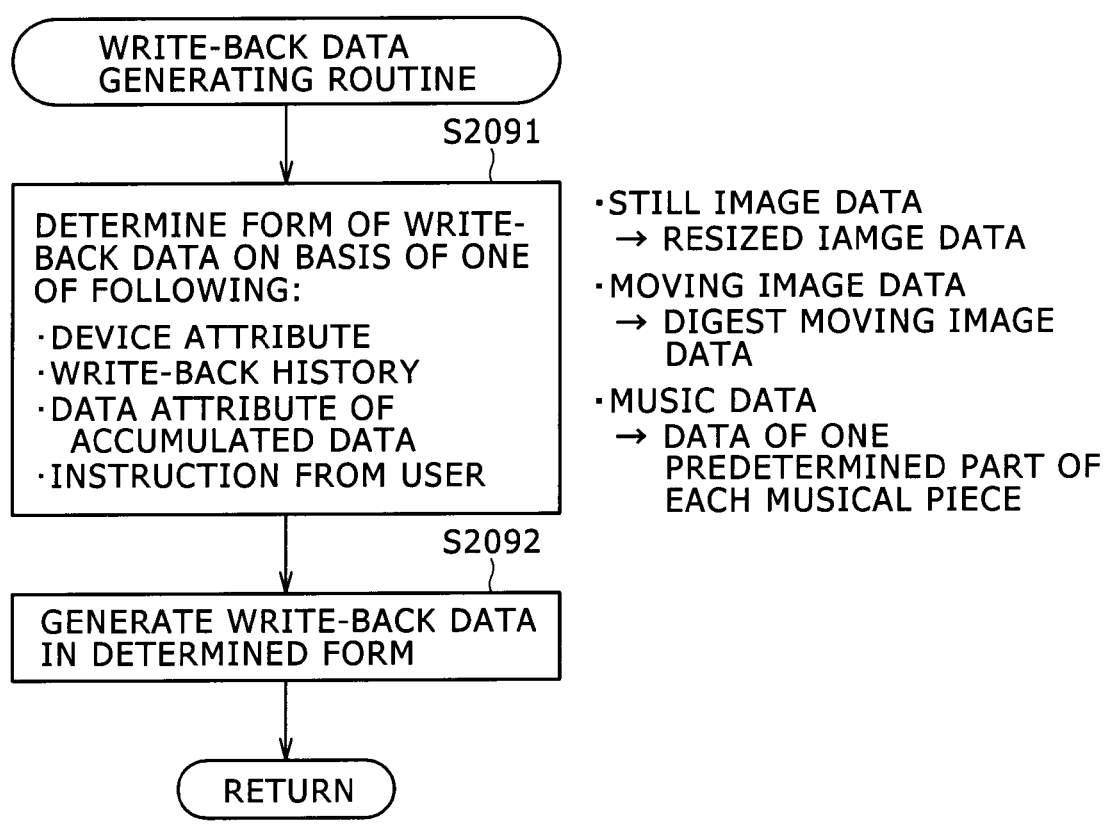
FIG. 16 is a diagram illustrating a write-back data generating process performed in FIG. 13.

The write-back data generating process performed in step S209 of the process represented in FIG. 13 will next be described. FIG. 16 is a diagram illustrating the write-back data generating process performed in step S209 in FIG. 13.

As described above, a form in which to generate write-back data is to be determined in step S209 shown in FIG. 13. Thus, the control unit 21 of the server device 2 in the present embodiment performs the process represented in FIG. 16, and first determines the form of the write-back data (step S2091).

In this case, as shown in FIG. 16, the control unit 21 of the server device 2 determines the form of the write-back data on the basis of the device attribute included in the device ID response transmitted via the cradle 1 or on the basis of the write-back history formed as shown in FIG. 11 or on the basis of the data attribute of the newly accumulated data provided to the server device 2 or on the basis of an instruction input from the user.

Specifically, as described above, the device attribute is information indicating the type of the mobile device 4 and indicating whether the mobile device 4 mounted on the cradle 1 is a digital still camera, a digital video camera, a portable type music reproducing device or the like. Accordingly, when the device attribute of the mobile device 4 indicates that the mobile device 4 is a digital still camera, it can be determined that a reduced image of still image data is to be used as write-back data.

When the device attribute of the mobile device 4 indicates that the mobile device 4 is a digital video camera, it can be determined that a digest version of moving image data is to be used as write-back data. When the device attribute of the mobile device 4 indicates that the mobile device 4 is a portable type music reproducing device, it can be determined that data formed by extracting a part of music data is to be used as write-back data.

Of course, there is a mobile device such a portable telephone terminal that can store and retain any of still image data, moving image data, and audio data as accumulated data, there is a mobile device that is a digital still camera but is able to handle moving image data, and there is a mobile device that is a digital video camera but is able to handle still image data.

Accordingly, when write-back data has already transferred and written back to the mobile device 4 to which to provide the write-back data, the write-back history as shown in FIG.

11 is generated, and therefore the form of the write-back data can be determined on the basis of the data attribute of the write-back history.

That is, the write-back history information indicates what write-back data was written back to which mobile device when. Thus, when the mobile device as a write-back destination is identified, the form of the write-back data can be determined on the basis of the data attribute of the write-back data that was transferred to the mobile device.

Thus, when the data attribute of the write-back history indicates still image data, it can be determined that a reduced image of the still image data is to be used as write-back data. When the data attribute of the write-back history indicates moving image data, it can be determined that a digest version of the moving image data is to be used as write-back data. When the data attribute of the write-back history indicates music data, it can be determined that data formed by extracting a part of the music data is to be used as write-back data.

In addition, the form of the write-back data can be determined according to the data attribute of accumulated data accumulated in the mobile device 4. Specifically, when the accumulated data attribute indicates still image data, it can be determined that a reduced image of the still image data is to be used as write-back data. When the accumulated data attribute indicates moving image data, it can be determined that a digest version of the moving image data is to be used as write-back data. When the accumulated data attribute indicates music data, it can be determined that data formed by extracting a part of the music data is to be used as write-back data.

In this case, an inquiry about the data attribute of the accumulated data accumulated in the mobile device 4 may be sent from the server device 2 to the mobile device 4 via the cradle 1, or the data attribute of the newly accumulated data already provided from the mobile device 4 may be used.

In addition, the form of the write-back data can be determined according to an instruction input received from the user through the operating unit 23 or the remote control 25. Specifically, a write-back data form selecting input screen is displayed on a monitor receiver connected to the server device 2 by operating the operating unit 23 or the remote control 25, and write-back data form selecting input is performed through the write-back data form selecting input screen and the operating unit 23 or the remote control 25. The control unit 21 may determine the form of the write-back data on the basis of the thus input write-back data form.

After determining the form of the write-back data in step S2091, the control unit 21 generates write-back data in the form determined in step S2091 (step S2092). As described above, the write-back data in the present embodiment is generated in the form changed from that of the accumulated data provided from the mobile device 4, stored on the HDD 30, and erased from the mobile device 4.

[Other Examples of Write-Back Data]

Further, in the present embodiment, description has been made supposing that the write-back data is formed from the accumulated data provided from the mobile device 4, stored on the HDD 30, and erased from the mobile device 4. However, the present invention is not limited to this. There are cases where the mobile device 4 does not have any accumulated data, and there are cases where accumulated data is originally present in the server device and therefore the accumulated data is not backed up when the mobile device is a portable music reproducing device or the like.

In such cases, write-back data cannot be formed from accumulated data provided from the mobile device 4 to the server device 2. Accordingly, for example, a thumbnail image of content data that has become newly usable in the mobile device 4, a digest version of moving image data, a trial listening version of music data, or the like may be provided as write-back data.

That is, when the server device 2 is not provided with accumulated data from the mobile device 4, it is possible to determine the form of providing data to be provided to the mobile device according to the write-back data form determined in step S2091, and provide the providing data in the determined form as write-back data.

For example, when the form of the write-back data to be provided to the mobile device 4 is resized image data as a result of the process of step S2091, it is possible to form a reduced image of still image data newly obtained through the Internet or the like, and provide the reduced image to the mobile device 4. When the form of the write-back data to be provided to the mobile device 4 is a digest version of moving image data, it is possible to form a digest version of moving image data newly obtained through the Internet or the like, and provide the digest version of the moving image data to the mobile device 4. When the form of the write-back data to be provided to the mobile device 4 is data of a part of music data, that is, a trial listening version of music data, it is possible to provide a trial listening version of music data newly obtained through the Internet or the like to the mobile device 4.

Thus, the write-back data from the server device 2 to the mobile device 4 is not limited to data formed on the basis of accumulated data provided from the mobile device 4, but data that can be provided, data formed from data that can be provided, and the like can also be provided as write-back data to the mobile device 4.

[Process of Mobile Device 4]

Figure 17:
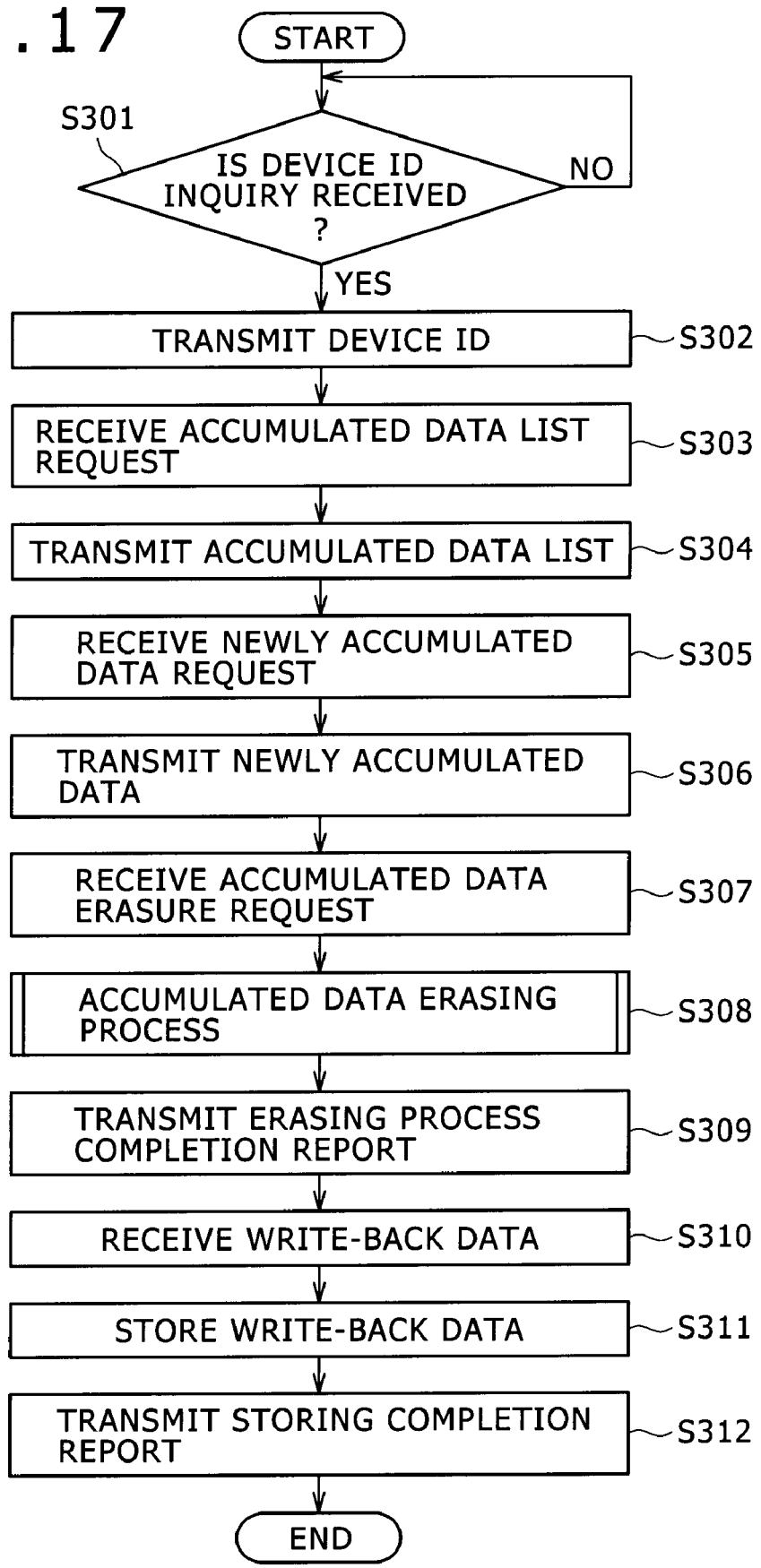
FIG. 17 is a flowchart illustrating a process performed at the mobile device.

FIG. 17 is a flowchart illustrating a process performed at the mobile device 4 in the data communication system according to the present embodiment. The process represented in FIG. 17 is performed mainly by the control unit 41, the transmission and reception controlling unit 47, and the image erasure controlling unit 48 when the mobile device 4 is set in a predetermined mode such for example as a charging mode in which mode the mobile device 4 is mounted on the cradle 1 and performs data communication and a charging process.

First, when the mobile device 4 is changed to the predetermined mode, the transmission and reception controlling unit 47 determines whether a device ID inquiry from the cradle 1 is received through the transmitting and receiving antenna 45b and the radio communication unit 45a (step S301). When the transmission and reception controlling unit 47 determines in the determination process of step S301 that the device ID inquiry has not been received yet, the transmission and reception controlling unit 47 repeats the process from step S301, and waits to receive the device ID inquiry.

When the transmission and reception controlling unit 47 determines in the determination process of step S301 that the device ID inquiry has been received from the cradle 1, the control unit 41 obtains necessary information such as the device ID, the device attribute and the like stored and retained in for example the ROM 412 of the mobile device 4, and forms a device ID response as shown in FIG. 7C. The transmission and reception controlling unit 47 transmits the device ID response to the cradle 1 through the radio communication unit 45a and the transmitting and receiving antenna 45b (step S302).

Then, the transmission and reception controlling unit 47 receives an accumulated data list request transmitted from the server device 2 via the cradle 1 through the transmitting and receiving antenna 45b and the radio communication unit 45a (step S303). In response to the accumulated data list request, the control unit 41 forms an accumulated data list as described with reference to FIG. 8. The transmission and reception controlling unit 47 transmits the accumulated data list through the radio communication unit 45a and the transmitting and receiving antenna 45b to transmit the accumulated data list to the server device 2 via the cradle 1 (step S304).

Next, the transmission and reception controlling unit 47 receives a newly accumulated data request transmitted from the server device 2 via the cradle 1 through the transmitting and receiving antenna 45b and the radio communication unit 45a (step S305). In response to the newly accumulated data request, the control unit 41 extracts newly accumulated data in the form as described with reference to FIG. 9 from the image storing unit 44 of the mobile device 4. The transmission and reception controlling unit 47 transmits the newly accumulated data through the radio communication unit 45a and the transmitting and receiving antenna 45b to transmit the newly accumulated data to the server device 2 via the cradle 1 (step S306).

Next, the transmission and reception controlling unit 47 receives an accumulated data erasure request transmitted from the server device 2 via the cradle 1 through the transmitting and receiving antenna 45b and the radio communication unit 45a (step S307). In response to the accumulated data erasure request, the control unit 41 performs a process of erasing accumulated data specified to be erased among the pieces of accumulated data stored and retained in the image storing unit 44 of the mobile device 4 (step S308). The control unit 41 thereafter forms an erasing process completion report. The transmission and reception controlling unit 47 transmits the erasing process completion report through the radio communication unit 45a and the transmitting and receiving antenna 45b to transmit the erasing process completion report to the server device 2 via the cradle 1 (step S309).

Then, the transmission and reception controlling unit 47 receives write-back data transmitted from the server device 2 via the cradle 1 through the transmitting and receiving antenna 45b and the radio communication unit 45a (step S310). The write-back data is stored in the image storing unit 44 of the mobile device 4 (step S311). The control unit 41 thereafter forms a storing completion report. The transmission and reception controlling unit 47 transmits the storing completion report through the radio communication unit 45a and the transmitting and receiving antenna 45b to transmit the storing completion report to the server device 2 via the cradle 1 (step S312). Then the process represented in FIG. 17 is ended.

[Image Erasing Process]

Figure 18:
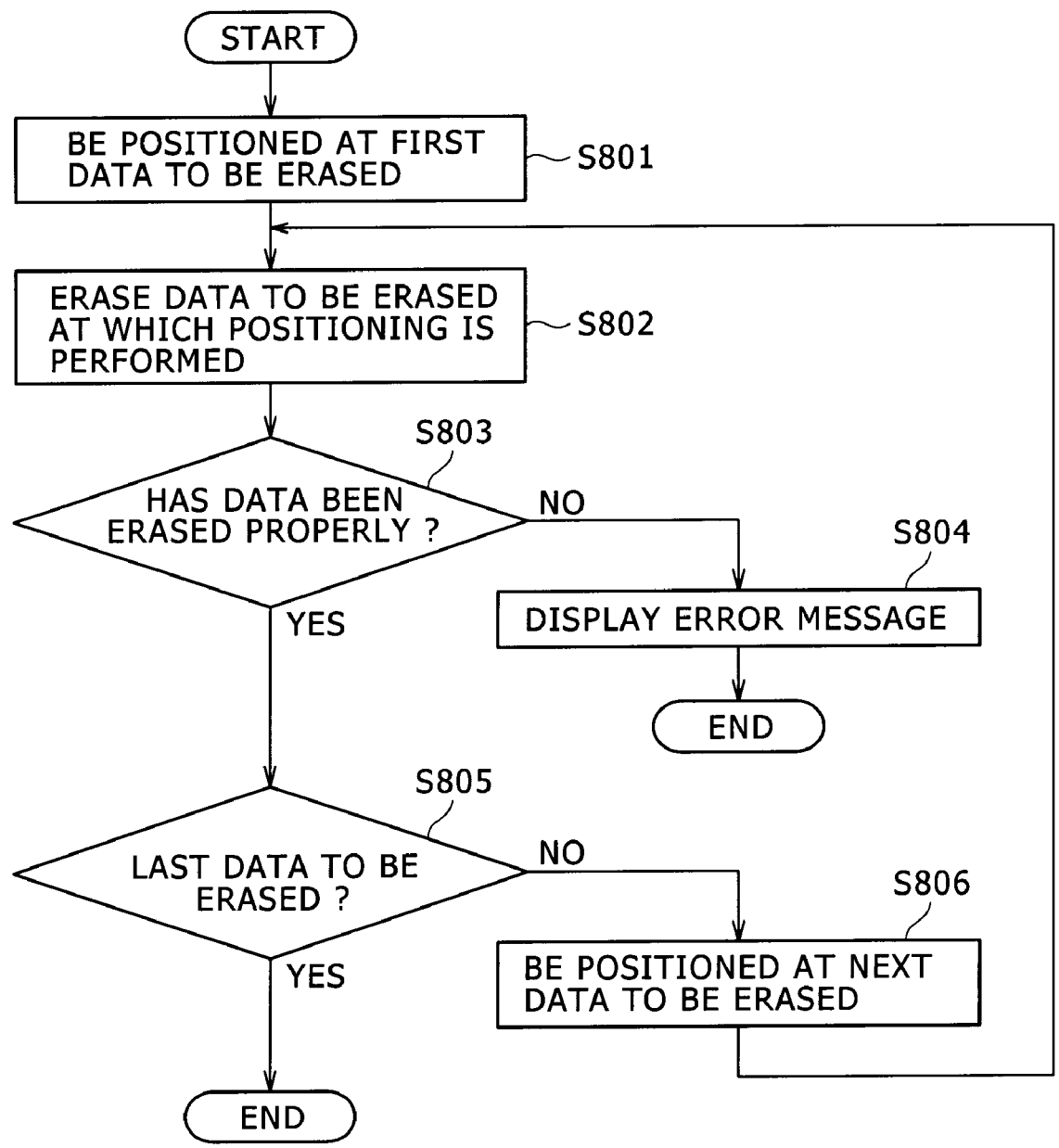
FIG. 18 is a flowchart illustrating an image data erasing process (accumulated data erasing process) performed in the process represented in FIG. 17.

FIG. 18 is a flowchart illustrating an image data erasing process (accumulated data erasing process) performed in step S308 of the process represented in FIG. 17. Because the accumulated data erasure request may specify a plurality of pieces of accumulated data that are to be erased, the control unit 41 is positioned at first data to be erased which data is specified by the accumulated data erasure request in the image data (accumulated data) stored in the image storing unit 44 (step S801), and then erases the data to be erased (step S802).

Then the control unit 41 determines whether the data to be erased has been erased properly (step S803). This determination process can be performed on the basis of a status indicating a process state updated in the RAM 413 of the control unit 41.

When it is determined in the determination process of step S803 that the data to be erased cannot be deleted because a deletion protection is provided to the data to be erased, for example, the control unit 41 controls the display unit 49 to display an error message indicating that the data to be erased cannot be deleted on the display screen of the display unit 49 (step S804). Thereafter the process represented in FIG. 18 is ended.

When the control unit 41 determines in the determination process of step S803 that the data to be erased has been erased properly, the control unit 41 determines whether the erased data to be erased is last data to be erased (step S805). When the control unit 41 determines in the determination process of step S805 that the data to be erased which data has been erased this time is not the last data to be erased, the control unit 41 is positioned so as to set next data to be erased as an object for erasure according to the accumulated data erasure request (step S806), and then performs the process from step S802.

When the control unit 41 determines in the determination process of step S805 that the data to be erased which data has been erased this time is the last data to be erased, the control unit 41 ends the process represented in FIG. 18, and returns to the process represented in FIG. 17 to perform the process from step S309.

Summary of Present Embodiment

As described with reference to FIGS. 1 to 18, in the case of the data communication system according to the present embodiment, by only mounting various mobile devices 4 on the cradle 1 connected to the server device 2, the server device 2 accesses the mobile devices 4 via the cradle 1 to back up accumulated data accumulated in the mobile devices 4 to the server device 2 and identify accumulated data erasable from the storage unit of the mobile devices 4 in the backed-up accumulated data, the identified erasable accumulated data is erased from the storage unit of the mobile devices 4 to thereby make effective use of the storage unit, and information necessary for the mobile devices 4 can be provided automatically.

That is, by only mounting a mobile device 4 on the cradle 1, the cradle 1 and the server device 2 cooperate with each other to work on the mobile device 4 mounted on the cradle 1 to back up data in the mobile device 4, organize the storage unit (memory) of the mobile device 4, and even provide necessary information to the mobile device 4 automatically. Thus, it does not need to take time and trouble to back up the accumulated data accumulated in the mobile device 4, and necessary data is preserved in the mobile device 4 or newly provided, so that the mobile device 4 can be used fully and flexibly.

Further, when necessary information is provided to the mobile device 4, in the data communication system according to the above-described embodiment, reduced image data formed from still image data deleted from the image storing unit 44 of the mobile device 4 after being backed up from the mobile device 4 to the server device 2 is generated as write-back data, and the write-back data is written back. However, the present invention is not limited to this.

As described above, there are cases where there is no accumulated data to be backed up from the mobile device 4 to the server device 2, and there are cases where as in the case of a portable type music reproducing device, music data accumulated in the portable type music reproducing device already exists on the server device 2 side and therefore does not need to be backed up.

Thus, as already described in the section [Other Examples of Write-Back Data], the server device 2 can provide for example a thumbnail image of content data that has become newly usable in the mobile device 4, a digest version of moving image data, a trial listening version of music data, or the like as write-back data to the mobile device 4 via the cradle 1 so that the write-back data is stored in the storage unit of the mobile device 4 and made usable in the mobile device 4.

In addition, as for a kind of data to be provided to the mobile device 4, as described in the section of the write-back data generating process represented in FIG. 16, it suffices to determine the form of data usable in the mobile device 4 according to the device attribute of the mobile device 4, the write-back history of write-back data for the mobile device 4, the data attribute of data accumulated in the mobile device 4, or an instruction from the user, and provide data in the determined form.

[Example of Modification of Data Communication System]

In the case of the data communication system according to the above-described embodiment, as described with reference to FIG. 5 and FIG. 6, whether the mobile device 4 mounted on the cradle 1 has accumulated data to be backed up is determined on the server device 2 side on the basis of the accumulated data list provided from the mobile device 4 in response to a request from the server device 2. However, the present invention is not limited to this. Whether the mobile device 4 mounted on the cradle 1 has accumulated data to be backed up can be determined by the cradle 1 to reduce a load on the server device 2 and speed up the process.

As with the above-described data communication system, a data communication system in this example of modification has the configuration shown in FIG. 1. A cradle 1, a server device 2, and a mobile device 4 have the configurations shown in FIG. 2, FIG. 3, and FIG. 4. Thus, also in the present example of modification, suppose that the mobile device 4 mounted on the cradle 1 is a digital still camera. Functions of the respective devices in the present example of modification slightly differ from those of the above-described embodiment.

Figure 19:
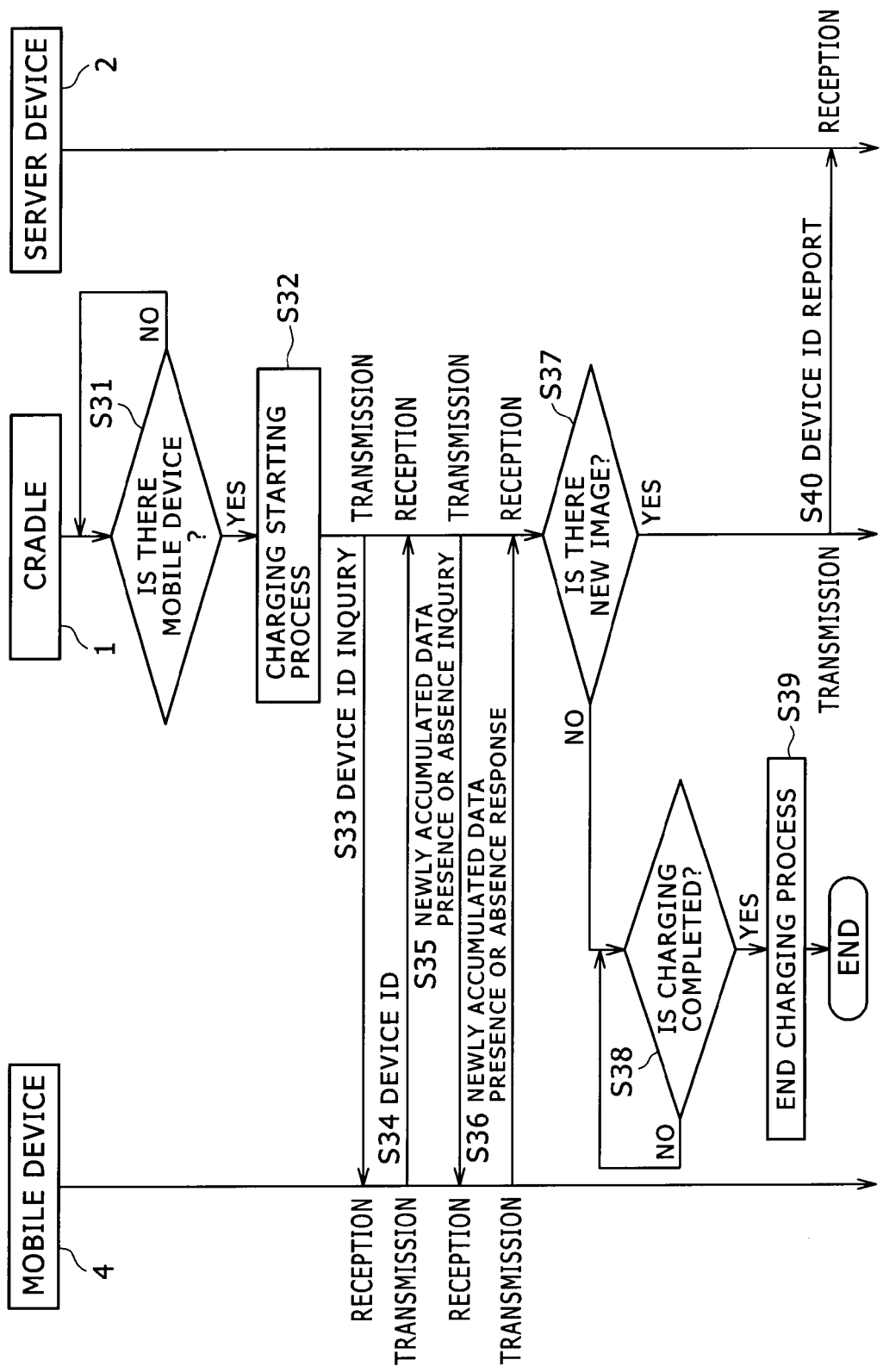
FIG. 19 is a sequence chart illustrating an example of modification of a data communication system to which an embodiment of the present invention is applied.

FIG. 19 is a sequence chart illustrating the example of modification of the data communication system according to the foregoing embodiment. Also in the present example of modification, when the cradle 1 is in a state of power to the cradle 1 being on, the cradle 1 determines whether a mobile device 4 is mounted on the cradle 1 at predetermined intervals by a function of a mounting detecting unit 16 (step S31). Also in the present example of modification, the cradle 1 can be mounted with a plurality of mobile devices simultaneously, and each time a new mobile device is mounted on the cradle 1, the cradle 1 can detect that the mobile device is mounted.

When the cradle 1 determines in the determination process of step S31 that no mobile device 4 is mounted, the cradle 1 repeats the determination process of step S31 to wait for a mobile device to be mounted on the cradle 1. When the cradle 1 determines in the determination process of step S31 that a mobile device 4 is mounted, the cradle 1 performs a process of starting to charge the newly mounted mobile device 4 (step S32).

A transmission and reception controlling unit 17 in the cradle 1 thereafter controls a radio communication unit 15a to transmit a device ID inquiry to the mobile device 4 newly mounted on the cradle 1 (step S33). After the mobile device 4 receives the device ID inquiry from the cradle 1 through a transmitting and receiving antenna 45b and a radio communication unit 45a, a transmission and reception controlling unit 47 controls the radio communication unit 45a to transmit the device ID of the own device (mobile device 4) to the cradle 1 (step S34).

After the cradle 1 receives the device ID from the newly mounted mobile device 4 through a transmitting and receiving antenna 15b and the radio communication unit 15a, the control unit 11 forms a newly accumulated data presence or absence inquiry, and the newly accumulated data presence or absence inquiry is transmitted through the radio communication unit 15a and the transmitting and receiving antenna 15b under control of the transmission and reception controlling unit 17 (step S35).

After the mobile device 4 receives the newly accumulated data presence or absence inquiry from the cradle 1 through the transmitting and receiving antenna 45b and the radio communication unit 45a, the control unit 41 checks data stored and retained in an image storing unit 44 for newly accumulated data that has not been backed up yet, and forms a newly accumulated data presence or absence response according to a result of the check. The transmission and reception controlling unit 47 controls the radio communication unit 45a through the control unit 41 to transmit the newly accumulated data presence or absence response to the cradle 1 (step S36).

Further, as described above, even backed-up accumulated data is preserved when the data is important. Thus, still image data that has already been backed up and is preserved is provided with a backup completion flag in the header part thereof so that the still image data can be distinguished from newly accumulated data according to whether the backup completion flag is on.

The control unit 11 of the cradle 1 then determines whether the mobile device 4 has newly accumulated data (new still image data) to be backed up on the basis of the newly accumulated data presence or absence response received from the mobile device 4 (step S37). When the control unit 11 determines in step S37 that the mobile device 4 does not have newly accumulated data, the control unit 11 is in a waiting state without communicating with the server device 2 until the charging of the mobile device 4 is completed (step S38). When the control unit 11 determines in the determination process of step S38 that the charging of the mobile device 4 is completed, the control unit 11 ends the process of charging the mobile device 4 (step S39). Then the series of data communication processes is ended.

When the control unit 11 determines in the determination process of step S37 that the mobile device 4 has newly accumulated data, the transmission and reception controlling unit 17 of the cradle 1 controls an external I/F 14a to report the device ID received from the newly mounted mobile device 4 through the transmitting and receiving antenna 15b and the radio communication unit 15a to the server device 2 (step S40). The server device 2 thereby grasps that the new mobile device having accumulated data is mounted on the cradle 1.

After the device ID is reported to the server device in step S40, the processes of steps S9 to S20 in the process represented in FIG. 5 and FIG. 6 are performed sequentially. In this case, when the mobile device 4 mounted on the cradle 1 does not have newly accumulated data, communication between the cradle 1 and the server device 2 is not performed, so that a load on the server device 2 can be reduced.

[Operation of Devices Forming Data Communication System according to Example of Modification]

Description will next be made of operation of each of devices forming the example of modification of the data communication system according to the foregoing embodiment which example has been described with reference to FIG. 19. Also in this case, the operation of each device will be described in detail in order of the cradle 1 positioned at the center of the data communication system according to the present example of modification, the server device 2 managing data via the cradle 1, and the mobile device 4 mounted on the cradle 1.

[Process of Cradle 1]

FIG. 20 is a flowchart illustrating a process performed at the cradle 1 in the data communication system according to the present example of modification. The process represented in FIG. 20 is performed mainly by the control unit 11 and the transmission and reception controlling unit 17 when the cradle 1 is in a state of power to the cradle 1 being on. Further, also in the present example of modification, a plurality of mobile devices can be simultaneously mounted on the cradle 1, and the process represented in FIG. 20 can be performed for a maximum number of mobile devices mountable on the cradle 1 by so-called multitasking.

When the power is turned on, the control unit 11 of the cradle 1 controls the mounting detecting unit 16 to start mobile device mounting detection and determines whether a mobile device is mounted on the cradle 1 (step S401). When it is determined in the determination process of step S401 that the mobile device is not mounted, the control unit 11 repeats the mobile device mounting detection, and waits for the mobile device to be mounted.

When it is determined in the determination process of step S401 that the mobile device is mounted, the control unit 11 controls the charging controlling unit 19 to check whether the newly mounted mobile device 4 should be charged (step S402). The process of step S402 can be performed by an electrical detection process such as detecting the voltage of the battery of the mobile device 4, for example.

The control unit 11 then determines whether the newly mounted mobile device 4 should be charged (step S403). When the control unit 11 determines that the newly mounted mobile device 4 should be charged, the control unit 11 controls the charging controlling unit 19 to start charging the battery of the newly mounted mobile device (step S404). When the control unit 11 determines in the determination process of step S403 that the newly mounted mobile device 4 does not need to be charged, the control unit 11 proceeds to a process of step S405.

After the process of step S404 or when the control unit 11 determines in the determination process of step S403 that the newly mounted mobile device 4 does not need to be charged, the following series of relaying processes is performed. The control unit 11 of the cradle 1 forms device ID inquiry command data described with reference to FIG. 7B, and the transmission and reception controlling unit 17 controls the radio communication unit 15a and the transmitting and receiving antenna 15b to transmit the device ID inquiry command data to the newly mounted mobile device 4 (step S405).

Next, the transmission and reception controlling unit 17 of the cradle 1 receives a device ID response described with reference to FIG. 7C from the mobile device 4 through the transmitting and receiving antenna 15b and the radio communication unit 15a (step S406). Thereafter, the control unit 11 of the cradle 1 forms a newly accumulated data presence or absence inquiry, and the transmission and reception controlling unit 17 controls the radio communication unit 15a to transmit the newly accumulated data presence or absence inquiry to the mobile device 4 (step S407).

Then, the transmission and reception controlling unit 17 receives a newly accumulated data presence or absence response transmitted from the mobile device 4 in response to the newly accumulated data presence or absence inquiry transmitted in step S407 through the transmitting and receiving antenna 15b and the radio communication unit 15a (step S408). The control unit 11 of the cradle 1 thereafter determines whether the newly mounted mobile device 4 has newly accumulated data on the basis of the newly accumulated data presence or absence response received in step S408 (step S409).

When the control unit 11 determines that the newly mounted mobile device 4 does not have newly accumulated data, communication with the server device 2 does not need to be performed. Thus, the control unit 11 of the cradle 1 controls the charging controlling unit 19 to check a state of charge of the battery in the mobile device 4 (step S410). The control unit 11 thereby determines whether the charging of the mobile device 4 is completed (step S411).

When the control unit 11 determines in the determination process of step S411 that the charging of the mobile device 4 has not been completed yet, the control unit 11 repeats the process from step S410 to continue the charging process. When the control unit 11 determines in the determination process of step S411 that the charging of the mobile device 4 has been completed, the control unit 11 performs a predetermined process for ending the charging of the mobile device 4 (step S412). Then the process represented in FIG. 20 is ended.

On the other hand, when the control unit 11 determines in the determination process of step S409 that the newly mounted mobile device 4 has newly accumulated data, the transmission and reception controlling unit 17 of the cradle 1 reports the device ID obtained from the mobile device 4 to the server device 2 through the external I/F 14a and an input-output terminal 14b (step S413).

Thereafter, the transmission and reception controlling unit 17 of the cradle 1 receives a newly accumulated data request from the server device 2 through the input-output terminal 14b and the external I/F 14a, and then transmits the newly accumulated data request to the mobile device 4 through the radio communication unit 15a and the transmitting and receiving antenna 15b (step S414).

Next, the transmission and reception controlling unit 17 receives newly accumulated data from the mobile device 4 through the transmitting and receiving antenna 15b and the radio communication unit 15a, and then transmits the newly accumulated data to the server device 2 through the external I/F 14a and the input-output terminal 14b (step S415). Next, the transmission and reception controlling unit 17 receives an accumulated data erasure request from the server device 2 through the input-output terminal 14b and the external I/F 14a, and then transmits the accumulated data erasure request to the mobile device 4 through the radio communication unit 15a and the transmitting and receiving antenna 15b (step S416).

Next, the transmission and reception controlling unit 17 of the cradle 1 receives an erasing process completion report from the mobile device 4 through the transmitting and receiving antenna 15b and the radio communication unit 15a, and then transmits the erasing process completion report to the server device 2 through the external I/F 14a and the input-output terminal 14b (step S417). Next, the transmission and reception controlling unit 17 receives write-back data from the server device 2 through the input-output terminal 14b and the external I/F 14a, and then transmits the write-back data to the mobile device 4 through the radio communication unit 15a and the transmitting and receiving antenna 15b (step S418).

Then, the transmission and reception controlling unit 17 of the cradle 1 receives a write-back data storing completion report from the mobile device 4 through the transmitting and receiving antenna 15b and the radio communication unit 15a, and then transmits the write-back data storing completion report to the server device 2 through the external I/F 14a and the input-output terminal 14b (step S419). Thus, also in the data communication system according to the present example of modification, the series of relaying processes between the server device 2 and the mobile device 4 is performed by the processes of steps S414 to S419.

Further, there may be a large number of pieces of accumulated data or write-back data to be relayed in the accumulated data relaying process of step S415 or the write-back data relaying process of step S418, and thus a process of transferring a large number of pieces of data may of course be performed in step S415 or step S418.

Then, after the process of step S419, the control unit 11 of the cradle 1 performs the processes of steps S410 to S412. After completing the charging of the battery of the mobile device 4, the control unit 11 performs the predetermined process for ending the charging of the mobile device 4. Then the process represented in FIG. 20 is ended.

Further, also in the example represented in FIG. 20, the state of charge is checked in step S410, and whether the charging of the mobile device 4 is completed is determined in step S411. However, the present invention is not limited to this. Whether the mobile device 4 should be charged is determined in the determination process of step S403, and the charging process is not performed when the mobile device 4 does not need to be charged. It is therefore possible to determine whether the charging process is being performed (whether power is being supplied to the mobile device 4) before checking the state of charge in step S410, and end the process represented in FIG. 20 without performing the process of steps S410 to S412 when it is determined that the charging process is not being performed.

[Process of Server Device 2]

Figure 21:
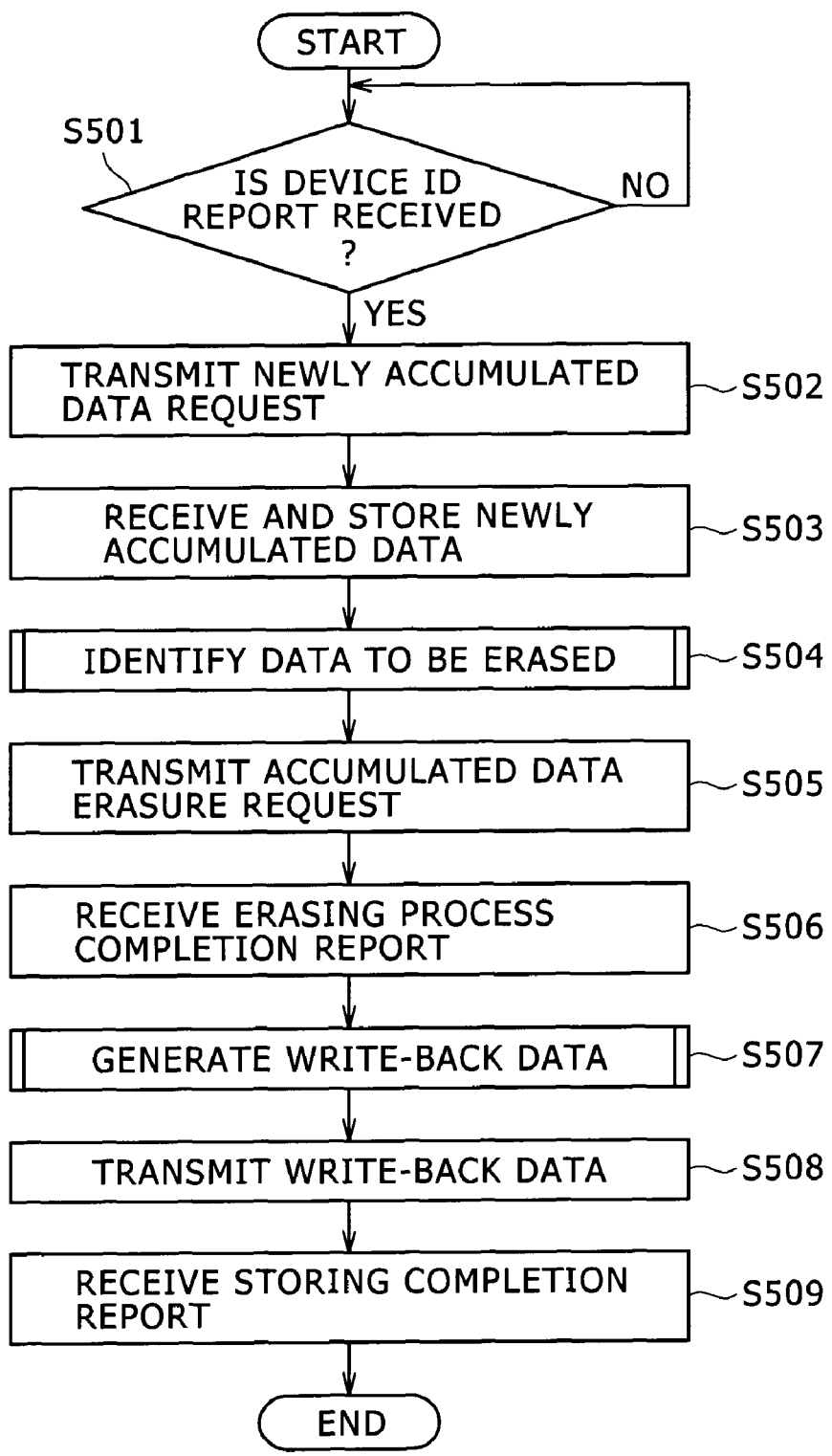
FIG. 21 is a flowchart illustrating a process performed at a server device in the data communication system according to the example of modification.

FIG. 21 is a flowchart illustrating a process performed at the server device 2 in the data communication system according to the present example of modification. The process represented in FIG. 21 is performed mainly by the control unit 21 and the transmission and reception controlling unit 27 when the server device 2 is in a state of power to the server device 2 being on.

When the power is turned on, the transmission and reception controlling unit 27 of the server device 2 determines whether the device ID of the mobile device mounted on the cradle 1 is received from the cradle 1 through the input-output terminal 26b and the external I/F 26a (step S501). When the transmission and reception controlling unit 27 determines in the determination process of step S501 that the device ID has not been received yet, the transmission and reception controlling unit 27 repeats the process from step S501, and waits to receive the device ID of the mobile device mounted on the cradle 1.

When the transmission and reception controlling unit 27 determines in the determination process of step S501 that the device ID is received from the cradle 1, it is shown that the mobile device 4 is newly mounted on the cradle 1. Thus, the control unit 21 forms a newly accumulated data request to request the provision of newly accumulated data, and the transmission and reception controlling unit 27 transmits the newly accumulated data request through the external I/F 26a to transmit the newly accumulated data request to the mobile device 4 mounted on the cradle 1 via the cradle 1 (step S502).

Next, the transmission and reception controlling unit 27 receives newly accumulated data transmitted via the cradle 1 through the input-output terminal 26b and the external I/F 26a, and then stores the newly accumulated data in a predetermined area of the HDD 30, for example (step S503). Further, a plurality of pieces of newly accumulated data may be transmitted from the mobile device 4. In step S503, the newly accumulated data from the mobile device 4 can be sequentially received and stored in a predetermined area of the HDD 30.

Then, the control unit 21 of the server device 2 performs a process of identifying data to be erased, which data is accumulated data erasable from the mobile device 4, of the accumulated data from the mobile device 4 which accumulated data is stored in the predetermined area of the HDD 30 (step S504). The process of identifying the data to be erased is the same process as the erasure data identifying process described in detail with reference to FIG. 14 and FIG. 15.

Specifically, the control unit 21 in step S504 estimates whether accumulated data is important on the basis of information added to the stored accumulated data to be identified or by analyzing the accumulated data, and does not identify the accumulated data estimated to be important but identifies other accumulated data as data to be erased.

Then, the control unit 21 of the server device 2 forms an accumulated data erasure request to erase the data to be erased which data is identified in step S504 from the image storing unit 44 of the mobile device 4, and the accumulated data erasure request is transmitted through the external I/F 26a and the input-output terminal 26b under control of the transmission and reception controlling unit 27 to be transmitted to the mobile device 4 via the cradle 1 (step S505).

Next, the transmission and reception controlling unit 27 of the server device 2 receives an erasing process completion report transmitted from the destination mobile device 4, to which the accumulated data erasure request has been transmitted, through the input-output terminal 26b and the external I/F 26a (step S506). Thereafter, the control unit 21 of the server device 2 generates write-back data to be written back to the mobile device 4 in a different form from the accumulated data that has been provided from the mobile device 4, stored on the HDD 30, and erased from the mobile device 4 (step S507).

The write-back data generating process performed in step S507 is the same process as the write-back data generating process described in detail with reference to FIG. 16. That is, the write-back data is generated after determining what kind of write-back data to generate, or the form of the write-back data to be generated. In the present example of modification, the accumulated data backed up in the server device 2 is still image data. Thus, it is determined that the write-back data is to be in the form of reduced image data, and reduced image data is formed from the backed-up accumulated data and is then returned to the mobile device 4.

Then, the transmission and reception controlling unit 27 of the server device 2 transmits the write-back data generated in step S507 through the external I/F 26a and the input-output terminal 26b to transmit the write-back data to the mobile device 4 via the cradle 1 (step S508). Thereafter, the transmission and reception controlling unit 27 of the server device 2 receives a write-back data storing completion report transmitted from the mobile device 4 via the cradle 1 through the input-output terminal 26b and the external I/F 26a (step S509). Then the process represented in FIG. 21 is ended.

Further, the above description has been made by taking as an example a case where the communication processes are performed without any problem. However, when some request is transmitted from the server device 2 to the mobile device 4 but there is no response, for example, the request can be transmitted again or a response request can be transmitted.

For example, when the erasing process completion report is not received within a predetermined time in step S506, a request to check whether the accumulated data erasing process has been performed can be transmitted. When the storing completion report is not received within a predetermined time in step S509, a request to check whether the write-back data has been stored can be transmitted. Then an appropriate process can be performed by retransmitting the original request according to the response, for example.

[Process of Mobile Device 4]

Figure 22:
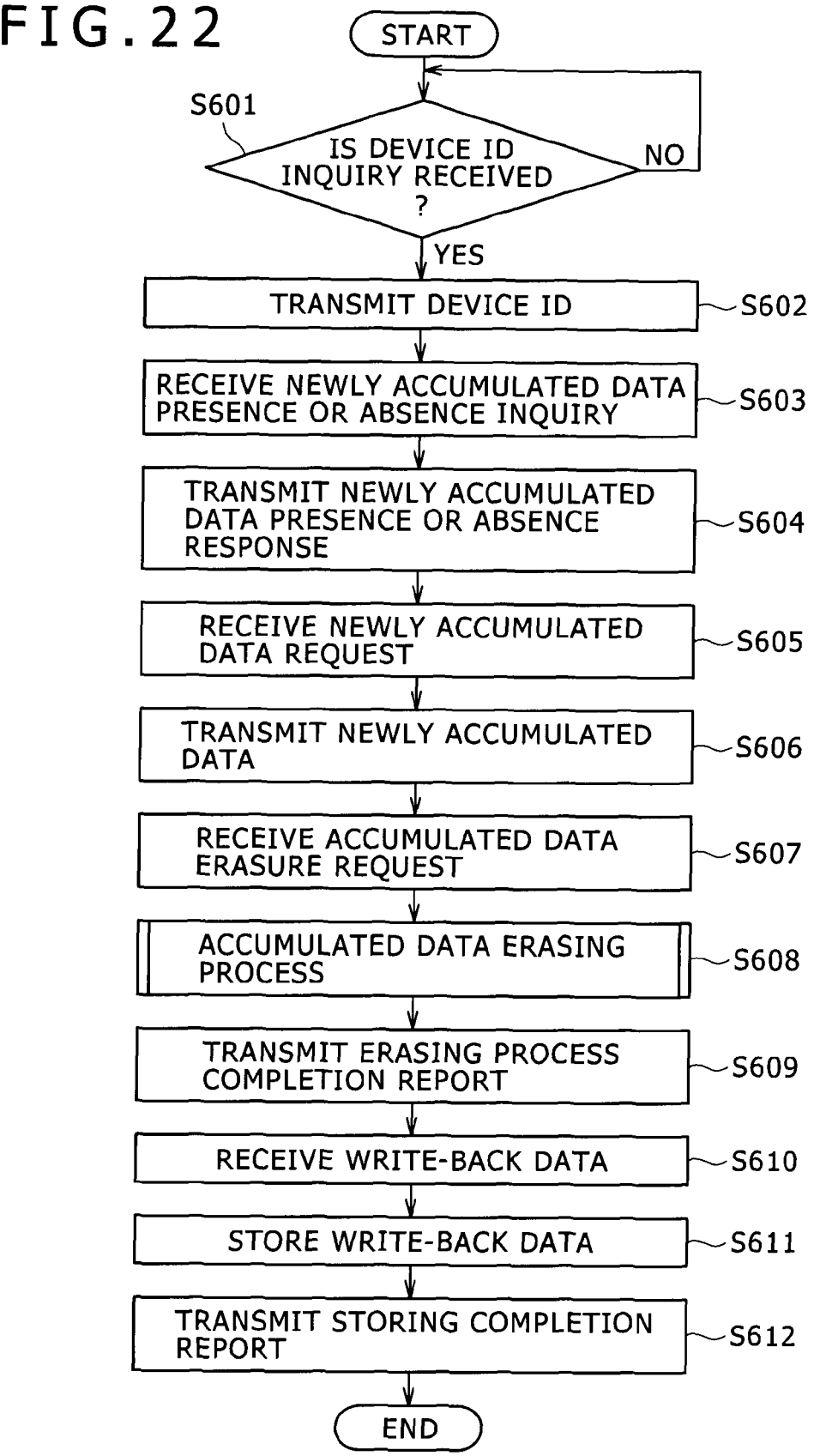
FIG. 22 is a flowchart illustrating a process performed at a mobile device in the data communication system according to the example of modification.

FIG. 22 is a flowchart illustrating a process performed at the mobile device 4 in the data communication system according to the present example of modification. The process represented in FIG. 22 is performed mainly by the control unit 41, the transmission and reception controlling unit 47, and an image erasure controlling unit 48 when the mobile device 4 is set in a predetermined mode such for example as a charging mode in which mode the mobile device 4 is mounted on the cradle 1 and performs data communication and a charging process.

First, when the mobile device 4 is changed to the predetermined mode, the transmission and reception controlling unit 47 determines whether a device ID inquiry from the cradle 1 is received through the transmitting and receiving antenna 45b and the radio communication unit 45a (step S601). When the transmission and reception controlling unit 47 determines in the determination process of step S601 that the device ID inquiry has not been received yet, the transmission and reception controlling unit 47 repeats the process from step S601, and waits to receive the device ID inquiry.

When the transmission and reception controlling unit 47 determines in the determination process of step S601 that the device ID inquiry has been received from the cradle 1, the control unit 41 obtains necessary information such as the device ID, the device attribute and the like stored and retained in for example the ROM 412 of the mobile device 4, and forms a device ID response as shown in FIG. 7C. The transmission and reception controlling unit 47 transmits the device ID response to the cradle 1 through the radio communication unit 45a and the transmitting and receiving antenna 45b (step S602).

Then, the transmission and reception controlling unit 47 receives a newly accumulated data presence or absence inquiry transmitted from the cradle 1 through the transmitting and receiving antenna 45b and the radio communication unit 45a (step S603). In response to the newly accumulated data presence or absence inquiry, the control unit 41 checks the data stored in the image storing unit 44 of the mobile device 4, and then forms a newly accumulated data presence or absence response. The transmission and reception controlling unit 47 transmits the newly accumulated data presence or absence response through the radio communication unit 45a and the transmitting and receiving antenna 45b to transmit the newly accumulated data presence or absence response to the server device 2 via the cradle 1 (step S604).

Next, the transmission and reception controlling unit 47 receives a newly accumulated data request transmitted from the server device 2 via the cradle 1 through the transmitting and receiving antenna 45b and the radio communication unit 45a (step S605). In response to the newly accumulated data request, the control unit 41 extracts newly accumulated data in the form as described with reference to FIG. 9 from the image storing unit 44 of the mobile device 4. The transmission and reception controlling unit 47 transmits the newly accumulated data through the radio communication unit 45a and the transmitting and receiving antenna 45b to transmit the newly accumulated data to the server device 2 via the cradle 1 (step S606).

Next, the transmission and reception controlling unit 47 receives an accumulated data erasure request transmitted from the server device 2 via the cradle 1 through the transmitting and receiving antenna 45b and the radio communication unit 45a (step S607). In response to the accumulated data erasure request, the control unit 41 performs a process of erasing accumulated data specified to be erased among the pieces of accumulated data stored and retained in the image storing unit 44 of the mobile device 4 (step S608). The accumulated data erasing process performed in step S608 is the same process as the process described with reference to FIG. 18.

The control unit 41 thereafter forms an erasing process completion report. The transmission and reception controlling unit 47 transmits the erasing process completion report through the radio communication unit 45a and the transmitting and receiving antenna 45b to transmit the erasing process completion report to the server device 2 via the cradle 1 (step S609).

Then, the transmission and reception controlling unit 47 receives write-back data transmitted from the server device 2 via the cradle 1 through the transmitting and receiving antenna 45b and the radio communication unit 45a (step S610). The write-back data is stored in the image storing unit 44 of the mobile device 4 (step S611). The control unit 41 thereafter forms a storing completion report. The transmission and reception controlling unit 47 transmits the storing completion report through the radio communication unit 45a and the transmitting and receiving antenna 45b to transmit the storing completion report to the server device 2 via the cradle 1 (step S612). Then the process represented in FIG. 22 is ended.

Thus, in the present example of modification, the cradle 1 can determine whether the mobile device mounted on the cradle 1 has accumulated data to be backed up in the server device 2, and when the mobile device mounted on the cradle 1 does not have accumulated data to be backed up in the server device 2, the cradle 1 can perform only the process of charging the mobile device 4 without communicating with the server device 2.

[Others]

Further, while the foregoing embodiment has been described supposing that one server device 2 is connected to the cradle 1, the present invention is not limited to this. For example, the cradle 1 is connected to a LAN (Local Area Network), or a plurality of server devices are allowed to be connected to the cradle 1, whereby a destination to which accumulated data is supplied can be changed according to a mobile device mounted on the cradle 1.

In this case, a server device to be used can be determined by the cradle 1 according to the device attribute of the mobile device or the like, determined by the cradle 1 by inquiring of each server device using a device ID about a server device that has backed up accumulated data of the mobile device in the past, or determined by the user by directly inputting an instruction to the cradle 1.

In addition, as a function of the cradle 1, the clock circuits of the mobile device 4 and the server device 2 can be synchronized. For example, a wave clock or a high-performance clock circuit is used as the clock circuit 12 of the cradle 1 so that the clock circuit 42 of the mobile device 4 mounted on the cradle 1 can be synchronized with the time of the clock circuit 12 of the cradle 1 as a reference and the clock circuit 22 of the server device 2 can be synchronized with the time of the clock circuit 12 of the cradle 1 as a reference, of course. The reference time can also be provided by the server device 2 or another device, of course.

Regardless of whether the cradle 1 is connected to a plurality of server devices or connected to one server device as in the foregoing embodiment, the plurality of server devices or the server device is provided with accumulated data from various mobile devices. Therefore the plurality of server devices or the server device can merge and manage the accumulated data from the mobile devices on the basis of various conditions.

For example, accumulated data provided from different providing sources but having the same date and time of generation can be collected together and managed, or still images, moving images and the like can be collected together and managed by data type.

In addition, mobile devices are not limited to a portable telephone terminal, a digital still camera, a digital video camera, and a portable type music reproducing device taken as an example. For example, as described above, when a device taking still image data such as a digital still camera, a portable telephone terminal provided with a camera, or the like is a mobile device 4, taken and stored still image data can be supplied to the server device 2 via the cradle 1 to be backed up, and reduced image data formed from the backed-up still image data can be generated as write-back data and returned to the mobile device 4.

For example, as described above, when a device taking moving image data such as a digital video camera, a portable telephone terminal provided with a camera, or the like is a mobile device 4, taken and stored moving image data can be supplied to the server device 2 via the cradle 1 to be backed up, and a digest version of moving image data formed from the backed-up moving image data can be generated as write-back data and returned to the mobile device 4.

In addition, in a case of a mobile device having a function of reproducing music, the server device 2 can collect music data reproduction history information in the device via the cradle 1, analyze preferences in music of the user of the mobile device, and provide music data recommended as a result of the analysis to the mobile device via the cradle 1. Of course, it is also possible to provide only music data specified by the user on the server device 2 to the mobile device.

Further, in a case of a mobile device that can record various information and allows the various information to be read, such as an electronic notebook or the like, it is possible to provide various information such as a schedule, a memo and the like newly registered in the mobile device to the server device 2 via the cradle 1 and store the various information in the server device 2, and return only data specified by the user. The instruction of the user in this case can be given to the server device 2 in advance, or the user can select the data while looking at data backed up to the server device 2 at a time of the backup to the server device 2.

Further, in a case of a mobile device having a communicating function such as a portable telephone terminal or the like, address book data and the like can be automatically backed up to the server device 2 via the cradle 1. Of course, other communication information can also be backed up to the server device 2 via the cradle 1. In addition, new address book data registered in the server device 2 can be provided to the mobile device via the cradle 1 and recorded in the mobile device to be usable on the mobile device. Basically, mutual data communication in this case can be performed automatically by only mounting the mobile device 4 on the cradle 1.

Further, the server device 2 can of course provide same information to a plurality of predetermined mobile devices via the cradle 1 or provide same information to mobile devices having a same device attribute via the cradle 1. In this case, the plurality of mobile devices may be mounted onto the cradle 1 at a time, or may be mounted onto the cradle 1 in different timings.

Further, the server device 2 can disclose various data obtained from the mobile device 4 via the cradle 1 on the Internet, and provide various data obtained from the mobile device 4 via the cradle 1 to another reproducing device or a recording and reproducing device within a house so that the data is reproduced or recorded, for example.

Further, when the server device 2 has performed a process of collecting information from the mobile device 4 or providing information to the mobile device 4 via the cradle 1, the server device 2 can notify the fact to another server device connected to a network, and thereby notify the user through the other server device that the process has been performed, for example.

Further, while in the present embodiment, the cradle 1 controls the charging of the mobile device 4, the present invention is not limited to this. The mobile device 4 itself may of course control the charging process.

Further, while the foregoing embodiment has been described supposing that the cradle 1 and the server device 2 are separate from each other, the cradle 1 and the server device 2 can be formed integrally with each other. In addition, while the server device 2 in the foregoing embodiment can be realized as a personal computer or a server device of a home network system, for example, the server device 2 can be formed as a control device of the cradle 1 as a position of the server device 2.

Second Embodiment

A data communication system according to a second embodiment will next be described. The data communication system according to the second embodiment is formed in the same manner as the data communication system according to the first embodiment described with reference to FIG. 1. Specifically, the data communication system according to the second embodiment includes various mobile devices 4, a cradle 1, and a server device 2 as shown in FIG. 1.

Also in the data communication system according to the second embodiment, the cradle 1 has the configuration described with reference to FIG. 2. The server device 2 has substantially the same configuration as the server device described with reference to FIG. 3, but has a communication I/F so that the server device 2 itself can access a server device on the Internet, for example, to download necessary data, as will also be described later.

Also in the data communication system according to the second embodiment, various devices such as a portable telephone terminal, a digital still camera and the like can be used as mobile devices. In the following, however, description will be made by taking as an example a case where a portable telephone terminal having a music reproducing function is used as a mobile device 4.

The foregoing first embodiment can back up data accumulated in the mobile device 4 to the server device 2 via the cradle 1, transmit an instruction to delete the backed-up data from the server device 2 to the mobile device 4 via the cradle 1 to organize the accumulated data of the mobile device 4, and return data obtained by subjecting the backed-up data to a resizing process or the like from the server device 2 to the mobile device 4 via the cradle 1.

On the other hand, the data communication system according to the second embodiment to be described below does not exchange content data to be reproduced such as image data, audio data or the like. Metadata added to content data, device information possessed by the mobile device itself, and the like are supplied from the mobile device 4 to the server device 2 via the cradle 1, and some data is supplied from the server device 2 to the mobile device 4 via the cradle 1, whereby cooperation between the mobile device 4 and the server device 2 is enhanced to make the mobile device 4 and the server device 2 more convenient for the user.

In the following, description will first be made of the configuration of a portable telephone terminal 4 as a mobile device and the server device 2 used in the data communication system according to the second embodiment, and thereafter description will be made of (1) a case of using the right information of content data and (2) a case of using the log information of content data as metadata use modes as well as (3) a case of using the device information of the mobile device.

[Example of Configuration of Portable Telephone Terminal 4 as Mobile Device]

Figure 23:
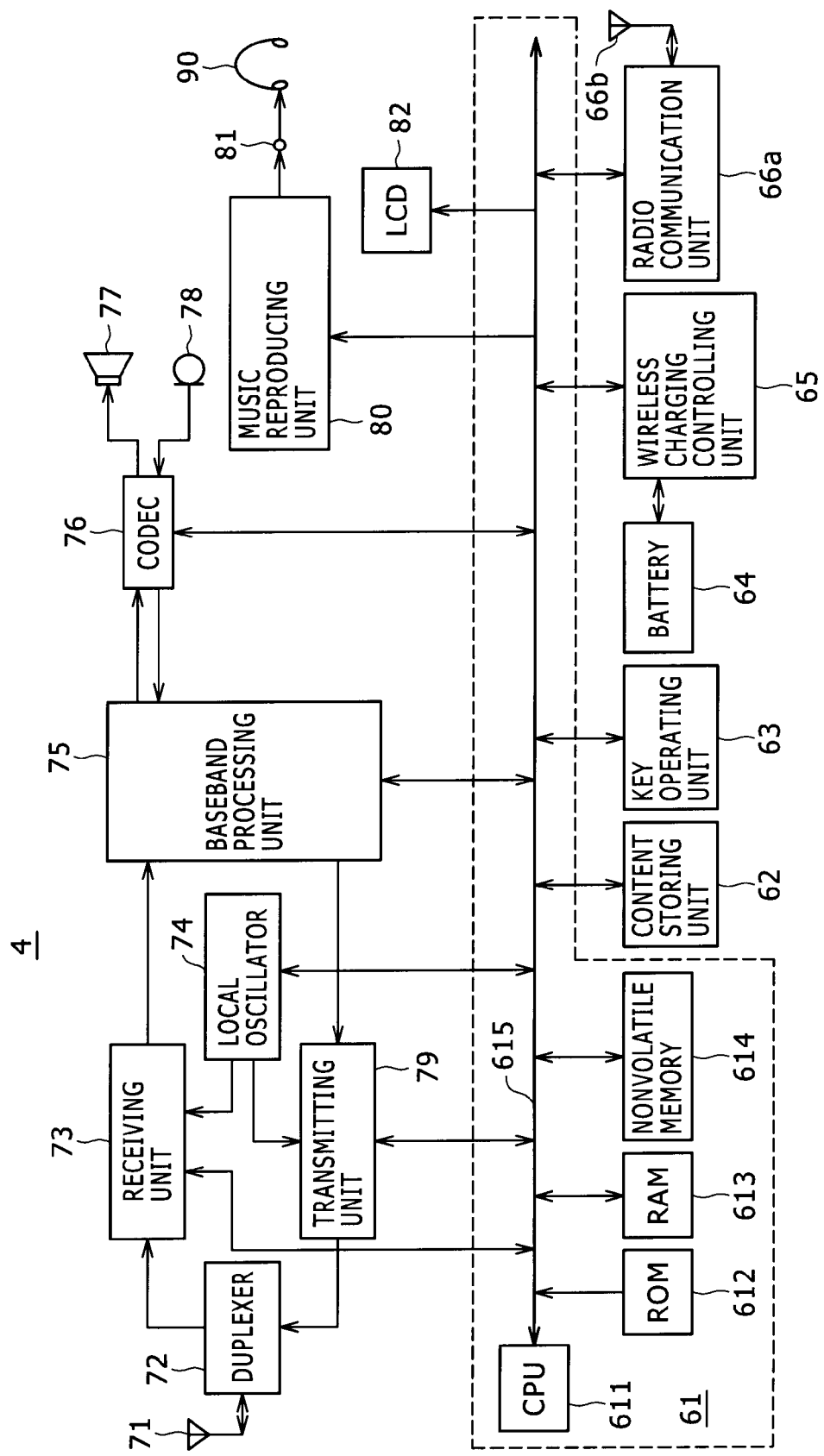
FIG. 23 is a block diagram illustrating an example of configuration of a portable telephone terminal as an example of a mobile device used in a data communication system to which another embodiment of the present invention is applied.

FIG. 23 is a block diagram illustrating a portable telephone terminal 4 as a mobile device used in the data communication system according to the second embodiment. As shown in FIG. 23, the portable telephone terminal 4 used in the second embodiment includes a control unit 61, a content storing unit 62, a key operating unit 63, a battery 64, a wireless charging controlling unit 65, a radio communication unit 66a, a transmitting and receiving antenna 66b, a transmitting and receiving antenna 71 for wide area communication, an antenna duplexer 72, a receiving unit 73, a local oscillator 74, a baseband processing unit 75, a codec 76, a telephone receiver (speaker) 77, a telephone transmitter (microphone) 78, a transmitting unit 79, a music reproducing unit 80, an audio output terminal 81, and an LCD (Liquid Crystal Display) 82.

Description will first be made of the control unit 61 as well as the content storing unit 62, the key operating unit 63, the battery 64, the wireless charging controlling unit 65, the radio communication unit 66a, the transmitting and receiving antenna 66b, the music reproducing unit 80, and the LCD 82 connected to the control unit 61.

The control unit 61 controls various parts of the portable telephone terminal 4 as a mobile device in the second embodiment. The control unit 61 is a microcomputer formed by connecting a CPU 611, a ROM 612, a RAM 613, and a nonvolatile memory 614 to each other via a CPU bus 615.

In this case, the CPU 611 is a main constituent of control. The CPU 611 executes a program stored and retained in the ROM 612 to be described later or the like, forms a control signal to be supplied to each part, and supplies the control signal to each part, and receives and processes a signal from each part. As described above, the ROM 612 stores and retains various programs executed by the CPU 611 and various data necessary for processes, such as font data and the like.

The RAM 613 is mainly used as a work area for temporarily storing an in-progress result in various processes and the like. The nonvolatile memory 614 is formed by an EEPROM, a flash memory or the like. The nonvolatile memory 614 stores and retains information to be retained even while the portable telephone terminal 4 is turned off, for example information such as various setting parameters, telephone directory data, electronic mail data, a program newly provided to add a function, for example, and the like.

As shown in FIG. 23, the thus configured control unit 61 is connected with the content storing unit 62. The content storing unit 62 includes a semiconductor memory as a recording medium and a memory controller for writing data to the semiconductor memory and reading data from the semiconductor memory.

As will also be described later, the recording medium of the content storing unit 62 stores and retains music data and AV (Audio/Visual) data downloaded from a server device on a wide area network such as the Internet or the like using a wide area communication function of the portable telephone terminal 4 so that the music data and the AV data can be used.

Further, a so-called memory card can be used as the semiconductor memory of the content storing unit 62 to be detachable from the portable telephone terminal 4 of the present embodiment. In addition to the semiconductor memory, other recording media such as a small hard disk and the like can be used.

As shown in FIG. 23, the control unit 61 is also connected with the key operating unit 63. The key operating unit 63 has various operating keys, which are not shown in the figure, such as so-called ten keys (numeric keys), various function keys, a jog dial key capable of rotating operation and pressing operation, and the like. The key operating unit 63 receives various operating inputs from the user.

An operating input received from the user through the key operating unit 63 is converted into an electric signal, and the electric signal is supplied to the control unit 61. The control unit 61 can thereby control various parts according to the instruction from the user to perform a process according to the instruction from the user.

The control unit 61 is also connected with the wireless charging controlling unit 65. The wireless charging controlling unit 65 controls a process of charging the battery 64 by for example supplying the battery 64 connected to the wireless charging controlling unit 65 with power supplied from the charging controlling unit 19 of the cradle 1. The battery 64 is charged by the wireless charging controlling unit 65, and supplies necessary power to each part of the portable telephone terminal.

Further, the control unit 61 is connected with the radio communication unit 66a. The radio communication unit 66a is provided with the transmitting and receiving antenna 66b. The radio communication unit 66a and the transmitting and receiving antenna 66b are a part for performing data communication with the cradle 1 by near field radio communication.

Thus, as with the radio communication unit 15a and the transmitting and receiving antenna 15b of the cradle 1 described above, the radio communication unit 66a and the transmitting and receiving antenna 66b can perform radio communication with the cradle 1 using for example radio communication technology such as UWB (Ultra WideBand), Bluetooth or the like, various other near field radio communication technologies, or short range radio communication technologies.

Further, in the case of the portable telephone terminal 4 in the second embodiment, the control unit 61 is connected with the music reproducing unit 80. The music reproducing unit 80 is provided with data-compressed music data read from the content storing unit 62 by the control unit 61. The music reproducing unit 80 decompresses the data-compressed music data supplied thereto to thereby reconstruct original music data before data compression, forms an analog music signal to be output from the original music data, and then outputs the analog music signal through the audio output terminal 81. As shown in FIG. 23, the audio output terminal 81 is connected with headphones 90 or the like so that reproduced sound can be listened to through the headphones 90 or the like.

Further, while the music reproducing unit 80 has been described above supposing that the music reproducing unit 80 performs a process of reproducing music data, the music reproducing unit 80 can perform a process of reproducing not only music data but also various sound data in general such as speech sound and the like. In addition, the music reproducing unit 80 performs a process of various adjustments of music data or analog music signals, a process of amplification of analog audio signals, and the like.

As shown in FIG. 23, the control unit 61 is also connected with the LCD 82. The LCD 82 includes an LCD controller, is controlled by a control signal from the control unit 61, and is able to display various display information on the display screen of the LCD 82. Further, the control unit 61 separates AV data into audio data and video data, and supplies the audio data to the music reproducing unit 80 and supplies the video data to the LCD 82, whereby both the audio data and the video data can be reproduced in synchronism with each other.

The control unit 61 is also connected with a ringer, a vibrator, a clock circuit and the like, which are not shown in the figure, to notify an incoming call or a warning by sound or vibration, implement a calendar function, notify a present time, and implement an alarm clock function according to control of the control unit 61, for example.

A receiving system of the portable telephone terminal 4 shown in FIG. 23 will next be described. A received signal received through the transmitting and receiving antenna 71 is supplied through the antenna duplexer 72 to the receiving unit 73. The receiving unit 73 performs a process of for example performing necessary band limitation and AGC (Automatic Gain Control) so that the received signal has a proper level and converting the frequency of the received signal to a certain frequency on the basis of a signal from the local oscillator (frequency synthesizer) 74, and supplies the signal after the process to the baseband processing unit 75.

The baseband processing unit 75 subjects the signal from the receiving unit 73 to A/D (Analog/Digital) conversion, removes effects of fading and the like, determines the type of the received signal, performs deinterleaving, error correction, and an appropriate decoding process, and separates call audio data and other communication data from each other. Then, the call audio data is supplied to the codec 76 having the configuration of a DSP (Digital Signal Processor), and the other communication data such for example as various control information and text data, Web page data, music data (music contents) or the like is supplied to the control unit 61.

The codec 76 subjects the audio data from the baseband processing unit 75 to D/A conversion, thereby forms an analog audio signal, and then supplies the analog audio signal to the speaker 77. The speaker 77 is driven by the analog audio signal from the codec 76 to emit sound according to the received signal.

Meanwhile, of the communication data supplied from the baseband processing unit 75 to the control unit 61, the control data, the text data and the like for the portable telephone terminal in the present embodiment are temporarily stored in for example the RAM 613 of the control unit 61, and used in the portable telephone terminal. The other content data such as the music data and the like is supplied to the content storing unit 62 and stored and retained therein to be read and used as required.

A transmitting system of the portable telephone terminal 4 shown in FIG. 23 will next be described. The microphone 78 converts collected sound into an analog audio signal, and then supplies the analog audio signal to the codec 76. The codec 76 subjects the analog audio signal from the microphone 78 to A/D conversion, thereby forms a digital audio signal, and then supplies the digital audio signal to the baseband processing unit 75.

The baseband processing unit 75 encodes the digital audio signal from the codec 76 by a predetermined encoding system, thereby compresses the digital audio signal, and then collects the compressed digital audio signal into predetermined blocks. The baseband processing unit 75 can also collect for example digital data for transmission which data is received through the key operating unit 63 and supplied through the control unit 61 into predetermined blocks. The baseband processing unit 75 collects the compressed digital audio signal and the digital data for transmission from the control unit 61, and then supplies resulting digital data to the transmitting unit 79.

The transmitting unit 79 forms a modulating signal from the digital data from the baseband processing unit 75, mixes the modulating signal with a signal for conversion from the local oscillator 74 to convert the modulating signal to a predetermined transmission frequency, and thereby forms a modulated signal for transmission. The modulated signal for transmission formed in the transmitting unit 79 is transmitted from the transmitting and receiving antenna 71 via the antenna duplexer 72.

In the portable telephone terminal of the present embodiment which terminal has such a receiving system and such a transmitting system, during a standby reception time (standby time), the control unit 61 detects an incoming call to the portable telephone terminal by monitoring a received signal from the baseband processing unit 75. When the control unit 61 detects an incoming call to the portable telephone terminal, the control unit 61 controls the ringer not shown in the figure to emit ringing sound (ringer sound) or vibrates the vibrator not shown in the figure to thereby notify the incoming call to the portable telephone terminal to the user of the portable telephone terminal.

When the user of the portable telephone terminal responds to the incoming call by performing an off-hook operation of for example pressing a call start key provided to the key operating unit 63 having numeric keys and various function keys provided on the portable telephone terminal 4 in the present embodiment, the control unit 61 connects a communication line by for example sending out a connection response through the transmitting system, and the receiving system and the transmitting system operate as described above to allow telephone conversation.

When a call is originated from the portable telephone terminal in the present embodiment, the off-hook operation of for example pressing the call start key provided to the above-described key operating unit 63 is performed, and then a dialing operation is performed through the numeric keys (dial key) of the key operating unit 63 or by selecting the telephone number of a terminal at the other end from telephone directory data registered in advance.

Thereby, the control unit 61 forms a call request, and transmits the call request through the transmitting system to connect a communication line between the portable telephone terminal in the present embodiment and the desired telephone terminal at the other end. After an incoming call response is returned from the other end and thereby the connection of the communication line is confirmed, the receiving system and the transmitting system operate as described above to allow telephone conversation.

In addition, the portable telephone terminal 4 in the present embodiment can be connected to the Internet. For example, by inputting and transmitting a URL (Uniform Resource Locator) through a provider function provided by a telephone company, the portable telephone terminal 4 in the present embodiment can obtain information of a Web page or the like and then display this information on the LCD 82 through the control unit 61, or download music data (music contents) from a target server on the Internet and store and retain the music data in the content storing unit 62 so as to make the music data usable.

In addition, the portable telephone terminal 4 in the present embodiment can for example store electronic mail data for transmission generated by inputting information through the key operating unit 63 and the LCD 82 in the nonvolatile memory 614 and then transmit the electronic mail data for transmission to a target destination mail server through the Internet, and receive electronic mail directed to the portable telephone terminal 4 itself from a mail server, store the electronic mail in the nonvolatile memory 614, and display the electronic mail on the LCD 82 so that the electronic mail is used.

Thus, the portable telephone terminal 4 in the present embodiment can perform telephone communication and data communication through a portable telephone network and a wide area network such as the Internet or the like.

[Example of Configuration of Server Device 2]

Figure 24:
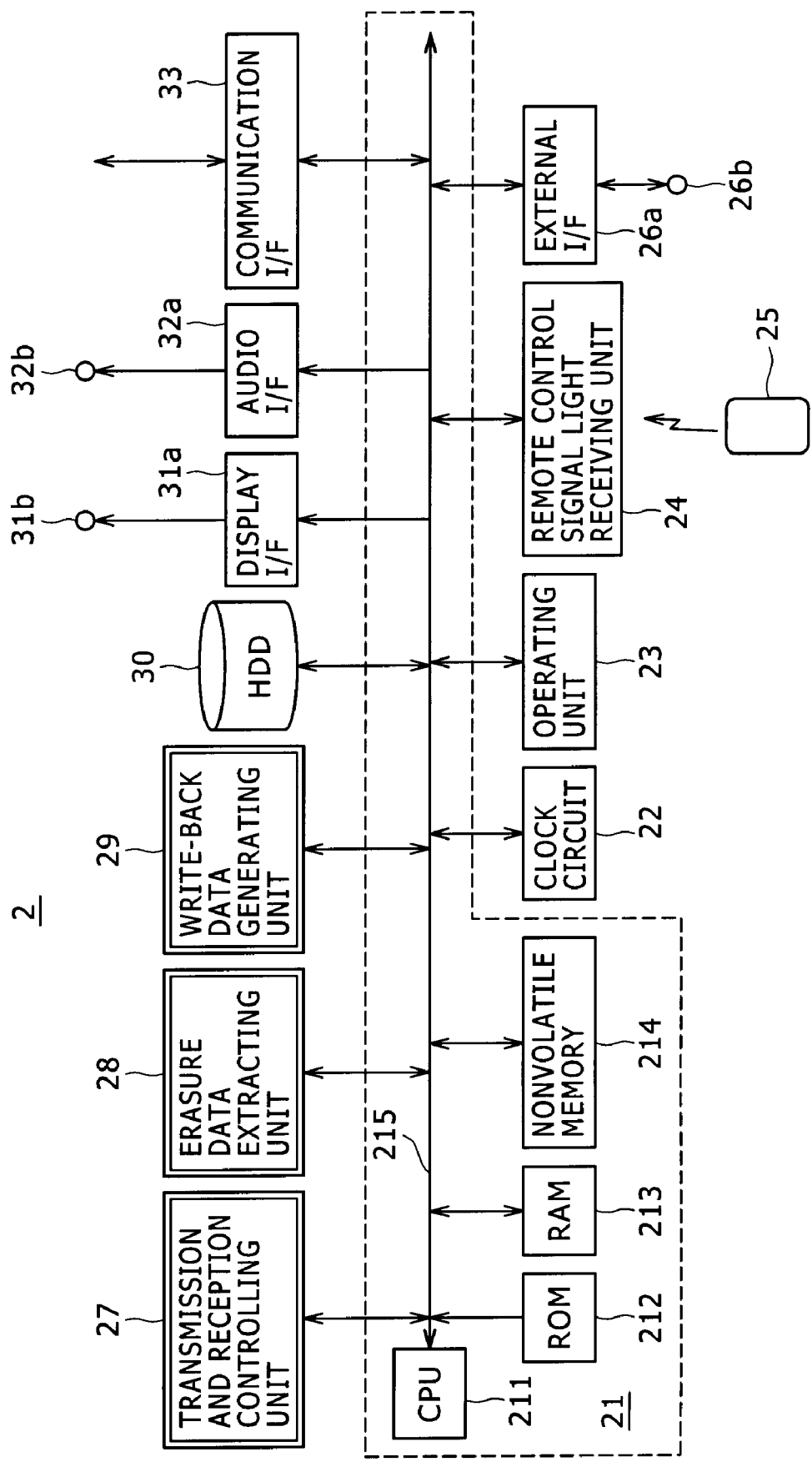
FIG. 24 is a block diagram illustrating an example of configuration of a server device used in the data communication system to which the above embodiment of the present invention is applied.

FIG. 24 is a block diagram illustrating an example of configuration of the server device 2 used in the data communication system according to the second embodiment. As shown in FIG. 24, the server device 2 in the second embodiment is configured in the same manner as the server device 2 in the first embodiment, the server device 2 in the first embodiment being shown in FIG. 3, except that the server device 2 in the second embodiment has an audio I/F 32a, an audio signal output terminal 32b, and a communication I/F 33. Therefore, parts in the server device 2 shown in FIG. 24 which parts are formed in the same manner as those of the server device 2 shown in FIG. 3 are identified by the same reference numerals, and detailed description of these parts will be omitted.

By control of a control unit 21, the server device 2 shown in FIG. 24 can be connected to the Internet through the communication I/F 33 and through a public telephone network, be provided with various Web pages from various server devices on the Internet, and then supply the various Web pages to a monitor device through a display I/F 31a and a video signal output terminal 31b to display the information on the display screen of the monitor device, and download various content data such as music data, AV data and the like, store the content data on a HDD 30, and read the content data as required so that the content data is used.

The server device 2 in the second embodiment also has a function of reproducing audio data. The server device 2 reads music data stored and retained on the HDD 30, reproduces the music data, and supplies the reproduced music data to a speaker not shown in the figure which speaker is connected to the server device 2 through the audio I/F 32a and the audio signal output terminal 32b. Thereby reproduced sound can be emitted from the speaker to be listened to.

In the data communication system according to the second embodiment which system is formed as shown in FIG. 1 by the portable telephone terminal 4 of the configuration shown in FIG. 23, the cradle 1 of the configuration shown in FIG. 2, and the server device 2 of the configuration shown in FIG. 24, as described above, metadata added to content data is exchanged between the server device 2 and the portable telephone terminal 4 without the content data being exchanged, and the device information of the portable telephone terminal 4 is provided to the server device 2. Thereby cooperation between the portable telephone terminal 4 and the server device 2 is enhanced to realize the data communication system more convenient for the user.

In the following, concrete description will be made of cases where the metadata of content data and the device information of the portable telephone terminal 4 are used in the data communication system according to the second embodiment.

[Case of Using Right Information of Content Data]

Description will next be made of a case where the right information of content data is used in the data communication system according to the second embodiment. In this case, the right information of content data is metadata on the content data, and is information indicating a use license, a use limit (use limitation) and the like regarding each piece of content data.

Such right information is transmitted and received between the portable telephone terminal 4 as a mobile device and the server device 2 via the cradle 1. Thereby, as will be described later in detail, the portable telephone terminal 4 and the server device 2 can use the content data of same contents without the content data itself being transmitted and received between the portable telephone terminal 4 and the server device 2.

[Example of Layout of Accumulated Data Including Right Information]

FIG. 25 is a diagram illustrating accumulated data (content data) to which right information is added, which data is obtained by a download from a server device on the Internet and stored and retained in the content storing unit 62 of the portable telephone terminal 4 as a mobile device and the HDD 30 of the server device 2 in the second embodiment. Further, description will be made supposing that the accumulated data in this case is music data (music contents).

As shown in FIG. 25, management information and right information are added to music data (accumulated data) downloaded and stored in a predetermined storage unit as described above. As shown in FIG. 25, the management information includes a device ID, a data ID, a data attribute, a date and time of obtainment, data size, and other information. The device ID is information identifying a device (the portable telephone terminal, the server device or the like) that accumulates the accumulated data. The data ID can uniquely identify the accumulated data. The data attribute is information indicating a data type and indicating whether the accumulated data is still image data, moving image data, audio data or the like. The date and time of obtainment is information indicating a date and time when the accumulated data is downloaded. The data size is information indicating the size of the accumulated data. In addition, various management information can be added as the other information.

The right information includes content identifying information, providing source information, a right ID, a right level, a transmitted flag, and other information. The content identifying information identifies the accumulated data (music data) to which the content identifying information is added. Specifically, when music data of same contents includes a plurality of types of music data such for example as data-compressed music data for the mobile device and uncompressed high-quality music data to be used at home or the like, the data ID of the management information can uniquely identify the music data itself including the type of the data by indicating what music data of what kind is accumulated, whereas the content identifying information indicates what music data is accumulated, thus cannot identify the type of the data, and is limited to the identification of a so-called musical piece.

The providing source information can identify the providing source of the music data as accumulated data, and is specifically a URL or the like identifying a server device of the distributing source of the music data. In the second embodiment, the right ID indicates whether there is a use license for other data accompanying the music data to which this right ID is added. The right level indicates an extent of use of the music data and a use limit when the use license for the other data accompanying the music data is given.

The right ID and the right level will be described concretely. As described above, music data of same contents may include a plurality of types of data such for example as data-compressed music data for the mobile device and high-quality music data that can be used at home or the like. When the mobile device legally downloads music data for the mobile device, a right to download and use high-quality music data of the same contents free of charge through a server device such as a personal computer or the like installed in a house or the like may also be given. Conversely, when high-quality music data is legally downloaded through a server device such as a personal computer or the like installed in a house or the like, a right to download and use music data of the same contents for the mobile device on the mobile device may also be given.

In such cases, the music data for the mobile device has added thereto an authentication code required when high-quality music data of the same contents is to be downloaded as a right ID and information indicating what kind of data is usable as a right level. The high-quality music data has added thereto an authentication code required when music data of the same contents for the mobile device is to be downloaded as a right ID and information indicating what kind of data is usable as a right level.

In this case, a code for example made of a number of a plurality of figures, a plurality of letters of the alphabet or the like, or a mixture of a plurality of figures and letters of the alphabet or the like is used as the authentication code as right ID. However, codes obtained by further encrypting these codes may be used as the authentication code as right ID. As for the right level, for example, a value "1 (level 1)" is used as the right level when the high-quality music data is usable, and a value "2 (level 2)" is used as the right level when the music data for the mobile device is usable. Thus, the right level enables the type of the usable data (the level of the data) to be distinguished. In addition, the information of the right level can specify a limitation on the number of times of reproduction of the downloaded data and the number of copies of the downloaded data.

Further, the respective pieces of information of the content identifying information, the right ID, and the right level are added to each piece of music data by the providing source of the music data. When the music data is downloaded, the respective pieces of information of the content identifying information, the right ID, and the right level are provided from a server device of the providing source of the music data together with the music data.

The transmitted flag included in the right information in FIG. 25 makes it possible to distinguish whether right information transmission data to be described later has been formed on the basis of the right information added to the accumulated data and transmitted to another device via the cradle 1. The transmitted flag in the second embodiment has a value "1" when the right information has been transmitted, and has a value "0" when the right information has not been transmitted. In addition, various other information such for example as information limiting users allowed to use the music data and the like can be added as right information.

[Example of Layout of Right Information Transmission Data]

FIG. 26 is a diagram illustrating an example of layout of right information transmission data transmitted and received between the portable telephone terminal 4 as a mobile device and the server device 2 via the cradle 1 as described above.

As shown in FIG. 26, the right information transmission data in this example includes a classification, a transmission destination, a transmission source, and right information. The classification indicates that this data is right information transmission data. The transmission destination is information identifying a device to which to transmit the right information transmission data. The device ID of the transmission destination is input as the transmission destination. The transmission source is information identifying the device of the transmission source that transmits the right information transmission data. The device ID of the transmission source is input as the transmission source.

Each of piece of information forming the right information in the right information transmission data of FIG. 26 is formed on the basis of the right information of the accumulated data described with reference to FIG. 25. Thus, each of piece of information such as content identifying information, providing source information, a right ID, a right level, and others forming the right information in the right information transmission data shown in FIG. 26 is the same as the corresponding information of the right information added to the accumulated data shown in FIG. 25.

The thus formed right information transmission data shown in FIG. 26 is transmitted and received between the portable telephone terminal 4 as a mobile device and the server device 2 installed in a home via the cradle 1, as will be described below.

[Operation of Data Communication System when Right Information is Transmitted and Received]

The operation of the data communication system according to the second embodiment when right information is transmitted and received between the portable telephone terminal 4 as a mobile device and the server device 2 via the cradle 1 will next be described with reference to timing charts of FIGS. 27 to 29. Also in the data communication system according to the second embodiment, as in the data communication system according to the first embodiment described with reference to FIG. 1, the cradle 1 and the server device 2 are connected to each other by wire using an interface cable 3.

The cradle 1 is connected to the mobile device 4 mounted on the cradle 1 by radio using near field radio communication technology. As will be described below, communication between the portable telephone terminal 4 as a mobile device mounted on the cradle 1 and the server device 2 connected to the cradle 1 by wire is performed via the cradle 1.

Each of the portable telephone terminal 4 as a mobile device and the server device 2 has accessed a desired music data providing server device and downloaded desired music data using the wide area communication function of the device, and stores and retains the music data as accumulated data having the layout described with reference to FIG. 25 in the storage unit of the device. The storage unit of the device is the content storing unit 62 in the case of the portable telephone terminal 4, and is the HDD 30 in the case of the server device 2.

Specifically, in the second embodiment, when the portable telephone terminal 4 downloads desired music data, the portable telephone terminal 4 is provided with data-compressed music data for the mobile device and information accompanying the music data, such for example as content identifying information and a right ID and a right level for enabling the downloading and use of high-quality music data. The data-compressed music data for the mobile device and the information accompanying the music data are supplied to the control unit 61 through the transmitting and receiving antenna 71, the antenna duplexer 72, the receiving unit 73, and the baseband processing unit 75, arranged into the layout shown in FIG. 25, and then stored in the content storing unit 62 by the control unit 61 so as to be usable.

In addition, in the second embodiment, when the server device 2 downloads desired music data, the server device 2 is provided with high-quality music data and information accompanying the music data, such for example as content identifying information and a right ID and a right level for enabling the downloading and use of music data for the mobile device. The high-quality music data and the information accompanying the music data are supplied to the control unit 21 through the communication I/F 33, arranged into the layout shown in FIG. 25, and then stored on the HDD 30 by the control unit 21 so as to be usable.

Also in the data communication system according to the second embodiment, inquiries, responses, requests, reports and the like to be transmitted and received are formed according to the layout shown in FIG. 7A and then used.

Figure 27:
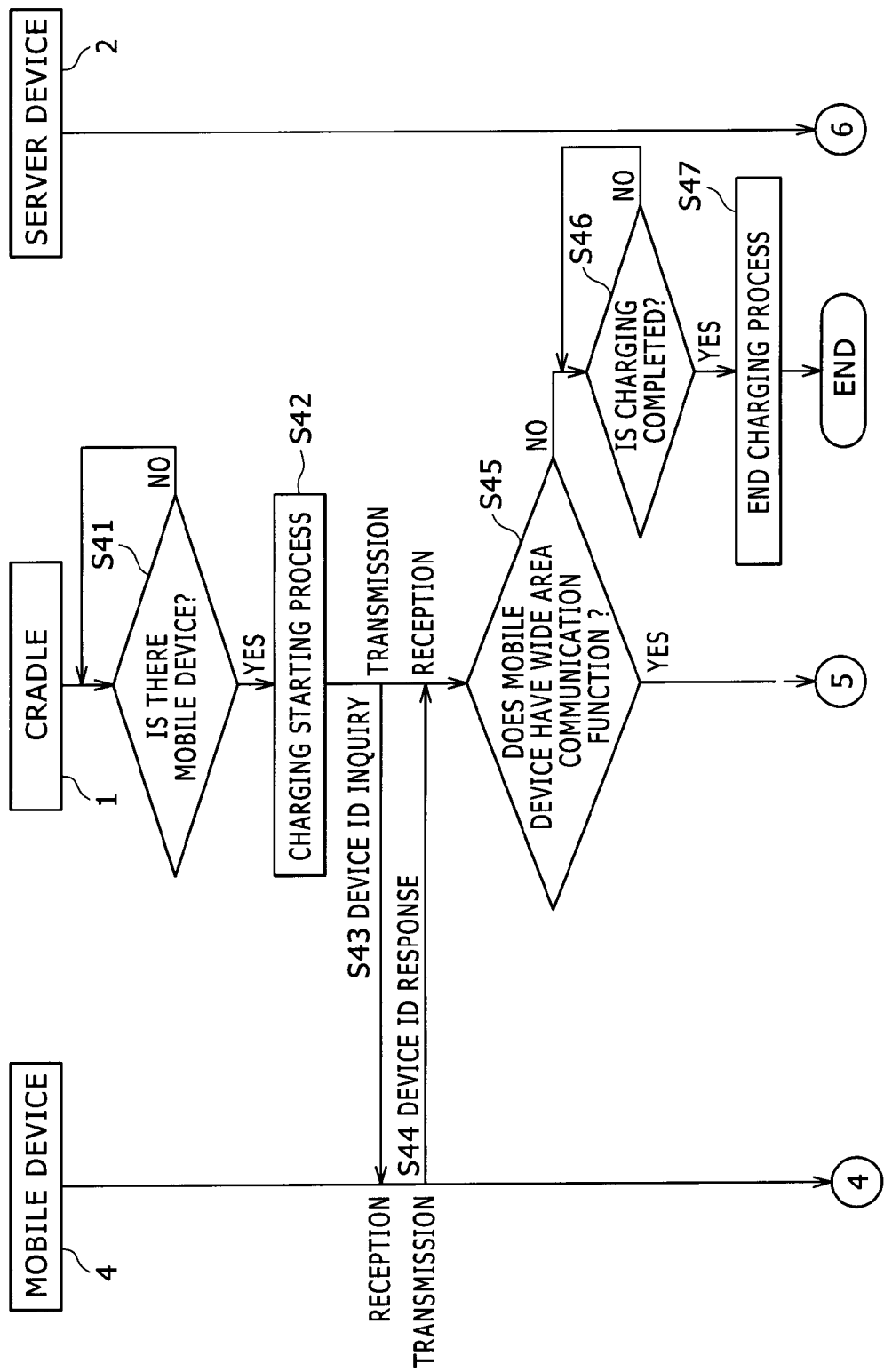
FIG. 27 is a timing chart illustrating an operation when right information is transmitted and received in the data communication system to which the above embodiment of the present invention is applied.

As shown in FIG. 27, when the cradle 1 is in a state of power to the cradle 1 being on, the cradle 1 determines whether a mobile device 4 is mounted on the cradle 1 at predetermined intervals by a function of a mounting detecting unit 16 (step S41). As described above, the cradle 1 in the present embodiment can be mounted with a plurality of mobile devices simultaneously, and each time a new mobile device is mounted on the cradle 1, the cradle 1 can detect that the mobile device is mounted.

When the cradle 1 determines in the determination process of step S41 that no mobile device 4 is mounted, the cradle 1 repeats the determination process of step S41 to wait for a mobile device to be mounted on the cradle 1. When the cradle 1 determines, in the determination process of step S41 that a mobile device 4 is mounted, the cradle 1 performs a process of starting to charge the mounted mobile device 4 (step S42).

A transmission and reception controlling unit 17 in the cradle 1 thereafter controls a radio communication unit 15*a* to transmit a device ID inquiry having the constitution shown in FIG. 7B to the mobile device 4 newly mounted on the cradle 1 (step S43). In response to the device ID inquiry, the control unit 61 of the mobile device 4 controls the radio communication unit 66*a* to transmit a device ID response having the constitution shown in FIG. 7C to the cradle 1 (step S44).

After the cradle 1 receives the device ID response from the mobile device 4, the cradle 1 determines whether the mobile device 4 mounted on the cradle 1 has a wide area communication function on the basis of the received device ID (step S45). The cradle 1 determines whether the mobile device 4 mounted on the cradle 1 has a wide area communication function in order to determine whether the mobile device 4 can independently download content data. The device ID indicates what kind of device the transmission source device that has transmitted the device ID is. Thus, the cradle 1 can determine on the basis of the device ID whether the mobile device 4 mounted on the cradle 1 has a wide area communication function.

When the cradle 1 determines in the determination process of step S45 that the mobile device 4 mounted on the cradle 1 is for example a digital still camera that does not have a wide area communication function, the mobile device does not independently download content data on the basis of right information. Thus, the cradle 1 checks a state of charge of the battery of the mobile device 4, and is set in a waiting state until charging is completed (step S46). When the cradle 1 determines that the charging is completed, the cradle 1 ends the process of charging the battery of the mobile device 4 mounted on the cradle 1 (step S47). Then the process represented in FIGS. 27 to 29 is ended.

Figure 28:
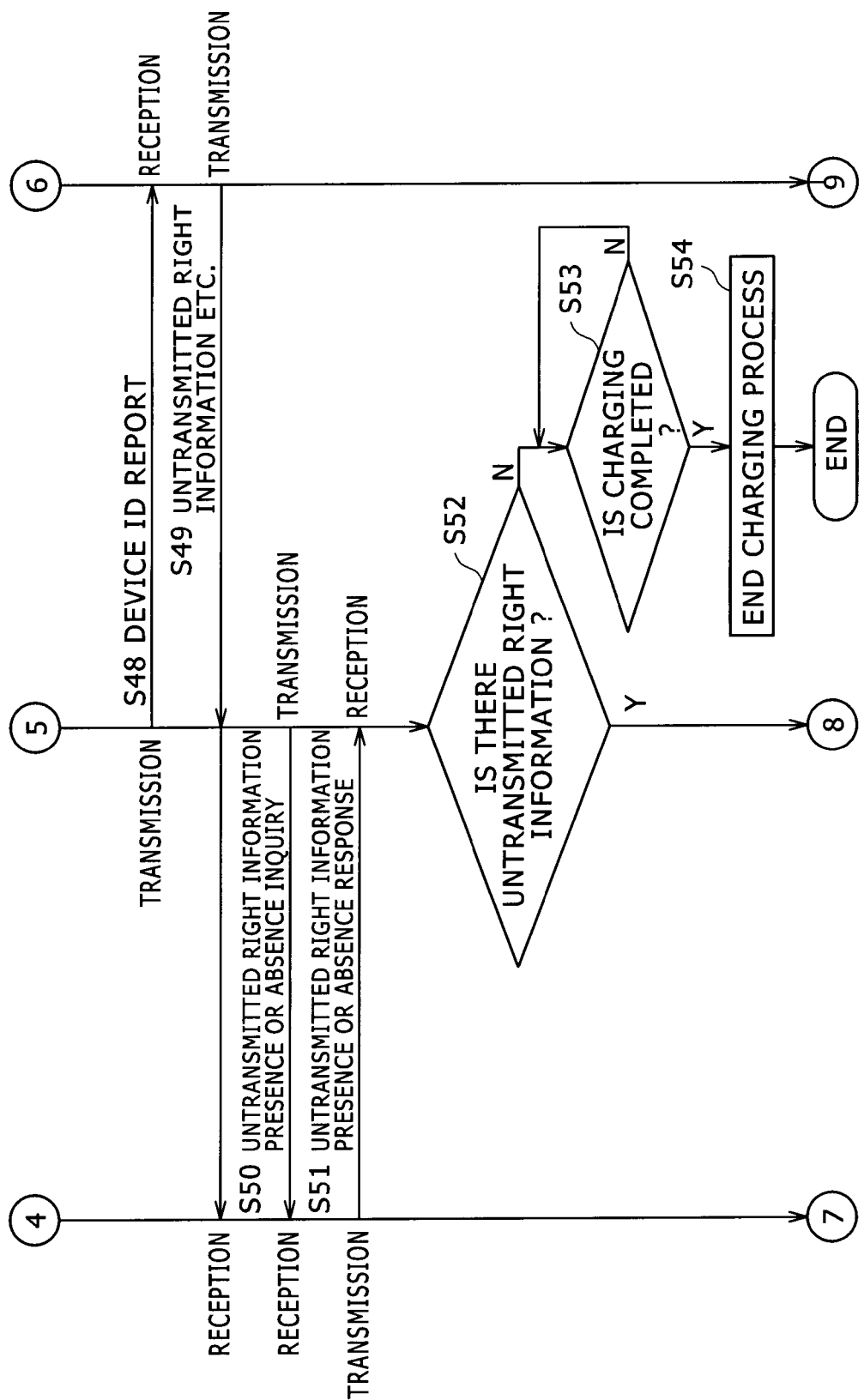
FIG. 28 is a timing chart continued from FIG. 27.

When the cradle 1 determines in the determination process of step S45 that the mobile device 4 mounted on the cradle 1 has a wide area communication function, the cradle 1 proceeds to the process of FIG. 28, and reports the device ID notified from the mobile device 4 in step S44 to the server device 2 (step S48). Thereby the server device 2 can also recognize on the basis of the reported device ID that the mobile device 4 mounted on the cradle 1 has a wide area communication function, that is, that the mobile device 4 mounted on the cradle 1 is a portable telephone terminal in the second embodiment.

After the server device 2 detects that the portable telephone terminal 4 having a wide area communication function is mounted on the cradle 1, when there is music data (music contents) that has been downloaded through the communication I/F 33 of the server device 2 and whose right information added thereto has not been transmitted to the mobile device having a wide area communication function, the server device 2 forms right information transmission data having the layout shown in FIG. 26 on the basis of the untransmitted right information and the like, and then transmits the right information transmission data to the portable telephone terminal 4 mounted on the cradle 1 via the cradle 1 (step S49). Thereby, when there is music data downloaded to the server device 2 and there is corresponding music data for the mobile device which data can be used in the portable telephone terminal 4, the portable telephone terminal 4 mounted on the cradle 1 can grasp this.

Further, whether there is untransmitted right information can be determined by the transmitted flag of the right information added to the music data as accumulated data, as described with reference to FIG. 25. When the server device 2 has transmitted the untransmitted right information in step S49, the server device 2 in the second embodiment writes information indicating that the right information has been transmitted, that is, a value "1" to the transmitted flag of the right information of the accumulated data. When there are a plurality of pieces of untransmitted right information, a plurality of pieces of right information transmission data are formed and then transmitted.

The cradle 1 thereafter transmits an untransmitted right information presence or absence inquiry to the portable telephone terminal 4 mounted on the cradle 1 (step S50). Receiving the untransmitted right information presence or absence inquiry, the portable telephone terminal 4 forms an untransmitted right information presence or absence response indicating whether there is music data (music contents) that has been downloaded using the wide area communication function of the portable telephone terminal 4 and whose right information added thereto has not been transmitted to the server device 2, and then transmits the untransmitted right information presence or absence response to the cradle 1 (step S51). Further, the portable telephone terminal 4 can also determine whether there is untransmitted right information by the transmitted flag of the right information added to the music data as accumulated data, as described with reference to FIG. 25.

Then, on the basis of the untransmitted right information presence or absence response from the portable telephone terminal 4 mounted on the cradle 1, the cradle 1 determines whether the portable telephone terminal 4 mounted on the cradle 1 has untransmitted right information (step S52). When the cradle 1 determines in the determination process of step S52 that the portable telephone terminal 4 does not have untransmitted right information, there is no right information to be transmitted to the server device 2. Thus, the cradle 1 checks a state of charge of the battery of the mobile device 4, and is set in a waiting state until charging is completed (step S53). When the cradle 1 determines that the charging is completed, the cradle 1 ends the process of charging the battery of the mobile device 4 mounted on the cradle 1 (step S54). Then the process represented in FIGS. 27 to 29 is ended.

Figure 29:
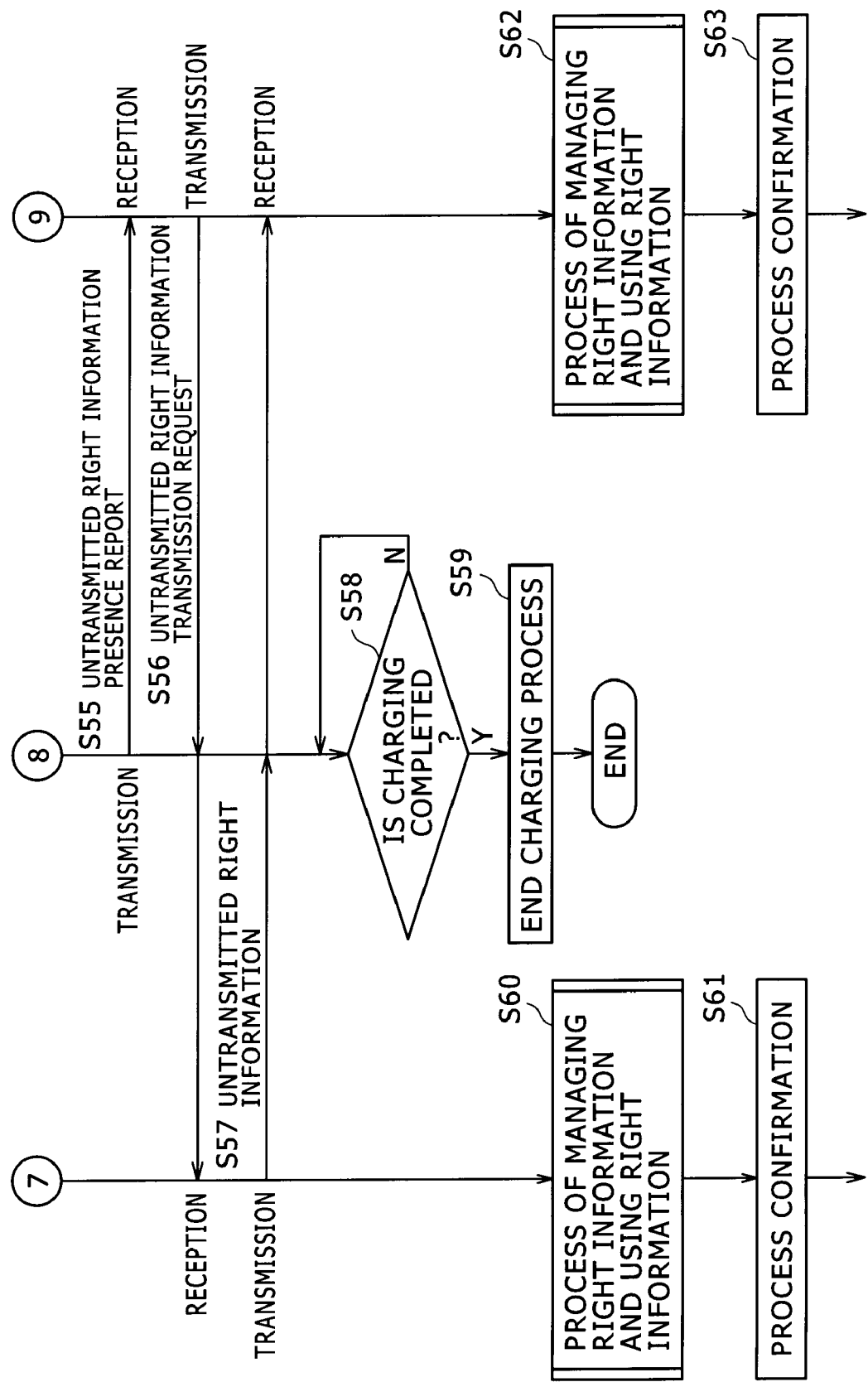
FIG. 29 is a timing chart continued from FIG. 28.

When the cradle 1 determines in the determination process of step S52 that the portable telephone terminal 4 has untransmitted right information, the cradle 1 proceeds to the process of FIG. 29, and reports to the server device 2 that the portable telephone terminal 4 has untransmitted right information (step S55). Receiving the report that the portable telephone terminal 4 has untransmitted right information, the server device 2 forms an untransmitted right information transmission request, and then transmits the untransmitted right information transmission request to the portable telephone terminal 4 via the cradle 1 (step S56).

Receiving the untransmitted right information transmission request, the portable telephone terminal 4 forms right information transmission data having the layout described with reference to FIG. 26 on the basis of the right information whose transmitted flag does not indicate that transmission has been made (does not have the value "1") in the accumulated data stored and retained in the portable telephone terminal 4, and then transmits the right information transmission data to the server device 2 via the cradle 1 (step S57). Thereby, when there is music data downloaded to the portable telephone terminal 4 and there is corresponding high-quality music data that can be used in the server device 2, the server device 2 can grasp this.

When the portable telephone terminal 4 has transmitted the untransmitted right information in step S57, the portable telephone terminal 4 in the second embodiment writes information indicating that the right information has been transmitted, that is, a value "1" to the transmitted flag of the right information of the accumulated data.

Then, the cradle 1 checks a state of charge of the battery of the mobile device 4, and is set in a waiting state until charging is completed (step S58). When the cradle 1 determines that the charging is completed, the cradle 1 ends the process of charging the battery of the mobile device 4 mounted on the cradle 1 (step S59). Then the process represented in FIGS. 27 to 29 is ended.

The portable telephone terminal 4 mounted on the cradle 1 can manage the right information about the music data independently downloaded by the server device 2, the right information being provided from the server device 2 to the portable telephone terminal 4 via the cradle 1 by the process of step S49 described with reference to FIG. 28, and download and use music data for the mobile device which data corresponds to the music data downloaded by the server device 2 (step S60). When the right information has been used and the desired music data has been downloaded, the repeated downloading of the same music data (the repeated exercise of the right) is prohibited through a confirmation process (step S61).

The server device 2 can manage the right information about the music data independently downloaded by the portable telephone terminal 4, the right information being provided from the portable telephone terminal 4 to the server device 2 via the cradle 1 by the process of step S57 described with reference to FIG. 29, and download and use high-quality music data that corresponds to the music data downloaded by the portable telephone terminal 4 (step S62). When the right information has been used and the desired music data has been downloaded, the repeated downloading of the same music data (the repeated exercise of the right) is prohibited through a confirmation process (step S63).

Further, in the example described with reference to FIGS. 27 to 29, the transmission of the right information transmission data from the server device 2 to the portable telephone terminal 4 is made without checking whether there is untransmitted right information, whereas the transmission of the right information from the portable telephone terminal 4 to the server device 2 is made after the presence of the untransmitted right information is checked and only when the untransmitted right information is present.

This is because a case is assumed in which the server device 2 has a higher processing power and content data is often downloaded through the server device 2. Thus, the transmission of the right information transmission data from the server device 2 can also be made only when there is untransmitted right information. In addition, the transmission of right information transmission data from the portable telephone terminal 4 can be made without checking whether there is untransmitted right information in the portable telephone terminal 4.

However, by checking whether there is untransmitted right information, the cradle 1 can prevent the process of transmitting right information transmission data from being performed even when there is no untransmitted right information. Thus, by checking whether there is untransmitted right information in the cradle 1, it is possible to prevent the unnecessary process from being performed in the portable telephone terminal 4 and the server device 2.

[Process of Cradle 1 when Right Information is Used]

FIG. 30 is a flowchart illustrating a process performed at the cradle 1 when right information is used in the data communication system according to the second embodiment. The process represented in FIG. 30 is performed mainly by the control unit 11 and the transmission and reception controlling unit 17 when the cradle 1 is in a state of power to the cradle 1 being on. Further, as in the first embodiment, the cradle 1 in the second embodiment can also be mounted with a plurality of mobile devices simultaneously, and the process represented in FIG. 30 can be performed for a maximum number of mobile devices mountable on the cradle 1 by so-called multitasking.

When the power is turned on, the control unit 11 of the cradle 1 controls the mounting detecting unit 16 to start mobile device mounting detection and determines whether a mobile device is mounted on the cradle 1 (step S4101). When it is determined in the determination process of step S4101 that the mobile device is not mounted, the control unit 11 repeats the mobile device mounting detection, and waits for the mobile device to be mounted.

When it is determined in the determination process of step S4101 that the mobile device is mounted, the control unit 11 controls the charging controlling unit 19 to check a state of charge of the battery of the newly mounted mobile device 4 (step S4102). The process of step S4102 can be performed by an electrical detection process such as detecting the voltage of the battery of the mobile device 4, for example.

The control unit 11 then determines on the basis of a result of the check in step S4102 whether the newly mounted mobile device 4 should be charged (step S4103). When the control unit 11 determines that the newly mounted mobile device 4 should be charged, the control unit 11 controls the charging controlling unit 19 to start charging the battery of the newly mounted mobile device (step S4104). When the control unit 11 determines in the determination process of step S4103 that the newly mounted mobile device 4 does not need to be charged, the control unit 11 proceeds to a process of step S4105.

Next, the control unit 11 forms device ID inquiry command data described with reference to FIG. 7B, and the transmission and reception controlling unit 17 controls the radio communication unit 15a and the transmitting and receiving antenna 15b to transmit the device ID inquiry command data to the newly mounted mobile device 4 through the radio communication unit 15a and the transmitting and receiving antenna 15b (step S4105). A device ID response is transmitted from the mobile device 4 in response to the device ID inquiry command data. Thus, the transmission and reception controlling unit 17 of the cradle 1 receives the device ID response described with reference to FIG. 7C from the mobile device 4 through the transmitting and receiving antenna 15*b* and the radio communication unit 15*a* (step S4106).

Then, the control unit 11 of the cradle 1 determines whether the mounted mobile device 4 has a wide area communication function on the basis of a device ID included in the device ID response received in step S4106 (step S4107). When the control unit 11 determines in the determination process of step S4107 that the mobile device mounted on the cradle 1 does not have a wide area communication function, the mobile device does not use right information. Thus, the control unit 11 checks a state of charge of the battery in the mobile device 4 (step S4108). The control unit 11 determines on the basis of a result of the check in step S4108 whether the charging of the mobile device 4 is completed (step S4109).

When the control unit 11 determines in the determination process of step S4109 that the charging of the mobile device 4 has not been completed, the control unit 11 repeats the process from step S4108, and is in a waiting state until the charging is completed. When the control unit 11 determines in the determination process of step S4109 that the charging has been completed, the control unit 11 controls the charging controlling unit 19 to end the charging process (step S4110). Then the process represented in FIG. 30 is ended.

Further, when it is determined in step S4103 that the charging is not necessary and thus the charging is not started in step S4104, it is possible to determine that the charging is not necessary through the process of step S4108 and step S4109, skip the process of step S4110, and end the process represented in FIG. 30.

When the control unit 11 determines in the determination process of step S4107 that the mobile device mounted on the cradle 1 has a wide area communication function, the transmission and reception controlling unit 17 reports the device ID received in step S4106 to the server device 2 through an external I/F 14*a* and an input-output terminal 14*b* (step S4111). In the second embodiment, the mobile device is a portable telephone terminal. Therefore the device ID of the mobile device 4 is reported to the server device in step S4111.

In response to the report in step S4111, when there is music data whose right information has not been transmitted from the server device 2 in the music data independently downloaded by the server device 2, the untransmitted right information is transmitted from the server device 2 to the portable telephone terminal 4 as mobile device. The cradle 1 therefore receives the untransmitted right information through the input-output terminal 14*b* and the external I/F 14*a*, and then transmits the untransmitted right information to the portable telephone terminal 4 through the radio communication unit 15*a* and the transmitting and receiving antenna 15*b* (step S4112).

Then, the control unit 11 of the cradle 1 forms an untransmitted right information presence or absence inquiry, and the transmission and reception controlling unit 17 controls the radio communication unit 15*a* and the transmitting and receiving antenna 15*b* to transmit the untransmitted right information presence or absence inquiry to the portable telephone terminal 4 as the newly mounted mobile device through the radio communication unit 15*a* and the transmitting and receiving antenna 15*b* (step S4113).

In response to the inquiry in step S4113, an untransmitted right information presence or absence response is transmitted from the portable telephone terminal 4. The cradle 1 receives the untransmitted right information presence or absence response through the transmitting and receiving antenna 15*b* and the radio communication unit 15*a* (step S4114). The cradle 1 determines whether the portable telephone terminal 4 has untransmitted right information on the basis of the received untransmitted right information presence or absence response (step S4115).

When the control unit 11 determines in the determination process of step S4115 that the portable telephone terminal 4 does not have untransmitted right information, the control unit 11 performs the process from step S4108. When the process of charging the battery of the portable telephone terminal 4 is completed, the process represented in FIG. 30 is ended. When the control unit 11 determines in the determination process of step S4115 that the portable telephone terminal 4 has untransmitted right information, the control unit 11 of the cradle 1 forms information reporting that there is untransmitted right information, and the transmission and reception controlling unit 17 transmits the information to the server device 2 through the external I/F 14*a* and the input-output terminal 14*b* (step S4116).

In response to the report in step S4116, an untransmitted right information transmission request is transmitted from the server device 2. The cradle 1 receives the untransmitted right information transmission request through the input-output terminal 14*b* and the external I/F 14*a*, and then transmits the untransmitted right information transmission request to the portable telephone terminal 4 through the radio communication unit 15*a* and the transmitting and receiving antenna 15*b* (step S4117).

In response to the untransmitted right information transmission request, the untransmitted right information is transmitted from the portable telephone terminal 4 as a mobile device. The cradle 1 receives the untransmitted right information through the transmitting and receiving antenna 15*b* and the radio communication unit 15*a*, and then transmits the untransmitted right information to the server device 2 through the external I/F 14*a* and the input-output terminal 14*b* (step S4118). Thereafter, the process from step S4108 is performed. When the process of charging the battery of the portable telephone terminal 4 is completed, the process represented in FIG. 30 is ended.

[Process of Server Device 2 when Right Information is Used]

Figure 31:
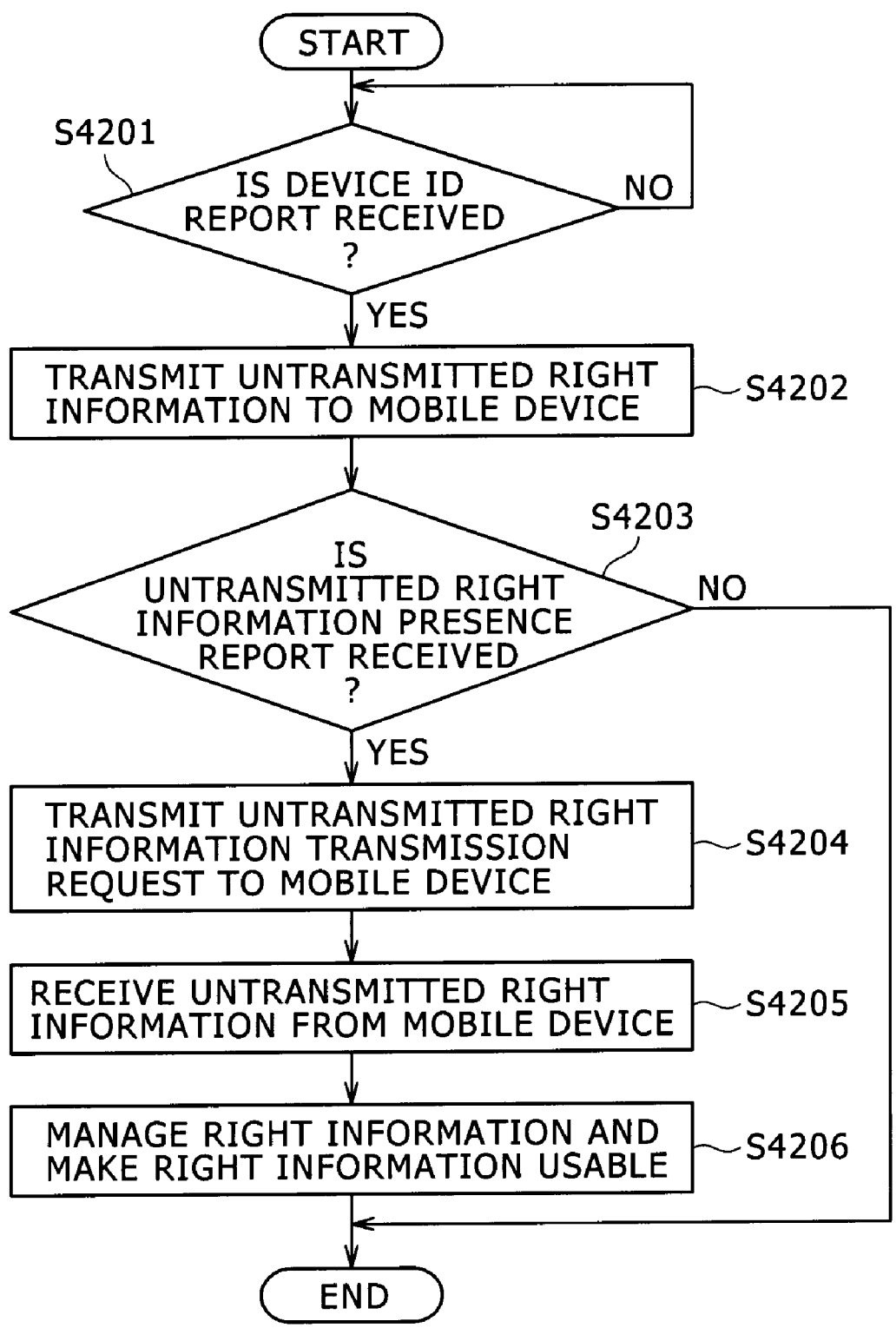
FIG. 31 is a flowchart illustrating a process performed at the server device when right information is used in the data communication system to which the above embodiment of the present invention is applied.

FIG. 31 is a flowchart illustrating a process performed at the server device 2 when right information is used in the data communication system according to the second embodiment. The process represented in FIG. 31 is performed mainly by the control unit 21 and the transmission and reception controlling unit 27 when the server device 2 is in a state of power to the server device 2 being on.

When the power is turned on, the transmission and reception controlling unit 27 of the server device 2 determines whether a report on the device ID of the mobile device mounted on the cradle 1 is received from the cradle 1 through the input-output terminal 26*b* and the external I/F 26*a* (step S4201). When the transmission and reception controlling unit 27 determines in the determination process of step S4201 that the device ID report has not been received yet, the transmission and reception controlling unit 27 repeats the process from step S4201, and waits to receive the report on the device ID of the mobile device mounted on the cradle 1.

When the transmission and reception controlling unit 27 determines in the determination process of step S4201 that the device ID report is received from the cradle 1, it is shown that the mobile device 4 having a wide area communication function is newly mounted on the cradle 1. Thus, the control unit 21 forms right information transmission data having the constitution shown in FIG. 26 for right information that is added to music data independently downloaded by the server device 2 and which has not yet been transmitted to the mobile device 4, or the portable telephone terminal 4 in the second embodiment. The transmission and reception controlling unit 27 transmits the right information transmission data through the external I/F 26a and the input-output terminal 26b to transmit the right information transmission data to the portable telephone terminal 4 newly mounted on the cradle 1 via the cradle 1 (step S4202).

Next, the control unit 21 determines whether a report transmitted from the cradle 1 and indicating that there is untransmitted right information from the portable telephone terminal 4 is received (step S4203). When the control unit 21 determines in the determination process of step S4203 that a report indicating that there is untransmitted right information is not received, the control unit 21 determines that there is no right information to be received from the mobile device. Then the process represented in FIG. 31 is ended.

When the control unit 21 determines in the determination process of step S4203 that a report indicating that there is untransmitted right information is received, the control unit 21 forms an untransmitted right information transmission request, and then the transmission and reception controlling unit 27 transmits the untransmitted right information transmission request through the external I/F 26a and the input-output terminal 26b to transmit the untransmitted right information transmission request to the portable telephone terminal 4 via the cradle 1 (step S4204).

In response to the request transmitted in step S4204, the untransmitted right information (untransmitted right information transmission data) is transmitted from the portable telephone terminal 4 as a mobile device mounted on the cradle 1. The control unit 21 receives the right information through the input-output terminal 26b and the external I/F 26a (step S4205), stores the right information on the HDD 30, and manages the right information so that the right information can be used (step S4206). Then the process represented in FIG. 31 is ended.

[Process of Mobile Device 4 when Right Information is Used]

Figure 32:
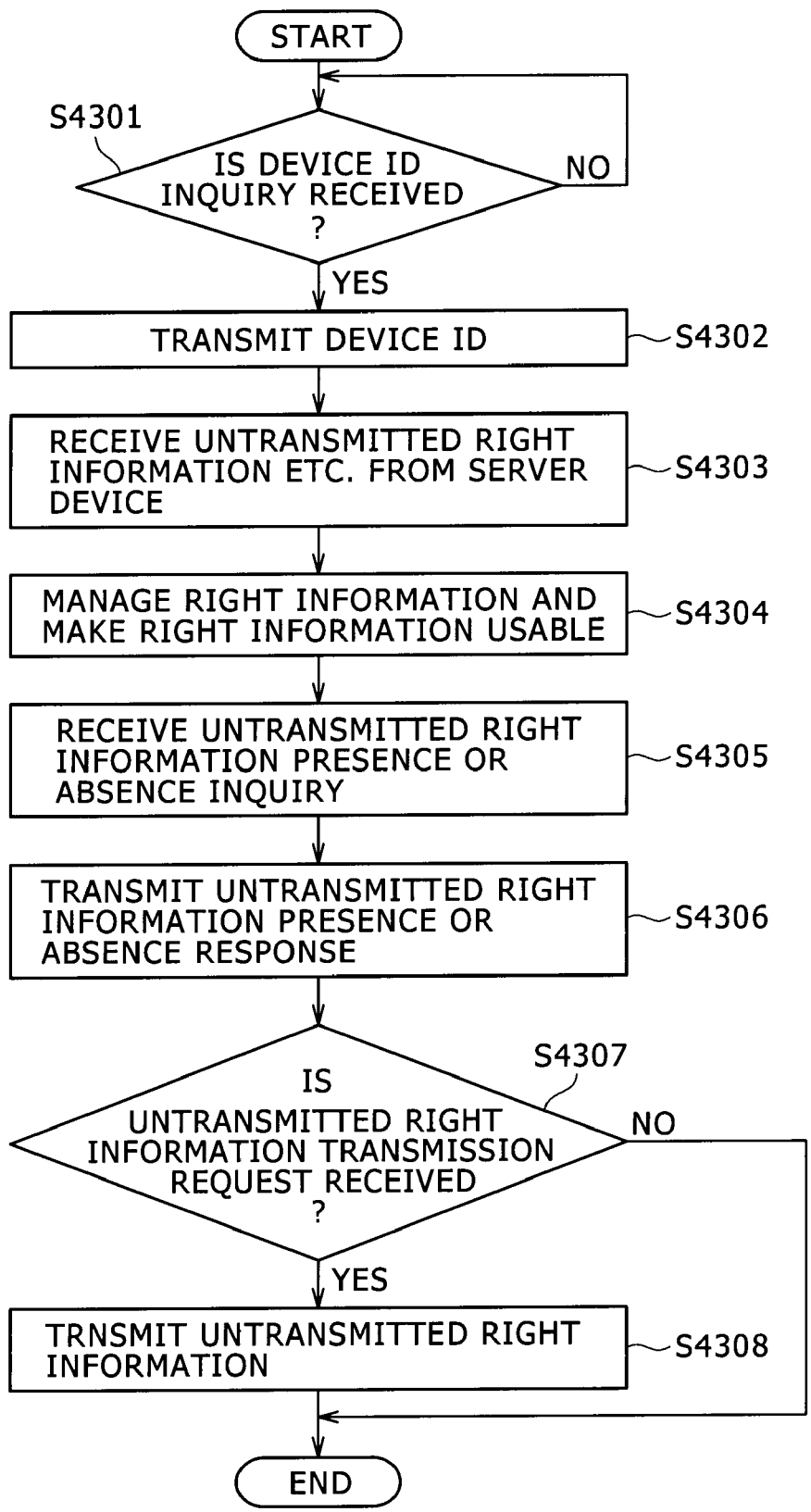
FIG. 32 is a flowchart illustrating a process performed at the portable telephone terminal as a mobile device when right information is used in the data communication system to which the above embodiment of the present invention is applied.

FIG. 32 is a flowchart illustrating a process performed at the portable telephone terminal 4 as a mobile device when right information is used in the data communication system according to the second embodiment. The process represented in FIG. 32 is performed mainly by the control unit 61 of the portable telephone terminal 4 when the portable telephone terminal 4 as a mobile device is set in a predetermined mode such for example as a charging mode in which mode the portable telephone terminal 4 is mounted on the cradle 1 and performs data communication and a charging process.

First, when the portable telephone terminal 4 is changed to the predetermined mode, the control unit 61 determines whether a device ID inquiry from the cradle 1 is received through the transmitting and receiving antenna 66b and the radio communication unit 66a (step S4301). When the control unit 61 determines in the determination process of step S4301 that the device ID inquiry has not been received, the control unit 61 repeats the process from step S4301, and waits to receive the device ID inquiry.

When the control unit 61 determines in the determination process of step S4301 that the device ID inquiry has been received from the cradle 1, the control unit 61 obtains necessary information such as the device ID, the device attribute and the like stored and retained in for example the ROM 612 of the mobile device 4, forms a device ID response as shown in FIG. 7C, and then transmits the device ID response to the cradle 1 through the radio communication unit 66a and the transmitting and receiving antenna 66b (step S4302).

Then, the control unit 61 receives untransmitted right information and the like transmitted from the server device 2 via the cradle 1 through the transmitting and receiving antenna 66b and the radio communication unit 66a (step S4303). When the control unit 61 receives the untransmitted right information, the control unit 61 records and manages the right information in for example the content storing unit 62 of the mobile device 4 so that the right information can be used (step S4304).

The control unit 61 thereafter receives an untransmitted right information presence or absence inquiry transmitted from the server device 2 via the cradle 1 through the transmitting and receiving antenna 66b and the radio communication unit 66a (step S4305). Then, in response to the untransmitted right information presence or absence inquiry received in step S4305, the control unit 61 forms an untransmitted right information presence or absence response on the basis of the right information of accumulated data retained by the mobile device 4, and then sends out the untransmitted right information presence or absence response through the radio communication unit 66a and the transmitting and receiving antenna 66b to transmit the untransmitted right information presence or absence response to the server device 2 via the cradle 1 (step S4306).

Then, the control unit 61 receives an untransmitted right information transmission request transmitted from the server device 2 through the transmitting and receiving antenna 66b and the radio communication unit 66a, and determines whether the untransmitted right information transmission request is received (step S4307).

When the control unit 61 determines in the determination process of step S4307 that the untransmitted right information transmission request is received, the control unit 61 forms untransmitted right information shown in FIG. 26 on the basis of the right information of the accumulated data retained by the mobile device 4, and then sends out the untransmitted right information through the radio communication unit 66a and the transmitting and receiving antenna 66b to transmit the untransmitted right information to the server device 2 via the cradle 1 (step S4308). Then the process represented in FIG. 32 is ended.

When the control unit 61 determines in the determination process of step S4307 that the untransmitted right information transmission request is not received, this means that in this example, the mobile device 4 does not have untransmitted right information to be transmitted. Therefore the process represented in FIG. 32 is ended without performing the untransmitted right information transmitting process.

[Summary of Case of Using Right Information]

As is understood from the timing charts of FIGS. 27 to 29 and the flowcharts of FIGS. 30 to 32, in the data communication system in the present example, the right information of music data independently downloaded by each of the portable telephone terminal 4 as a mobile device and the server device 2 can be mutually transmitted and received between the portable telephone terminal 4 and the server device 2 via the cradle 1.

As described above, music data for the mobile device which data has been legally downloaded by the portable telephone terminal 4 is given right information indicating a right to use high-quality music data on another device installed in a home or the like, and the high-quality music data legally downloaded by the server device 2 is given right information indicating a right to use the music data for the mobile device on the mobile device.

Thus, by mutually exchanging these pieces of right information between the portable telephone terminal 4 and the server device 2, the portable telephone terminal 4 and the server device 2 can independently download and use the music data of the same contents in formats suited to the respective devices without directly exchanging the music data between the portable telephone terminal 4 and the server device 2.

It is to be noted that while the above description has been made by taking as an example a case where content data to be downloaded is music data, the present invention is not limited to this. Content data to be downloaded may be AV data, still image data, text data, programs and the like.

Thus, when the mobile device and the server device in the home, for example, cannot process same data or programs because of difference in processing power or the like, data or programs matched to the respective devices can be provided and used. In this case, instead of purchasing a desired content by the mobile device and the server device in the home, for example, separately, when desired data or the like is purchased by one of the mobile device and the server device in the home, for example, a right to use data or a program usable in the other device can be obtained. Thus a new content use mode can be realized.

[(2) Case of Using Log Information of Content Data]

Description will next be made of a case where the log information of content data used in the mobile device is used in the data communication system according to the second embodiment. In this case, the log information of content data is use history information that is kept track of for each piece of the content data, and is information such as the number of times of reproduction, a reproduction end state, a reproduction end position, a reproduction time period and the like.

Such log information of content data is transmitted at least from the mobile device 4 to the server device 2 via the cradle 1. Thereby, as will be described later in detail, the server device 2 can correctly manage a state of use of the content data, and use of the content data through the server device 2 can be made in concert with use of the same content data in the mobile device 4.

[Example of Layout of Accumulated Data Including Log Information]

FIG. 33 is a diagram illustrating accumulated data (content data) stored and retained in the content storing unit 62 of the portable telephone terminal 4 as a mobile device and having log information added thereto, the accumulated data being for example data obtained by a download from a server device on the Internet or data provided from the server device 2 via the cradle 1 in the second embodiment. Further, description will be made supposing that the accumulated data in this case is moving image data (moving image contents).

As shown in FIG. 33, management information and log information are added to moving image data as accumulated data accumulated in the content storing unit 62 of the portable telephone terminal 4 as a mobile device. As shown in FIG. 33, the management information includes a device ID, a data ID, a data attribute, a date and time of generation, data size, and other information.

Also in the case of the accumulated data shown in FIG. 33, the device ID is information identifying a device that accumulates the accumulated data. The data ID can uniquely identify the accumulated data. The data attribute is information indicating a data type and indicating whether the accumulated data is still image data, moving image data, audio data or the like. The data size is information indicating the size of the accumulated data. The date and time of generation is information indicating a date and time when the accumulated data is first recorded in the content storing unit 62. In addition, various management information can be added as the other information.

As shown in FIG. 33, the log information includes content identifying information, the number of times of reproduction, a reproduction end state, a reproduction end position, reproduction time period information, and other information. The content identifying information identifies the content data to which the content identifying information is added. That is, when the content data is a music content, the content identifying information can uniquely identify the musical piece, and when the content data is moving image data of a movie or the like, the content identifying information can uniquely identify the content itself.

The number of times of reproduction indicates the number of times that the content data has been reproduced. The reproduction end state indicates whether the reproduction of the content data is performed to an end and finished or whether the reproduction of the content data is ended at an intermediate point. The reproduction end position is information indicating a position on the content data at which position the reproduction is ended, and is indicated by a time from a start of the content data, an address corresponding to an amount of data, or the like.

The reproduction time period information indicates how many times the content data has been reproduced in which time periods, with 24 hours of a day divided into 8 time periods of 3 hours, for example. Further, reproduction time periods are not limited to 8 time periods of 3 hours. It is of course possible to divide 24 hours of a day into 6 time periods of 4 hours, 3 time periods of 8 hours, or 2 time periods of a morning and an afternoon.

In the accumulated data shown in FIG. 33, when the moving image data as the content data of the accumulated data is reproduced, the content storing unit 62 is controlled by a function of the control unit 61 to update each of the number of times of reproduction, the reproduction end state, the reproduction end position, and the reproduction time period information of the reproduced moving image data. Further, the number of times of reproduction and the reproduction time period information are each incremented by one each time reproduction is performed.

Thus, in the present example, the log information is added to the accumulated data accumulated in the content storing unit 62 of the portable telephone terminal 4 as a mobile device. It is therefore possible to correctly grasp the number of times of reproduction of the content data included in the accumulated data, the end state of the content data, the end position of the content data, and a time period in which the content data is often reproduced.

Further, the log information is not limited to the log information shown in FIG. 33, but can of course include various other information related to the use of the content data, such for example as reproduction date and time information and history information on operations of fast forward, fast reverse, a pause and the like when the operations are performed.

[Example of Layout of Log Information Transmission Data]

FIG. 34 is a diagram illustrating an example of layout of log information transmission data transmitted from the portable telephone terminal 4 as a mobile device to the server device 2 via the cradle 1, as described above.

As shown in FIG. 34, the log information transmission data in the present example includes a classification, a transmission destination, a transmission source, and content reproduction log information. The classification indicates that the data is log information transmission data. The transmission destination is information identifying a device to which to transmit the log information transmission data. The device ID of the transmission destination is input as the transmission destination. The transmission source is information identifying the device of the transmission source that transmits the log information transmission data. The device ID of the transmission source is input as the transmission source.

Each of pieces of information forming the content reproduction log information is formed on the basis of the log information of the accumulated data described with reference to FIG. 33. Thus, each of pieces of information such as content identifying information, the number of times of reproduction, a reproduction end state, a reproduction end position, a reproduction time period, and others forming the content reproduction log information of the log information transmission data shown in FIG. 34 is the same as the corresponding information of the log information added to the accumulated data shown in FIG. 33.

The thus formed log information transmission data shown in FIG. 34 is transmitted at least from the portable telephone terminal 4 as a mobile device to the server device 2 installed in a home via the cradle 1, as will be described below.

[Operation of Data Communication System when Log Information is Transmitted and Received]

The operation of the data communication system according to the second embodiment when the log information of content data is transmitted from the portable telephone terminal 4 as a mobile device to the server device 2 via the cradle 1 will next be described with reference to a timing chart of FIG. 35. Also in the data communication system in the present example according to the second embodiment, as in the data communication system according to the first embodiment described with reference to FIG. 1, the cradle 1 and the server device 2 are connected to each other by wire using an interface cable 3.

The cradle 1 is connected to the mobile device 4 mounted on the cradle 1 by radio using near field radio communication technology. As will be described below, communication between the portable telephone terminal 4 as a mobile device mounted on the cradle 1 and the server device 2 connected to the cradle 1 by wire is performed via the cradle 1.

In the present example, suppose that one or more pieces of accumulated data having the layout described with reference to FIG. 33 are stored and retained in the content storing unit 62 of the portable telephone terminal 4 as a mobile device mounted on the cradle 1. As described above, such accumulated data is downloaded from a server device on the Internet by the portable telephone terminal 4 using the wide area communication function of the portable telephone terminal 4, or obtained from the server device 2 via the cradle 1.

Also in the present example, inquiries, responses, requests, reports and the like to be transmitted and received in the data communication system are formed according to the layout shown in FIG. 7A and then used.

Figure 35:
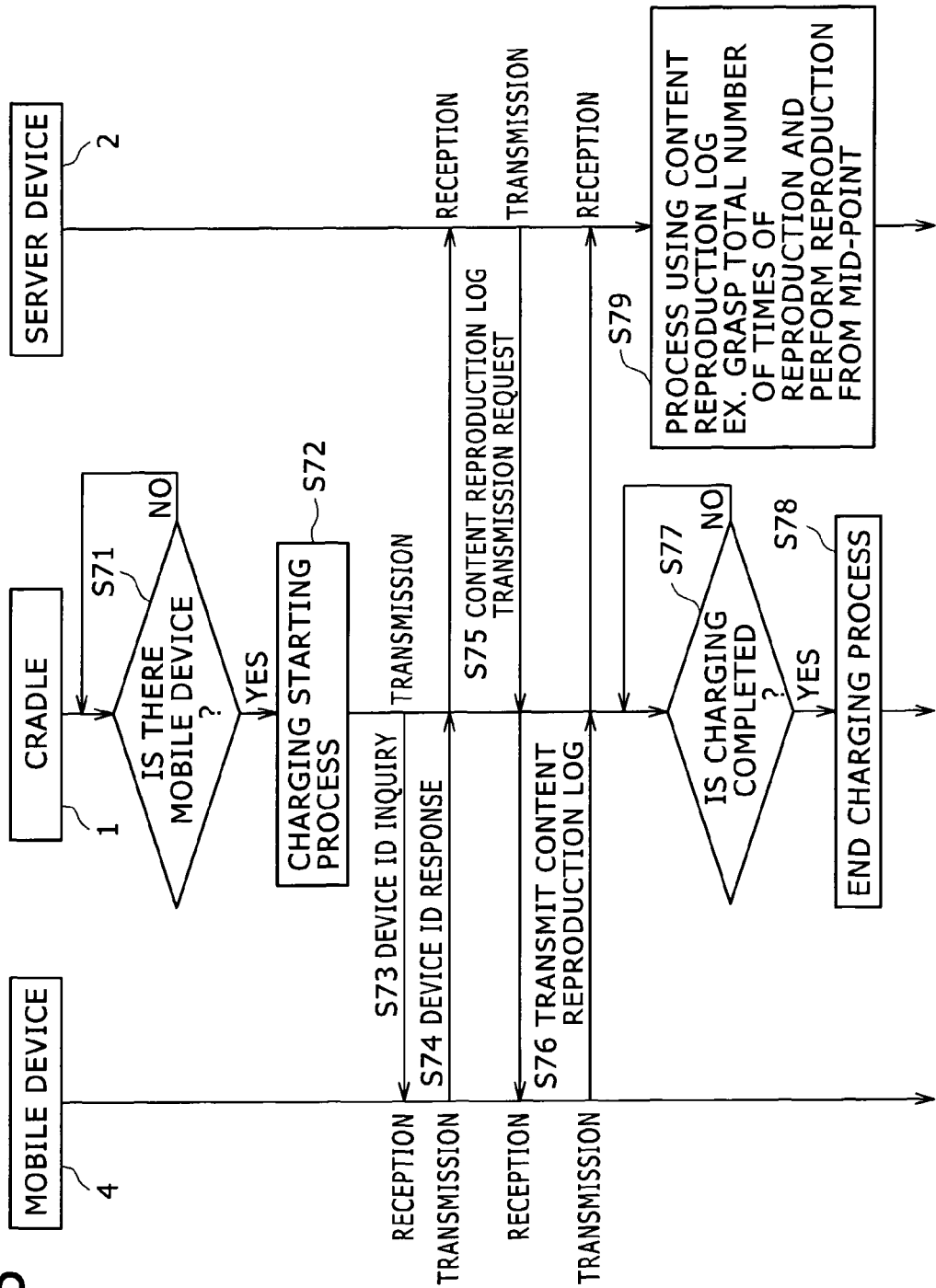
FIG. 35 is a timing chart illustrating an operation when log information is transmitted and received in the data communication system to which the above embodiment of the present invention is applied.

As shown in FIG. 35, when the cradle 1 is in a state of power to the cradle 1 being on, the cradle 1 determines whether a mobile device 4 is mounted on the cradle 1 at predetermined intervals by the function of the mounting detecting unit 16 (step S71). As described above, the cradle 1 in the present embodiment can be mounted with a plurality of mobile devices simultaneously, and each time a new mobile device is mounted on the cradle 1, the cradle 1 can detect that the mobile device is mounted.

When the cradle 1 determines in the determination process of step S71 that no mobile device 4 is mounted, the cradle 1 repeats the determination process of step S71 to wait for a mobile device to be mounted on the cradle 1. When the cradle 1 determines in the determination process of step S71 that a mobile device 4 is mounted, the cradle 1 performs a process of starting to charge a portable telephone terminal 4 as the mounted mobile device (step S72).

The transmission and reception controlling unit 17 in the cradle 1 thereafter controls the radio communication unit 15a to transmit a device ID inquiry having the constitution shown in FIG. 7B to the portable telephone terminal 4 as the mobile device newly mounted on the cradle 1 (step S73). In response to the device ID inquiry, the portable telephone terminal 4 transmits a device ID response having the constitution shown in FIG. 7C (step S74). Thus, the cradle 1 receives the device ID response from the portable telephone terminal 4, and then transmits the device ID response to the server device 2.

The server device 2 to which the device ID of the portable telephone terminal 4 as the mobile device mounted on the cradle 1 is reported forms a request to transmit content reproduction log information, and then transmits the request to transmit content reproduction log information to the portable telephone terminal 4 via the cradle 1 (step S75). In response to this request, the portable telephone terminal 4 forms log information transmission data having the layout shown in FIG. 34 on the basis of the log information of each piece of accumulated data stored in the content storing unit 62 of the portable telephone terminal 4, and then transmits the log information transmission data to the server device 2 via the cradle 1 (step S76).

Then, the cradle 1 receives the log information transmission data from the portable telephone terminal 4, and transmits the log information transmission data to the server device 2. Thereafter, the cradle 1 checks a state of charge of the battery of the portable telephone terminal 4 as the mobile device, and is set in a waiting state until charging is completed (step S77). When the cradle 1 determines that the charging is completed, the cradle 1 ends the process of charging the battery of the portable telephone terminal 4 mounted on the cradle 1 (step S78). Then the process represented in FIG. 35 is ended.

Meanwhile, the server device 2 receives the log information transmission data transmitted via the cradle 1, stores the log information transmission data on the HDD 30, for example, and is able to perform a process based on the log information transmission data (step S79). The process based on the log information transmission data which process is performed by the server device 2 is for example a process of grasping a total number of times of reproduction of each piece of content data, a process of reproducing content data from an intermediate point, a process of grasping reproduction time periods of each piece of content data, or the like.

The process of grasping a total number of times of reproduction of each piece of content data is a process of obtaining a total number of times of reproduction by adding together the number of times of reproduction which number is grasped by the portable telephone terminal 4 and the number of times of reproduction which number is grasped by the server device 2 when the portable telephone terminal 4 as a mobile device and the server device 2 have content data of same contents. It is thereby possible to grasp accurately the number of times that each piece of content data has been used through both the portable telephone terminal 4 and the server device 2.

The process of reproducing content data from an intermediate point is a process in which the server device 2 identifies content data whose reproduction by the portable telephone terminal 4 was ended at an intermediate point on the basis of the reproduction end state and the reproduction end position of the log information from the portable telephone terminal 4, and the server device 2 reproduces the identified content data from the end position at which the reproduction was ended so that the content data can be used, when the portable telephone terminal 4 as a mobile device and the server device 2 have the content data of same contents.

Thus, even when the reproduction of content data being reproduced and used in the portable telephone terminal 4 was ended at an intermediate point, the server device 2 can reproduce and use the content data from the intermediate point. In addition, because the reproduction end position on the content data in the portable telephone terminal 4 is grasped accurately, the server device 2 can automatically reproduce the content data from the desired reproduction end position without the user performing a troublesome process of finding the desired reproduction end position.

Further, even if respective pieces of content data used in the portable telephone terminal 4 and the server device 2 have same contents but are in different data formats or the like for the portable telephone terminal 4 and the server device 2 and are physically of different data sizes, when correspondences between the pieces of content data having the same contents are grasped, a reproduction end position on the content data used in the server device 2 can be identified from a reproduction end position on the content data which position is grasped in the portable telephone terminal 4.

The process of grasping reproduction time periods of each piece of content data enables the server device 2 to grasp reproduction time periods of each piece of content data on the basis of the reproduction time period information of the log information transmission data from the portable telephone terminal 4. It is thereby possible to objectively learn in which time periods each piece of content data is used in the portable telephone terminal 4. Therefore preferences of the user in content data and modes of use of the portable telephone terminal 4 can be grasped.

[Process of Cradle 1 when Log Information is Used]

Figure 36:
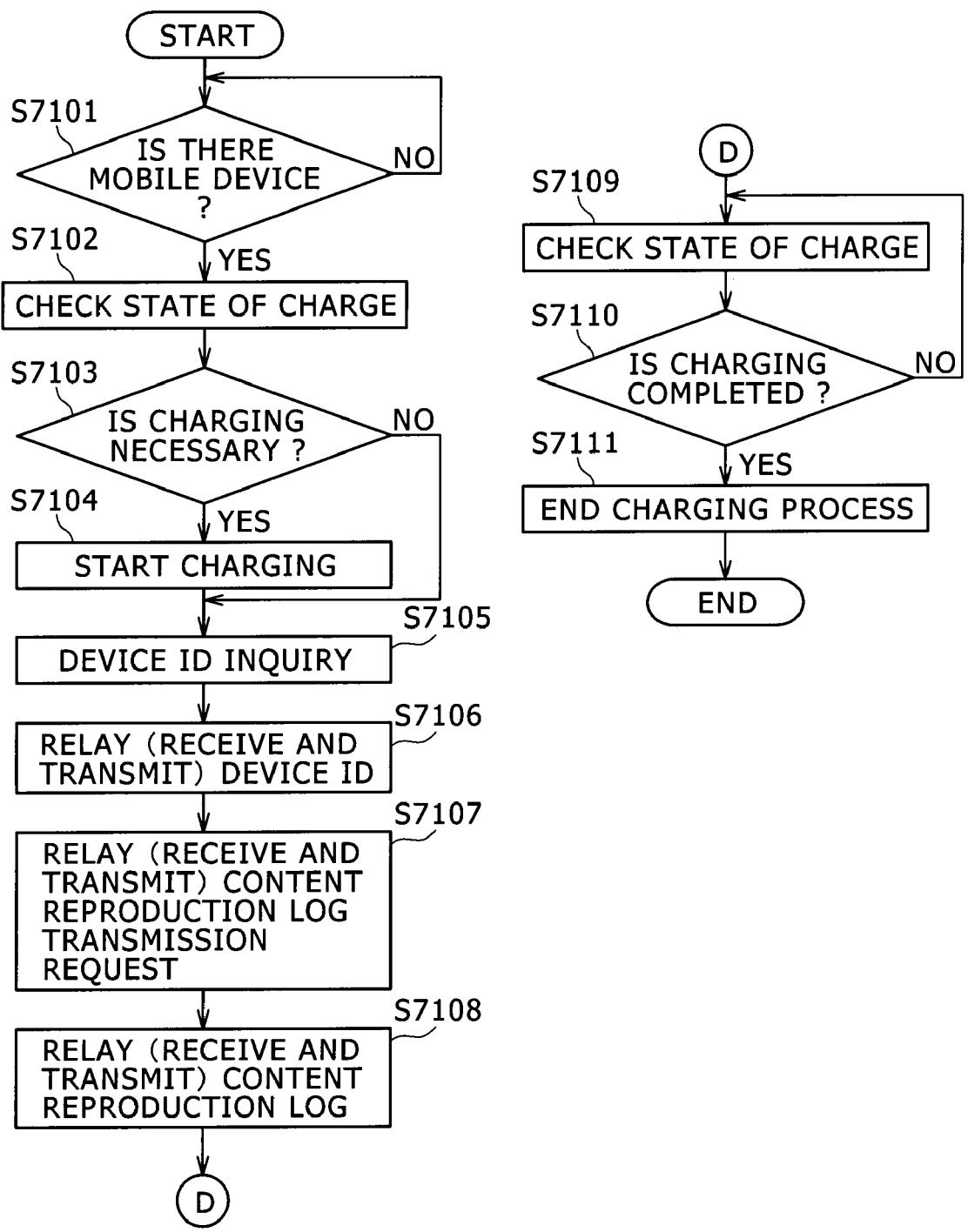
FIG. 36 is a flowchart illustrating a process performed at the cradle when log information is used in the data communication system to which the above embodiment of the present invention is applied.

FIG. 36 is a flowchart illustrating a process performed at the cradle 1 when log information is used in the data communication system according to the second embodiment. The process represented in FIG. 36 is performed mainly by the control unit 11 and the transmission and reception controlling unit 17 when the cradle 1 is in a state of power to the cradle 1 being on. Further, as in the first embodiment, the cradle 1 in the second embodiment can also be mounted with a plurality of mobile devices simultaneously, and the process represented in FIG. 36 can be performed for a maximum number of mobile devices mountable on the cradle 1 by so-called multitasking.

When the power is turned on, the control unit 11 of the cradle 1 controls the mounting detecting unit 16 to start mobile device mounting detection and determines whether a mobile device is mounted on the cradle 1 (step S7101). When it is determined in the determination process of step S7101 that the mobile device is not mounted, the control unit 11 repeats the mobile device mounting detection, and waits for the mobile device to be mounted.

When it is determined in the determination process of step S7101 that the mobile device is mounted, the control unit 11 controls the charging controlling unit 19 to check a state of charge of the battery of the newly mounted mobile device 4 (step S7102). The process of step S7102 can be performed by an electrical detection process such as detecting the voltage of the battery of the mobile device 4, for example.

The control unit 11 then determines on the basis of a result of the check in step S7102 whether the newly mounted mobile device 4 should be charged (step S7103). When the control unit 11 determines that the newly mounted mobile device 4 should be charged, the control unit 11 controls the charging controlling unit 19 to start charging the battery of the newly mounted mobile device (step S7104). When the control unit 11 determines in the determination process of step S7103 that the newly mounted mobile device 4 does not need to be charged, the control unit 11 proceeds to a process of step S7105.

Then, the control unit 11 forms device ID inquiry command data described with reference to FIG. 7B, and the transmission and reception controlling unit 17 controls the radio communication unit 15a and the transmitting and receiving antenna 15b to transmit the device ID inquiry command data to the newly mounted mobile device 4 through the radio communication unit 15a and the transmitting and receiving antenna 15b (step S7105). A device ID report is transmitted from the mobile device 4 in response to the device ID inquiry command data. Thus, the transmission and reception controlling unit 17 of the cradle 1 receives the device ID response described with reference to FIG. 7C from the mobile device 4 through the transmitting and receiving antenna 15b and the radio communication unit 15a, and then transmits the device ID response to the server device 2 through the external I/F 14a and the input-output terminal 14b (step S7106).

Receiving the device ID response, the server device 2 transmits a content reproduction log transmission request, as described above. The transmission and reception controlling unit 17 of the cradle 1 receives the content reproduction log transmission request from the server device 2 through the input-output terminal 14b and the external I/F 14a, and then transmits the content reproduction log transmission request to the mobile device 4 through the radio communication unit 15a and the transmitting and receiving antenna 15b (step S7107).

In response to the content reproduction log transmission request, log information transmission data described with reference to FIG. 34 is formed and then transmitted from the portable telephone terminal 4. The transmission and reception controlling unit 17 of the cradle 1 receives the log information transmission data described with reference to FIG. 34 from the mobile device 4 through the transmitting and receiving antenna 15b and the radio communication unit 15a, and then transmits the log information transmission data to the server device 2 through the external I/F 14a and the input-output terminal 14b (step S7108).

Thereafter, the control unit 11 of the cradle 1 controls the charging controlling unit 19 to check a state of charge of the battery in the mobile device (step S7109). The control unit 11 determines on the basis of a result of the check in step S7109 whether the charging of the mobile device 4 is completed (step S7110).

When the control unit 11 determines in the determination process of step S7110 that the charging of the mobile device 4 has not been completed, the control unit 11 repeats the process from step S7109, and is in a waiting state until the charging is completed. When the control unit 11 determines in the determination process of step S7110 that the charging has been completed, the control unit 11 controls the charging controlling unit 19 to end the charging process (step S7111). Then the process represented in FIG. 36 is ended.

Further, when it is determined in step S7103 that the charging is not necessary and thus the charging is not started in step S7104, it is possible to determine that the charging is not necessary through the process of step S7109 and step S7110, skip the process of step S7111, and end the process represented in FIG. 36.

[Process of Server Device 2 when Log Information is Used]

Figure 37:
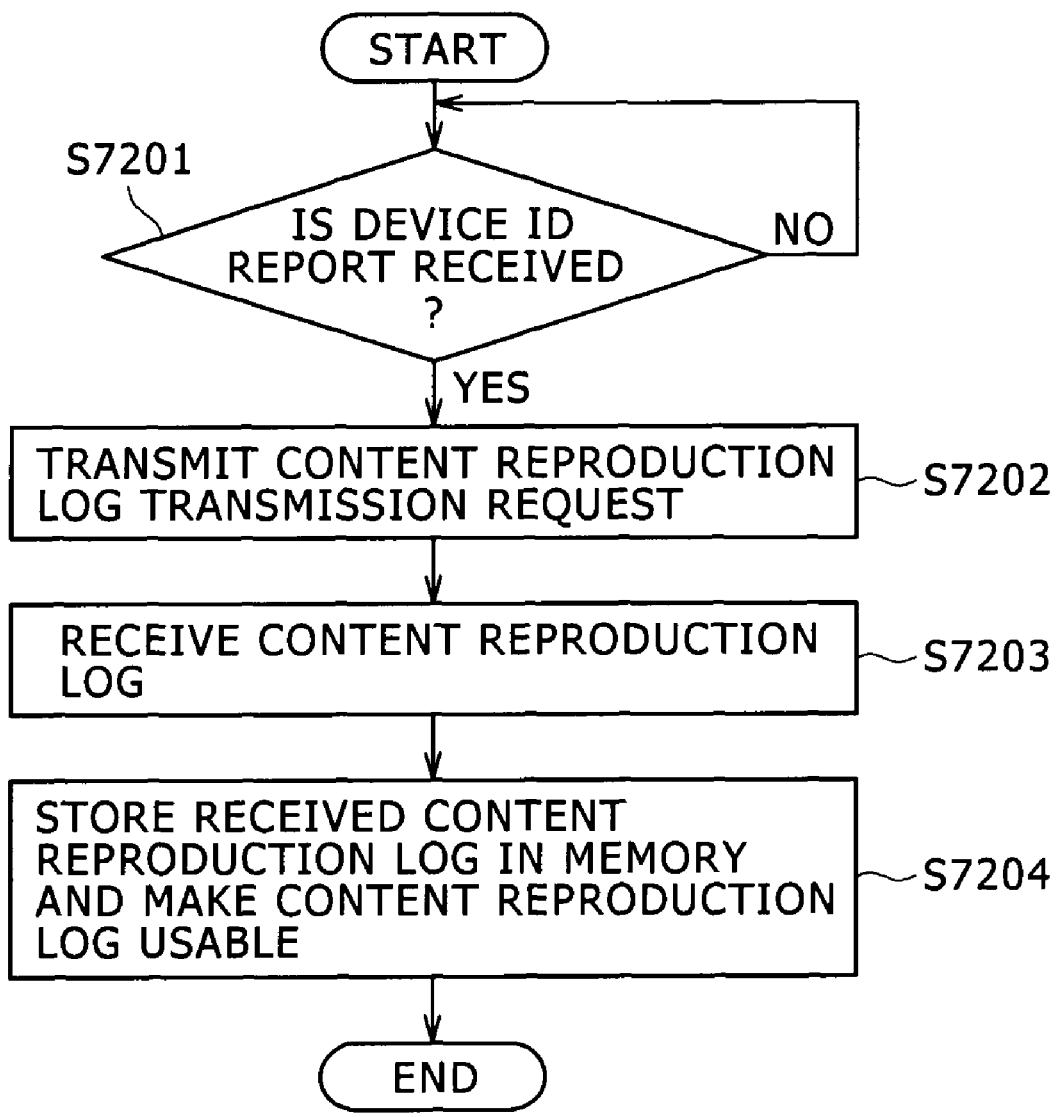
FIG. 37 is a flowchart illustrating a process performed at the server device when log information is used in the data communication system to which the above embodiment of the present invention is applied.

FIG. 37 is a flowchart illustrating a process performed at the server device 2 when log information is used in the data communication system according to the second embodiment. The process represented in FIG. 37 is performed mainly by the control unit 21 and the transmission and reception controlling unit 27 when the server device 2 is in a state of power to the server device 2 being on.

When the power is turned on, the transmission and reception controlling unit 27 of the server device 2 determines whether a report on the device ID of the mobile device mounted on the cradle 1 is received from the cradle 1 through the input-output terminal 26b and the external I/F 26a (step S7201). When the transmission and reception controlling unit 27 determines in the determination process of step S7201 that the device ID report has not been received yet, the transmission and reception controlling unit 27 repeats the process from step S7201, and waits to receive the report on the device ID of the mobile device mounted on the cradle 1.

When the transmission and reception controlling unit 27 determines in the determination process of step S7201 that the device ID report is received from the cradle 1, the control unit 21 forms a content reproduction log transmission request, and then the transmission and reception controlling unit 27 transmits the content reproduction log transmission request through the external I/F 26a and the input-output terminal 26b to transmit the content reproduction log transmission request to the portable telephone terminal 4 as a mobile device via the cradle 1 (step S7202).

In response to the request transmitted in step S7202, log information transmission data (content reproduction log) is transmitted from the portable telephone terminal 4 as the mobile device mounted on the cradle 1. The control unit 21 receives the log information transmission data through the input-output terminal 26b and the external I/F 26a (step S7203), stores the log information transmission data in a memory such as the HDD 30 or the like, and manages the log information transmission data so that the log information transmission data can be used (step S7204). Then the process represented in FIG. 37 is ended.

[Process of Mobile Device 4 when Log Information is Used]

Figure 38:
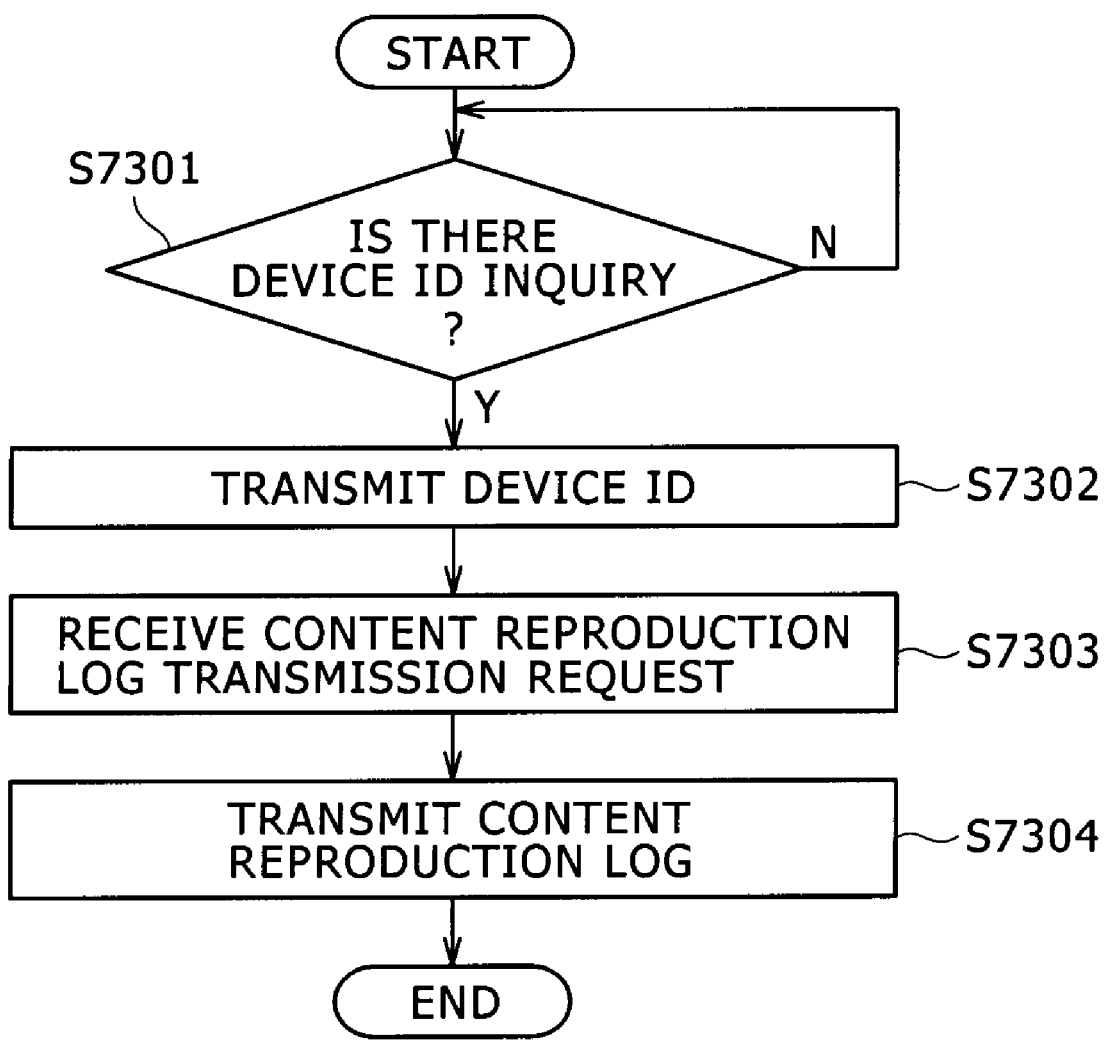
FIG. 38 is a flowchart illustrating a process performed at the portable telephone terminal as a mobile device when log information is used in the data communication system to which the above embodiment of the present invention is applied.

FIG. 38 is a flowchart illustrating a process performed at the portable telephone terminal 4 as a mobile device when log information is used in the data communication system according to the second embodiment. The process represented in FIG. 38 is performed mainly by the control unit 61 of the portable telephone terminal 4 when the portable telephone terminal 4 as a mobile device is set in a predetermined mode such for example as a charging mode in which mode the portable telephone terminal 4 is mounted on the cradle 1 and performs data communication and a charging process.

First, when the portable telephone terminal 4 is changed to the predetermined mode, the control unit 61 determines whether a device ID inquiry from the cradle 1 is received through the transmitting and receiving antenna 66b and the radio communication unit 66a (step S7301). When the control unit 61 determines in the determination process of step S7301 that the device ID inquiry has not been received, the control unit 61 repeats the process from step S7301, and waits to receive the device ID inquiry.

When the control unit 61 determines in the determination process of step S7301 that the device ID inquiry has been received from the cradle 1, the control unit 61 obtains necessary information such as the device ID, the device attribute and the like stored and retained in for example the ROM 612 of the portable telephone terminal 4, forms a device ID response as shown in FIG. 7C, and then transmits the device ID response to the cradle 1 through the radio communication unit 66a and the transmitting and receiving antenna 66b (step S7302).

Then, the control unit 61 receives a content reproduction log transmission request transmitted from the server device 2 via the cradle 1 through the transmitting and receiving antenna 66b and the radio communication unit 66a (step S7303). When the control unit 61 has received the content reproduction log transmission request, the control unit 61 forms log information transmission data having the constitution described with reference to FIG. 34 on the basis of the log information of accumulated data stored and retained in the content storing unit 62, and then sends out the log information transmission data through the radio communication unit 66a and the transmitting and receiving antenna 66b to transmit the log information transmission data to the server device 2 via the cradle 1 (step S7304). Then the process represented in FIG. 38 is ended.

[Summary of Case of Using Log Information]

As is understood from the timing chart of FIG. 35 and the flowcharts of FIGS. 36 to 38, in the data communication system in the present example, the log information of content data can be provided from the portable telephone terminal 4 as a mobile device to the server device 2 via the cradle 1.

As described above, the log information of content data includes the number of times of reproduction of the content data, a reproduction end state, a reproduction end position, reproduction time period information and the like, and enables the server device 2 to grasp a total number of times of reproduction of each piece of content data and check conditions of reproduction by time period.

In addition, when the mobile device 4 and the server device 2 have content data of same contents, for example, the content data whose reproduction in the mobile device 4 was ended at an intermediate point can be reproduced and used from the end position in the server device 2 without troubling the user. That is, the portable telephone terminal 4 as a mobile device and the server device 2 can cooperate with each other for the use of content data.

It is to be noted that while the above description has been made by taking as an example a case where content data to be downloaded is a moving image, the present invention is not limited to this. Content data to be downloaded may be music data, AV data, still image data, text data, programs and the like.

In addition, while the example described with reference to FIGS. 33 to 38 has been described supposing that the log information of content data is transmitted from the portable telephone terminal 4 as a mobile device to the server device 2, the present invention is not limited to this. The log information of accumulated data stored and retained on the HDD 30 of the server device 2 can be formed and then transmitted from the server device 2 to the portable telephone terminal 4 via the cradle 1 so that the portable telephone terminal 4 can grasp the number of times of reproduction of content data and time periods of reproduction of the content data and the portable telephone terminal 4 can continue the reproduction of the content data that was reproduced to an intermediate point by the server device 2 from the intermediate point.

[(3) Case of Using Device Information of Mobile Device]

Description will next be made of a case where the device information of a mobile device is used in the data communication system according to the second embodiment. In this case, the device information of a mobile device includes a date of manufacturing of the mobile device itself, a total operating time, check information, and other information as well as a date of manufacturing of a battery loaded in the mobile device, the number of charges, a charge rate (charge percentage), and other information.

Such device information of the mobile device is transmitted from the mobile device 4 to the server device 2 via the cradle 1. Thereby, as will be described later in detail, the server device 2 can properly manage conditions of the mobile device, provide detailed maintenance information for the mobile device itself, and notify a time for replacement of the battery loaded in the mobile device to recommend the replacement, for example.

[Example of Layout of Transmission Data of Device Information]

FIGS. 39A, 39B, and 39C are diagrams illustrating examples of layout of transmission data of device information and the like. As shown in FIG. 39A, transmission data including a device ID, a manufacturing date, a total operating time, check information, and other information may be used as transmission data for transmitting the device information of the mobile device itself.

The device ID is information identifying a device that transmits the transmission data. The manufacturing date is information indicating a date of manufacturing of the mobile device. The manufacturing date is recorded at the time of manufacturing in for example the ROM 612 of a portable telephone terminal 4 as the mobile device. The total operating time indicates the length of a period for which power to the portable telephone terminal 4 as the mobile device is on. While the power is on, the total operating time is measured by a clock circuit not shown in the figure in the portable telephone terminal 4, and is updated in the nonvolatile memory 614. The check information indicates a part of the portable telephone terminal 4 which part is to be checked according to the total operating time, for example.

As shown in FIG. 39B, transmission data including a battery ID, a manufacturing date, the number of charges, a charge rate (charge percentage), and other information may be used as transmission data for transmitting the battery information of the battery loaded in the mobile device.

The battery ID is information identifying the battery loaded in the mobile device that transmits the transmission data. The battery ID is used because a plurality of batteries may be used alternately, for example. The manufacturing date is information indicating a date of manufacturing of the battery. The manufacturing date is recorded at the time of manufacturing in a memory such as a ROM included in the battery, for example.

The number of charges indicates the number of times that the battery is charged. The number of charges is recorded in a memory such as the ROM included in the battery or the like, and is updated each time charging of the battery is detected. The charge rate (charge percentage) indicates a state of charge of the battery at a present point in time. A charge rate of 100 percent indicates a fully charged state, and the charge rate is decreased to 95 percent, 80 percent, . . . , for example, as power is consumed. This charge rate is information that can be set on the basis of the voltage or the like of the battery, and is updated as appropriate in a memory such as the ROM included in the battery or the like.

The mobile device is generally used with the battery loaded therein. Thus, as shown in FIG. 39C, transmission data including both the device information of the mobile device and the battery information of the battery loaded in the mobile device can be formed and used. Each piece of device information in FIG. 39C has the same contents as described with reference to FIG. 39A, and each piece of battery information in FIG. 39C has the same contents as described with reference to FIG. 39B. Further, while the other information of the device information and the battery information is not entered in FIG. 39C, the other information can be included when the other information is present.

An example of using device information and the like in the data communication system according to the second embodiment will be described below supposing that the portable telephone terminal 4 as a mobile device forms the transmission data of the device information and the like shown in FIG. 39C and then transmits the transmission data to the server device 2 via the cradle 1.

[Operation of Data Communication System when Device Information and Like are Transmitted and Received]

The operation of the data communication system according to the second embodiment when the device information of the portable telephone terminal 4 and the battery information of the battery loaded in the portable telephone terminal 4 are transmitted from the portable telephone terminal 4 as a mobile device to the server device 2 via the cradle 1 will next be described with reference to a timing chart of FIG. 40. Also in the data communication system in the present example according to the second embodiment, as in the data communication system according to the first embodiment described with reference to FIG. 1, the cradle 1 and the server device 2 are connected to each other by wire using an interface cable 3.

The cradle 1 is connected to the mobile device 4 mounted on the cradle 1 by radio using near field radio communication technology. As will be described below, communication between the portable telephone terminal 4 as a mobile device mounted on the cradle 1 and the server device 2 connected to the cradle 1 by wire is performed via the cradle 1.

Also in the present example, inquiries, responses, requests, reports and the like to be transmitted and received in the data communication system are formed according to the layout shown in FIG. 7A and then used.

Figure 40:
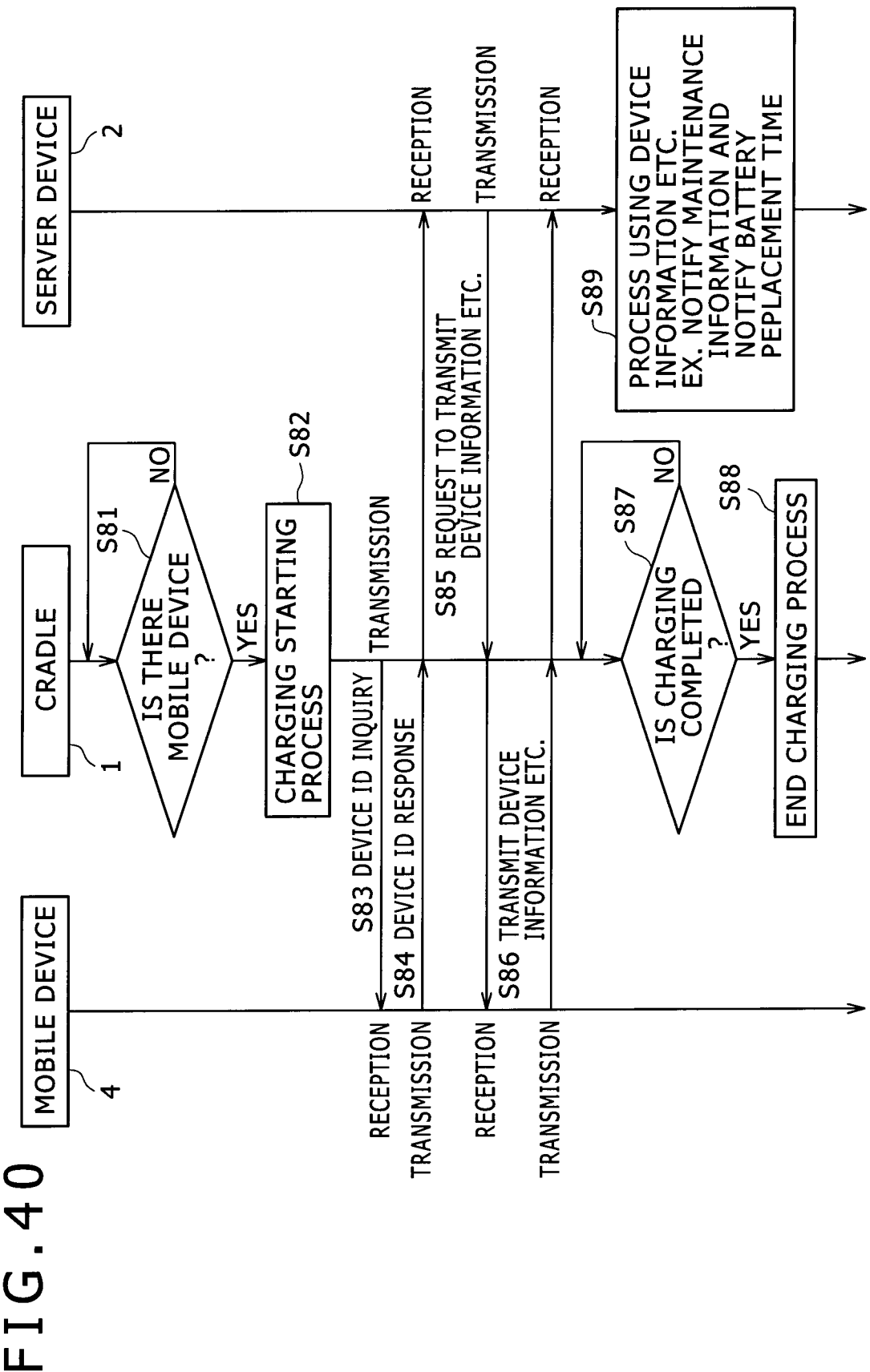
FIG. 40 is a timing chart illustrating an operation when device information and the like are transmitted and received in the data communication system to which the above embodiment of the present invention is applied.

As shown in FIG. 40, when the cradle 1 is in a state of power to the cradle 1 being on, the cradle 1 determines whether a mobile device 4 is mounted on the cradle 1 at predetermined intervals by the function of the mounting detecting unit 16 (step S81). As described above, the cradle 1 in the present embodiment can be mounted with a plurality of mobile devices simultaneously, and each time a new mobile device is mounted on the cradle 1, the cradle 1 can detect that the mobile device is mounted.

When the cradle 1 determines in the determination process of step S81 that no mobile device 4 is mounted, the cradle 1 repeats the determination process of step S81 to wait for a mobile device to be mounted on the cradle 1. When the cradle 1 determines in the determination process of step S81 that a mobile device 4 is mounted, the cradle 1 performs a process of starting to charge the portable telephone terminal 4 as the mounted mobile device (step S82).

The transmission and reception controlling unit 17 in the cradle 1 thereafter controls the radio communication unit 15*a* to transmit a device ID inquiry having the constitution shown in FIG. 7B to the portable telephone terminal 4 as the mobile device newly mounted on the cradle 1 (step S83). In response to the device ID inquiry, the portable telephone terminal 4 transmits a device ID response having the constitution shown in FIG. 7C (step S84). Thus, the cradle 1 receives the device ID report from the portable telephone terminal 4, and then transmits the device ID report to the server device 2.

The server device 2 to which the device ID of the portable telephone terminal 4 as the mobile device mounted on the cradle 1 is reported forms a request to transmit device information and the like, and then transmits the request to transmit device information and the like to the portable telephone terminal 4 via the cradle 1 (step S85). In response to this request, the portable telephone terminal 4 forms transmission data of device information and the like having the layout shown in FIG. 39C on the basis of information stored and retained in the ROM 612 and the nonvolatile memory 614 of the portable telephone terminal 4 and information recorded in the memory included in the battery 64 loaded in the portable telephone terminal 4, and then transmits the transmission data of the device information and the like to the server device 2 via the cradle 1 (step S86).

Then, the cradle 1 receives the transmission data of the device information and the like from the portable telephone terminal 4, and transmits the transmission data of the device information and the like to the server device 2. Thereafter, the cradle 1 checks a state of charge of the battery of the portable telephone terminal 4 as the mobile device, and is set in a waiting state until charging is completed (step S87). When the cradle 1 determines that the charging is completed, the cradle 1 ends the process of charging the battery of the portable telephone terminal 4 mounted on the cradle 1 (step S88). Then the process represented in FIG. 40 is ended.

Meanwhile, the server device 2 receives the transmission data of the device information and the like transmitted via the cradle 1, stores the transmission data of the device information and the like on the HDD 30, for example, and is able to perform a process based on the transmission data of the device information and the like (step S89). The process based on the transmission data of the device information and the like which process is performed by the server device 2 is for example a process of notifying a time for maintenance of the mobile device, notifying a maintenance provider, notifying a check part, or notifying a time for replacement of the battery.

The notification of a time for maintenance of the mobile device and the notification of a maintenance provider are performed on the basis of the manufacturing date and the total operating time in the transmission data of the device information and the like. When the total operating time from the manufacturing date becomes a set time or more, a notification indicating that the mobile device needs maintenance is made by using a function on the server device 2 side. In this case, information serving as a reference for determining whether the total operating time from the manufacturing date is the set time and information on a service center or the like that provides maintenance can be obtained from a server device on the Internet using the wide area communication function of the server device 2.

A check part of the mobile device is notified on the basis of the total operating time and the check information in the transmission data of the device information and the like. In this case, the check information is obtained by associating the name and the model number of expendable parts and the total operating time indicating a replacement time with each other, and is to notify an expendable part whose replacement time arrives on the basis of the total operating time using a function on the server device 2 side.

The notification of a time for replacement of the battery is made on the basis of the number of charges of the battery. When the number of charges has exceeded a predetermined number (for example 200 times), replacement of the battery is recommended, and the model number of the battery to be replaced is notified, using a function of the server device 2. Further, the notification of a time for replacement of the battery includes a process that makes it possible to access a home page of a company that manufactures the battery using the wide area communication function of the server device 2, and apply to purchase the battery through the Internet.

It is thereby possible to notify various information that has been notified only by lighting or blinking of a warning lamp in related art, an alarm sound or the like by a mobile device or a battery in detail using a function of the server device 2, and even notify how to respond to the information and make necessary provisions.

[Process of Cradle 1 when Device Information and Like are Used]

Figure 41:
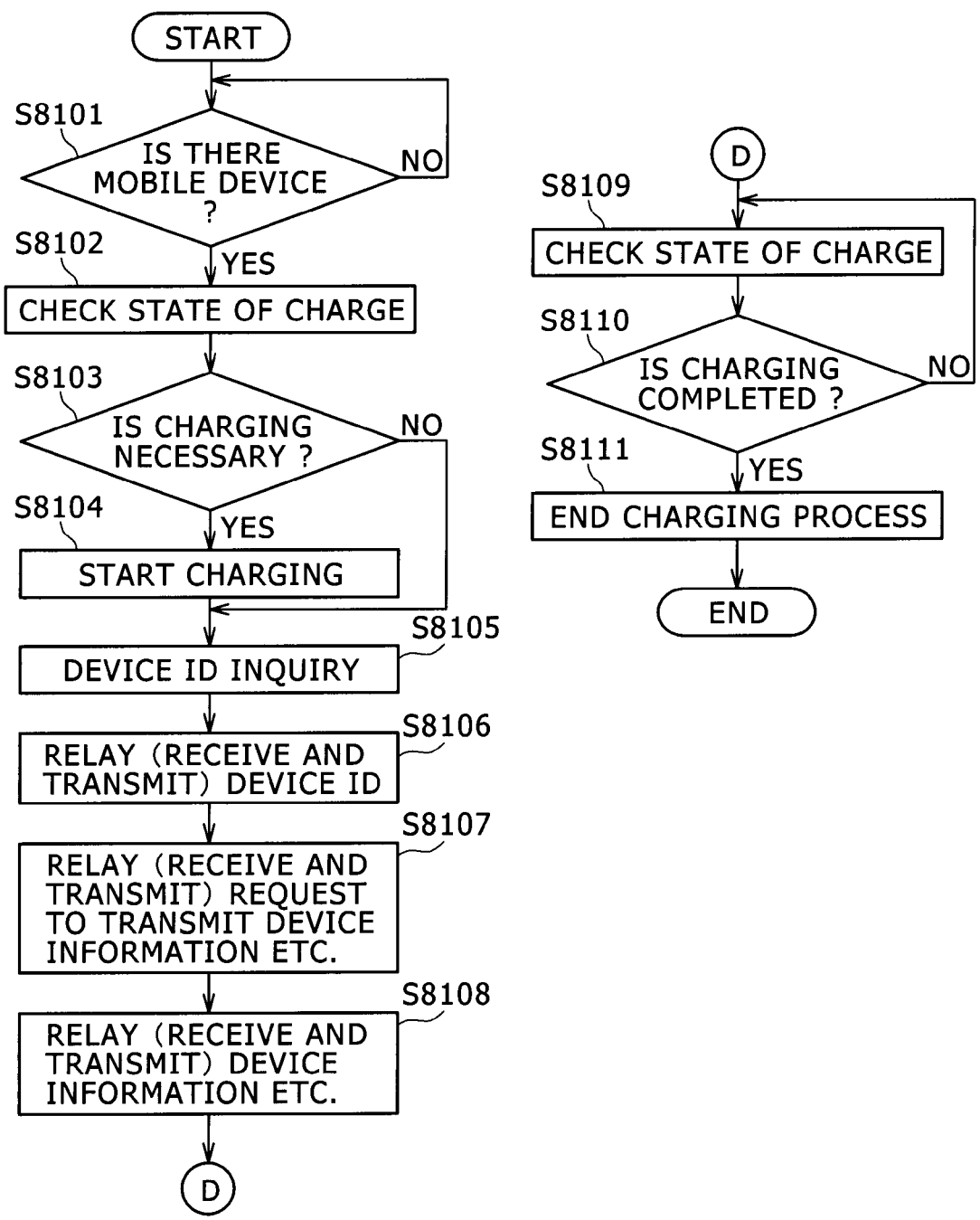
FIG. 41 is a flowchart illustrating a process performed at the cradle when device information and the like are used in the data communication system to which the above embodiment of the present invention is applied.

FIG. 41 is a flowchart illustrating a process performed at the cradle 1 when device information and the like are used in the data communication system according to the second embodiment. The process represented in FIG. 41 is performed mainly by the control unit 11 and the transmission and reception controlling unit 17 when the cradle 1 is in a state of power to the cradle 1 being on. Further, as in the first embodiment, the cradle 1 in the second embodiment can also be mounted with a plurality of mobile devices simultaneously, and the process represented in FIG. 41 can be performed for a maximum number of mobile devices mountable on the cradle 1 by so-called multitasking.

When the power is turned on, the control unit 11 of the cradle 1 controls the mounting detecting unit 16 to start mobile device mounting detection and determines whether a mobile device is mounted on the cradle 1 (step S8101). When it is determined in the determination process of step S8101 that the mobile device is not mounted, the control unit 11 repeats the mobile device mounting detection, and waits for the mobile device to be mounted.

When it is determined in the determination process of step S8101 that the mobile device is mounted, the control unit 11 controls the charging controlling unit 19 to check a state of charge of the battery of the newly mounted mobile device 4 (step S8102). The process of step S8102 can be performed by an electrical detection process such as detecting the voltage of the battery of the mobile device 4, for example.

The control unit 11 then determines on the basis of a result of the check in step S8102 whether the newly mounted mobile device 4 should be charged (step S8103). When the control unit 11 determines that the newly mounted mobile device 4 should be charged, the control unit 11 controls the charging controlling unit 19 to start charging the battery of the newly mounted mobile device (step S8104). When the control unit 11 determines in the determination process of step S8103 that the newly mounted mobile device 4 does not need to be charged, the control unit 11 proceeds to a process of step S8105.

Then, the control unit 11 forms device ID inquiry command data described with reference to FIG. 7B, and the transmission and reception controlling unit 17 controls the radio communication unit 15*a* and the transmitting and receiving antenna 15*b* to transmit the device ID inquiry command data to the newly mounted mobile device 4 through the radio communication unit 15*a* and the transmitting and receiving antenna 15*b* (step S8105). A device ID report is transmitted from the mobile device 4 in response to the device ID inquiry command data. Thus, the transmission and reception controlling unit 17 of the cradle 1 receives the device ID response described with reference to FIG. 7C from the mobile device 4 through the transmitting and receiving antenna 15*b* and the radio communication unit 15*a*, and then transmits the device ID response to the server device 2 through the external I/F 14*a* and the input-output terminal 14*b* (step S8106).

Receiving the device ID response, the server device 2 transmits a request to transmit device information and the like, as described above. The transmission and reception controlling unit 17 of the cradle 1 receives the request to transmit device information and the like from the server device 2 through the input-output terminal 14b and the external I/F 14a, and then transmits the request to transmit device information and the like to the mobile device 4 through the radio communication unit 15a and the transmitting and receiving antenna 15b (step S8107).

In response to the request to transmit device information and the like, transmission data of device information and the like described with reference to FIG. 39C is formed and then transmitted from the portable telephone terminal 4. The transmission and reception controlling unit 17 of the cradle 1 receives the transmission data of the device information and the like from the mobile device 4 through the transmitting and receiving antenna 15b and the radio communication unit 15a, and then transmits the transmission data of the device information and the like to the server device 2 through the external I/F 14a and the input-output terminal 14b (step S8108).

Thereafter, the control unit 11 of the cradle 1 controls the charging controlling unit 19 to check a state of charge of the battery in the mobile device (step S8109). The control unit 11 determines on the basis of a result of the check in step S8109 whether the charging of the mobile device 4 is completed (step S8110).

When the control unit 11 determines in the determination process of step S8110 that the charging of the mobile device 4 has not been completed, the control unit 11 repeats the process from step S8109, and is in a waiting state until the charging is completed. When the control unit 11 determines in the determination process of step S8110 that the charging has been completed, the control unit 11 controls the charging controlling unit 19 to end the charging process (step S8111). Then the process represented in FIG. 41 is ended.

Further, when it is determined in step S8103 that the charging is not necessary and thus the charging is not started in step S8104, it is possible to determine that the charging is not necessary through the process of step S8109 and step S8110, skip the process of step S8111, and end the process represented in FIG. 41.

[Process of Server Device 2 when Device Information and Like are Used]

Figure 42:
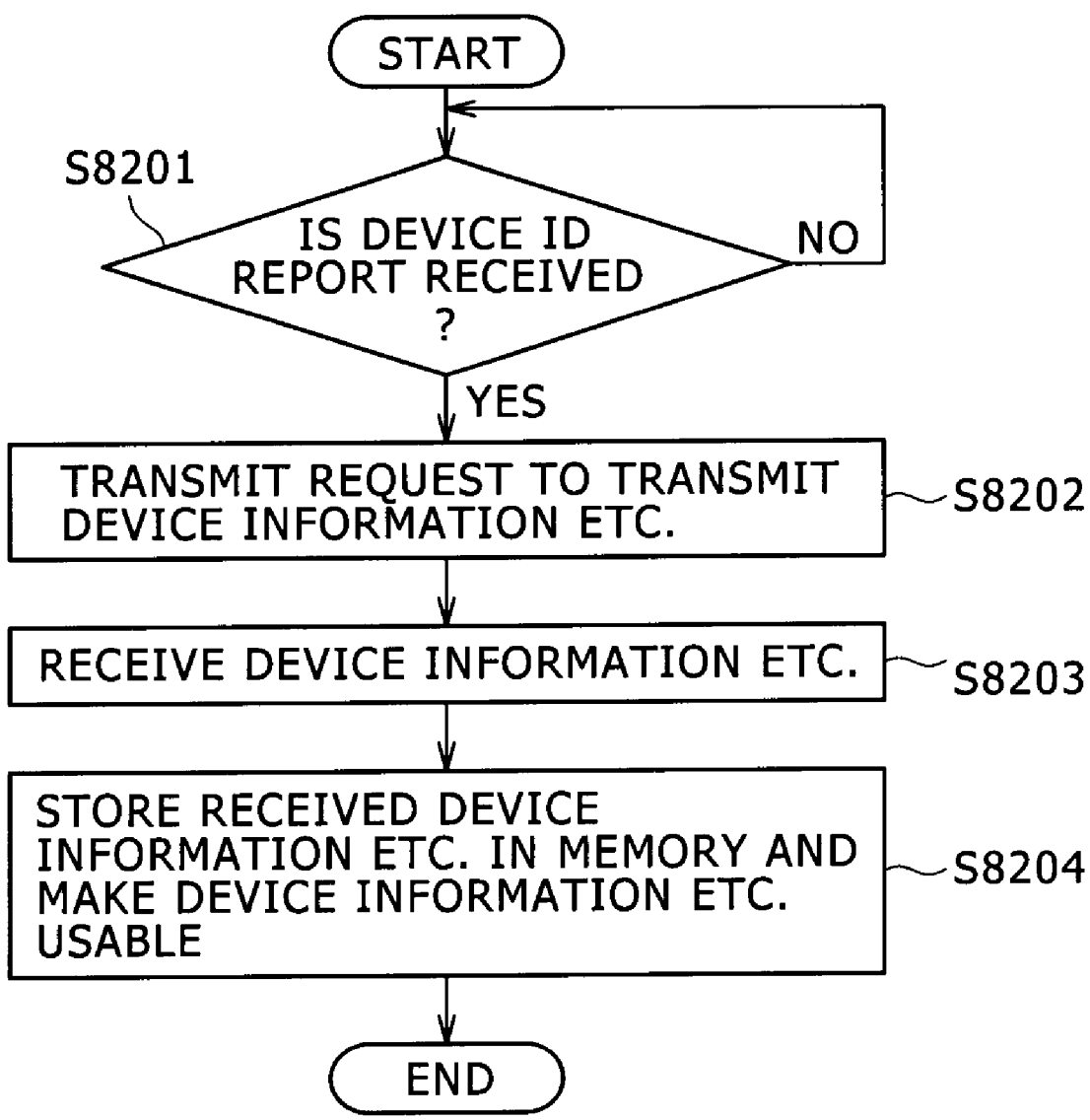
FIG. 42 is a flowchart illustrating a process performed at the server device when device information and the like are used in the data communication system to which the above embodiment of the present invention is applied.

FIG. 42 is a flowchart illustrating a process performed at the server device 2 when device information is used in the data communication system according to the second embodiment. The process represented in FIG. 42 is performed mainly by the control unit 21 and the transmission and reception controlling unit 27 when the server device 2 is in a state of power to the server device 2 being on.

When the power is turned on, the transmission and reception controlling unit 27 of the server device 2 determines whether a report on the device ID of the mobile device mounted on the cradle 1 is received from the cradle 1 through the input-output terminal 26b and the external I/F 26a (step S8201). When the transmission and reception controlling unit 27 determines in the determination process of step S8201 that the device ID report has not been received yet, the transmission and reception controlling unit 27 repeats the process from step S8201, and waits to receive the report on the device ID of the mobile device mounted on the cradle 1.

When the transmission and reception controlling unit 27 determines in the determination process of step S8201 that the device ID report is received from the cradle 1, the control unit 21 forms a request to transmit device information and the like, and then the transmission and reception controlling unit 27 transmits the request to transmit device information and the like through the external I/F 26a and the input-output terminal 26b to transmit the request to transmit device information and the like to the portable telephone terminal 4 as a mobile device via the cradle 1 (step S8202).

In response to the request transmitted in step S8202, transmission data of device information and the like is transmitted from the portable telephone terminal 4 as the mobile device mounted on the cradle 1. The control unit 21 receives the transmission data of the device information and the like through the input-output terminal 26b and the external I/F 26a (step S8203), stores the transmission data of the device information and the like in a memory such as the HDD 30 or the like, and manages the transmission data of the device information and the like so that the transmission data of the device information and the like can be used (step S8204). Then the process represented in FIG. 42 is ended.

[Process of Mobile Device 4 when Device Information and Like are Used]

Figure 43:
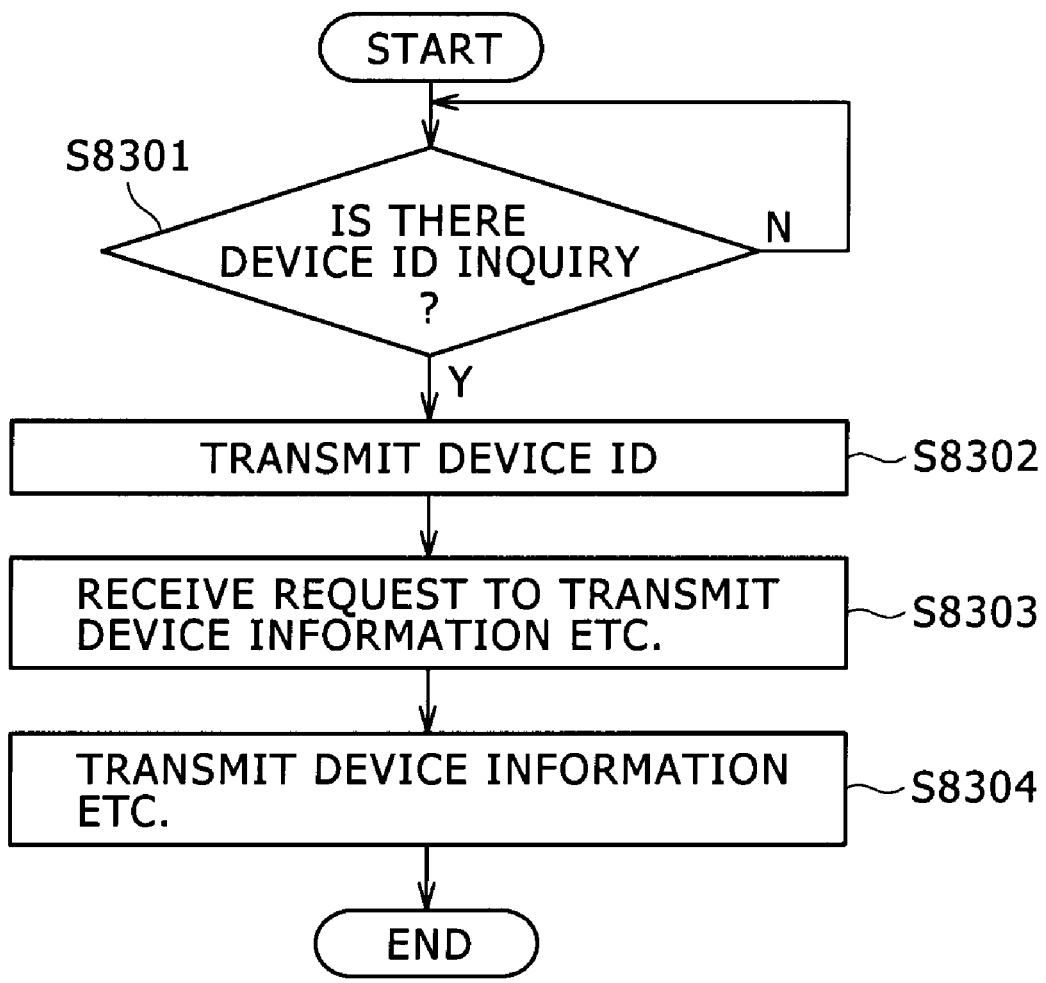
FIG. 43 is a flowchart illustrating a process performed at the portable telephone terminal as a mobile device when device information and the like are used in the data communication system to which the above embodiment of the present invention is applied.

FIG. 43 is a flowchart illustrating a process performed at the portable telephone terminal 4 as a mobile device when device information and the like are used in the data communication system according to the second embodiment. The process represented in FIG. 43 is performed mainly by the control unit 61 of the portable telephone terminal 4 when the portable telephone terminal 4 as a mobile device is set in a predetermined mode such for example as a charging mode in which mode the portable telephone terminal 4 is mounted on the cradle 1 and performs data communication and a charging process.

First, when the portable telephone terminal 4 is changed to the predetermined mode, the control unit 61 determines whether a device ID inquiry from the cradle 1 is received through the transmitting and receiving antenna 66b and the radio communication unit 66a (step S8301). When the control unit 61 determines in the determination process of step S8301 that the device ID inquiry has not been received, the control unit 61 repeats the process from step S8301, and waits to receive the device ID inquiry.

When the control unit 61 determines in the determination process of step S8301 that the device ID inquiry has been received from the cradle 1, the control unit 61 obtains information such as the device ID, the device attribute and the like stored and retained in for example the ROM 612 of the portable telephone terminal 4, forms a device ID response as shown in FIG. 7C, and then transmits the device ID response to the cradle 1 through the radio communication unit 66a and the transmitting and receiving antenna 66b (step S8302).

Then, the control unit 61 receives a request to transmit device information and the like, which request is transmitted from the server device 2 via the cradle 1, through the transmitting and receiving antenna 66b and the radio communication unit 66a (step S8303). When the control unit 61 has received the request to transmit device information and the like, the control unit 61 reads information from the ROM 612, the nonvolatile memory 614, and the memory of the battery of the portable telephone terminal 4, as described above, forms transmission data of device information and the like having the constitution described with reference to FIG. 39C, and then sends out the transmission data of the device information and the like through the radio communication unit 66a and the transmitting and receiving antenna 66b to transmit the transmission data of the device information and the like to the server device 2 via the cradle 1 (step S8304). Then the process represented in FIG. 43 is ended.

[Summary of Case of Using Device Information]

As is understood from the timing chart of FIG. 40 and the flowcharts of FIGS. 41 to 43, in the data communication system in the present example, device information and battery information can be provided from the portable telephone terminal 4 as a mobile device to the server device 2 via the cradle 1.

Thereby, using functions of the server device 2, it is possible to provide more detailed maintenance information about the maintenance of the mobile device and the battery, order maintenance, and purchase the battery promptly and surely.

While the example described with reference to FIGS. 40 to 43 has been described supposing that device information about the portable telephone terminal 4 (including the battery) is transmitted from the portable telephone terminal 4 as a mobile device to the server device 2, the present invention is not limited to this. The device information of the server device 2 can be transmitted from the server device 2 to the portable telephone terminal 4 via the cradle 1 so that the portable telephone terminal 4 notifies various maintenance information relating to the server device 2 to the user.

It is also possible to transmit device information about the portable telephone terminal 4 (including the battery) from the portable telephone terminal 4 as a mobile device to the server device 2, and return a result of analysis of the device information by the server device 2 to the portable telephone terminal 4 via the cradle 1. In such a case, the maintenance and the like of the portable telephone terminal 4 can be performed promptly on the portable telephone terminal 4 side.

[Others]

It is to be noted that while the data communication system according to the second embodiment has been described above supposing that a portable telephone terminal is used as a mobile device, the present invention is not limited to this. When right information is used, a game console, an electronic notebook, a PDA (Personal Digital Assistant) and the like having a wide area communication function can be used as a mobile device 4.

When log information of contents and device information and the like are used, the mobile device may of course have a wide area communication function. However, the wide area communication function is not particularly necessary, and various mobile devices such as a portable type music player, a portable type video and audio player and the like can be used.

As described above, in the data communication system according to the second embodiment, content data itself is not exchanged, but metadata added to the content data and device information and the like of the mobile device and the like are exchanged. It is thereby possible to enhance cooperation between the mobile device 4 and the server device 2, and thus construct a data communication system more convenient for the user.

In the foregoing second embodiment, three examples of (1) using right information, (2) using log information, and (3) using device information and the like have been described. However, data communication systems that implement two or more functions of these functions (1) to (3) can be realized.

Specifically, a data communication system that can use all of right information, log information, and device information and the like can be constructed, and a data communication system that can use two of right information, log information, and device information and the like can be constructed.

It is also possible to construct a data communication system that combines both the functions described in the first embodiment and the functions described in the second embodiment.

In the foregoing first and second embodiments, the cradle 1 has a function of charging the battery of a mobile device. Accordingly, because the cradle 1 has the clock circuit 12, the cradle 1 can detect a time when a mobile device is mounted on the cradle 1 to perform a quick charging process automatically when a mobile device is mounted during a period from 6 a.m. to 5 p.m., for example, because there is a strong possibility of the user going out soon, and perform a normal charging process during other periods.

In addition, the user himself/herself can set temporal timing of the cradle 1 performing the quick charging process. Further, by cooperating with the server device 2, it is of course possible to classify mobile devices into mobile devices to be subjected to the quick charging process and the other mobile devices by mobile device type, and set and manage a time period in which to perform the quick charging process for each mobile device and control a charging process for each mobile device in accordance with the setting.

It should be understood by those skilled in the art that various modifications, combinations, sub-combinations and alterations may occur depending on design requirements and other factors insofar as they are within the scope of the appended claims or the equivalents thereof.

What is claimed is:

1. A data communication system comprising:
a portable electronic device;
a server device; and
a cradle device configured to mediate communications between the portable electronic device and the server device,
wherein the portable electronic device includes
a controller configured to generate first data including metadata corresponding to content data stored at the portable electronic device or device information corresponding to the portable electronic device, and
an interface configured to transmit the first data to the server device via the cradle device,
the cradle device includes
an interface configured to communicate with the portable electronic device,
an interface configured to communicate with the server device, and
a controller configured to receive the first data from the portable electronic device and transmit the received first data to the server device, and
the server device includes
an interface configured to receive the first data from the portable electronic device via the cradle device, and
a controller configured to perform a process based on the received data, the process including providing maintenance information to the portable electronic device when the first data includes device information corresponding to the portable electronic device.

2. The system of claim 1, wherein:
the controller at the server device is configured to obtain content data based on the received first data when the first data includes right information corresponding to the content data as metadata on the content data.

3. The system of claim 1, wherein:
the controller, at the server device, is configured to perform notification of a state of use of content data corresponding to the content data in the server device, or continuous reproduction of the content data corresponding to the content data in the server device when the first data includes log information reflecting usage of the content data at the portable electronic device.

4. The system of claim 1, wherein:
the server device further includes
the controller configured to form second data directed to the portable electronic device, the second data including metadata corresponding to content data stored at the server device or device information corresponding to the server device, and an interface controller configured to control transmission of the second data to the portable electronic device via the cradle device, the controller in the cradle device is configured to receive the second data from the server device, and transmit the received second data to the portable electronic device, and said portable electronic device further includes an interface controller configured to control reception of the second data transmitted from the server device.

5. The system of claim 1, wherein the server device is configured to perform continuous reproduction of the content data when the first data includes log information of the content data.

6. A portable electronic device comprising:

an interface configured to communicate with a cradle device, the cradle device configured to mediate communication between the portable electronic device and a server device;

a controller configured to form first data, the first data including metadata corresponding to content data stored at the portable electronic device or device information corresponding to the portable electronic device; and an interface controller configured to control transmission of the first data to the server device via the interface and receive, from the server device via the cradle device, maintenance information when the first data includes device information corresponding to the portable electronic device.

7. The portable electronic device of claim 6, wherein:

the interface controller is configured to control reception of second data transmitted from the server device, and the controller is configured to perform a process according to the data received from the server device.

8. A cradle device, comprising:

a first interface configured to communicate with a portable electronic device;

a second interface configured to communicate with a server device; and an interface control unit configured to control reception of first data directed to the server device, the first data including metadata corresponding to content data or device information corresponding to the portable electronic device, from the portable electronic device via the first interface, control transmission of the first data to the server device via the second interface, control reception of maintenance information from the server via the second interface when the first data includes device information corresponding to the portable electronic device, and transmit the received maintenance information to the portable electronic device via the first interface.

9. The cradle device of claim 8, wherein:

the interface control unit is configured to control reception of second data from the server device via the second interface, and control transmission of the second data to the portable electronic device via the first interface.

10. A server device, comprising:

an interface configured to communicate with the cradle device, the cradle device configured to mediate communication between a portable electronic device and the server device;

an interface control unit configured to control reception of first data directed to the server device, the first data including metadata corresponding to content data or device information related to the portable electronic device, and the first data being transmitted from the portable electronic device and received via the interface; and a controller configured to perform a process according to the first data received from the portable electronic device, the process including providing maintenance information to the portable electronic device when the first data includes device information related to the portable electronic device.

11. The server device of claim 10, wherein said the first data includes right information corresponding to the content data, and the controller is configured to obtain content data corresponding to the right information.

12. The server device of claim 10, wherein the first data includes log information corresponding to the content data, and the controller is configured to perform at least one of notification of a state of use of content data corresponding to the content data in the server device or continuous reproduction of the content data corresponding to the content data in the server device.

13. The server device of claim 10, wherein:

the controller is configured to form second data directed to the portable electronic device, the second data including one of metadata corresponding to content data stored at the server device or device information corresponding to the server device; and to the interface control unit is configured to control transmission of the second data to the portable electronic device.

14. The server device of claim 10, wherein the controller is configured to perform continuous reproduction of the content data at the server device when the first data includes log information of the content data.

15. A data communication method used in a data communication system including a portable electronic device, a server device, and a cradle device for mediating communication between the portable electronic device and the server device, the data communication method comprising:

forming, at the portable electronic device, first data directed to the server device, the first data including metadata corresponding to content data stored at the portable electronic device or device information corresponding to the portable electronic device;

transmitting the first data from the portable electronic device to the cradle device;

receiving, at the cradle device, the first data transmitted from the portable electronic device;

transmitting the first data from the cradle device to the server device;

receiving, at the server device, the first data transmitted from the cradle device; and performing a process at the server device based on the received first data received from the portable electronic device via the cradle device, the process including providing maintenance information to the portable electronic device when the first data includes device information corresponding to the portable electronic device.

16. The data communication method of claim 15, further comprising:

obtaining, at the server device, content data based on the first data, when the first data includes right information of the content data.

17. The data communication method of claim 15, further comprising:

notifying of a state of use of content data corresponding to the content data in the server device when the first data includes log information of the content data.

18. The data communication method of claim 15, further comprising:
performing continuous reproduction of the content data at the server device when the first data includes log information of the content data.

19. The data communication method of claim 15, further comprising:
forming, at the server device, second data directed to the portable electronic device, the second data including metadata corresponding to content data stored at the server device or device information corresponding to the server device;
transmitting the second data to the portable electronic device via the cradle device;
receiving, at the portable electronic device, the second data from the server device via the cradle device.

20. A computer-readable recording medium including computer program instructions, which when executed by a portable electronic device, cause the portable electronic device to perform a method comprising:
forming data directed to a server device, the data including metadata corresponding to content data stored at the portable electronic device or device information corresponding to the portable electronic device;
controlling the transmission of the data to the server device via a cradle device connected to both the portable electronic device and the server device; and
controlling reception, from the server device via the cradle device, maintenance information when the data includes device information corresponding to the portable electronic device.

21. A computer-readable recording medium including computer program instructions, which when executed by a server device, cause the server device to perform a method comprising:
controlling the reception of first data directed to the server device, the first data including metadata corresponding to content data or device information corresponding to a portable electronic device, the first data being transmitted from the portable electronic device via a cradle device connected to both the server device and the portable electronic device; and
performing a process based on said the first data received from the portable electronic device via the cradle device, the process including providing maintenance information to the portable electronic device when the first data includes device information corresponding to the portable electronic device.

22. The computer-readable recording medium of claim 21, further comprising:
forming second data directed to the portable electronic device, the second data including metadata corresponding to content data stored at the server device or device information corresponding to the server device; and
transmitting the second data to the portable electronic device via the cradle device.

23. A portable electronic device comprising:
means for communicating with a cradle device, the cradle device configured to mediate communication between the portable electronic device and a server device;
means for forming first data, the first data including metadata relating to content data stored at the portable electronic device or device information corresponding to the portable electronic device;
means for controlling transmission of the first data to the server device via the means for communicating; and
means for controlling reception, from the server device via the cradle device, maintenance information when the first data includes device information corresponding to the portable electronic device.

24. A cradle device, comprising:
means for communicating with a portable electronic device mounted on the cradle device;
means for communicating with a server device; and
means for controlling reception of first data directed to the server device, the first data including metadata corresponding to content data or device information corresponding to the portable electronic device, from the portable electronic device via the first interface, and controlling transmission of the first data to the server device via the second interface, controlling reception of maintenance information from the server via the means for communicating with the server device when the first data includes device information corresponding to the portable electronic device, and controlling transmission of the received maintenance information to the portable electronic device via the means for communicating with the portable electronic apparatus mounted on the cradle device.

25. A server device, comprising:
means for communicating with a cradle device, the cradle device configured to mediate communication between a portable electronic device and the server device;
means for controlling reception of first data directed to the server device, the first data including metadata corresponding to content data or device information related to the portable electronic device; and
means for performing a process according to the first data received from the portable electronic device, the process including providing maintenance information to the portable electronic device when the first data includes device information related to the portable electronic device.

* * * * *